(12) United States Patent
Washington, Jr. et al.

(10) Patent No.: US 12,705,592 B1
(45) Date of Patent: Aug. 11, 2026

(54) MULTI-USER CONTENT PERSONALIZATION

(71) Applicant: Block, Inc., Oakland, CA (US)

(72) Inventors: Ronnie Washington, Jr., Upper Marlboro, MD (US); Ross Lindly, Los Angeles, CA (US); Maurice Mickens, Ellenwood, GA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 18/980,488

(22) Filed: Dec. 13, 2024

(51) Int. Cl.
*G06Q 20/10* (2012.01)
*G06Q 20/06* (2012.01)

(52) U.S. Cl.
CPC .......... *G06Q 20/108* (2013.01); *G06Q 20/06* (2013.01)

(58) Field of Classification Search
None
See application file for complete search history.

(56) References Cited

U.S. PATENT DOCUMENTS 9,471,144 B2 * 10/2016 Glass .................... G06F 3/0484
9,785,992 B2 * 10/2017 Glass .................... G06Q 50/01
11,436,651 B2 * 9/2022 Glass ................ G06Q 30/0601
2024/0403081 A1 * 12/2024 Miller .................... G06F 9/451

FOREIGN PATENT DOCUMENTS

WO WO-2014176352 A1 * 10/2014 ............ G06Q 30/06
WO WO-2024073602 A1 * 4/2024 ............... H04L 9/50
WO WO-2024091490 A1 * 5/2024 .......... G06Q 20/229

* cited by examiner

*Primary Examiner* — Paul S Schwarzenberg
(74) *Attorney, Agent, or Firm* — Lee & Hayes, P.C.

(57) ABSTRACT

Facilitating multi-user content personalization is described. Respective requests to personalize respective payments from respective payors to a payee are received from respective user devices executing a payment application. A customization user interface is presented to the respective payors from which the respective payors are able to customize respective screens to be presented to the payee, wherein a personalized payment functionality is selectively enabled for a first payor and disabled for a second payor. A first screen customized by the first payor and a second screen customized by the second payor are received from the respective user devices, and the screens are combined to generate combined output. An indication that the payee has opened the payment application on a user device is received, and, in response, the combined output is caused to be displayed via a user interface of the payment application executing on the payee's user device.

20 Claims, 19 Drawing Sheets

FIG. 9

MULTI-USER CONTENT PERSONALIZATION

TECHNICAL FIELD

Applications, which are downloadable and executable on user devices, enable users to interact with other users. Such applications are provided by service providers and utilize one or more network connections to transmit data among and between user devices to facilitate such interactions.

BRIEF DESCRIPTION OF THE DRAWINGS

Features of the present disclosure, its nature and various advantages, will be more apparent upon consideration of the following detailed description, taken in conjunction with the accompanying drawings.

FIG. 4A illustrates interactive elements for customizing the first screen with, among other things, clips of audio content.

FIG. 4C illustrates interactive elements for customizing the second screen with, among other things, a note to the payee.

FIG. 4F also illustrates how the second payor can reposition, resize, and/or change the orientation of content items (e.g., stickers) that have been added to the second screen.

FIG. 9 is an example environment for performing techniques described herein.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
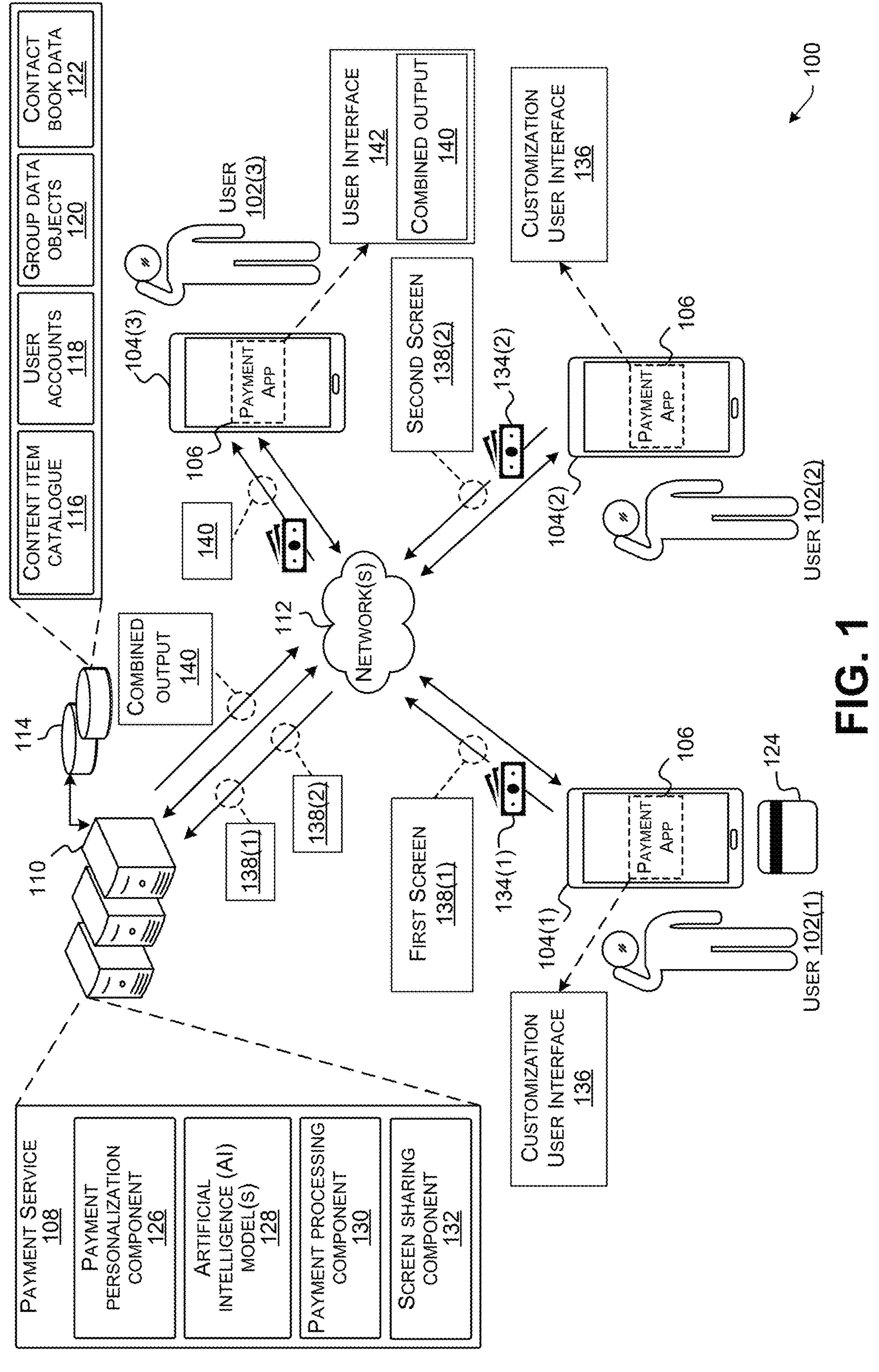
FIG. 1 is an example environment for facilitating multi-user content personalization, according to an implementation of the present subject matter.

Described herein are, among other things, techniques, devices, and systems for facilitating multi-user content personalization. For example, a computing system associated with a payment service (hereinafter, a "payment service system (PSS)") allows users of the payment service to download and install instances of a payment application on their user devices. The respective users can interact with user interfaces of the payment application executing on their user devices to, among other things, make electronic payments, such as "peer-to-peer (P2P)" payments. The payment application also allows respective users to personalize content. In some examples, the content is a screen associated with a payment between one or more users. For example, when the PSS receives, from a user device executing the payment application, a request to personalize a payment from a payor to a payee, the PSS presents, to the payor, in the payment application executing on the payor's user device, a customization user interface from which the payor is able to customize a screen to be presented to the payee. Various ways of customizing screens to personalize payments are described in more detail below with reference to the figures, and may include, among other things, customizing the screen with content items, such as a background, stickers, notes, clips of audio content, clips of video content, photographs, and/or the like. In scenarios where multiple payors are requesting to personalize payments that are associated and destined for the same payee, the PSS is configured to combine multiple screens that have been customized by the multiple payors to generate combined output, and to cause the combined output to be displayed via a user interface of the payment application executing on the payee's user device. Accordingly, when the payee opens the payment application on their user device, the payee can view the combined output as multiple screens customized by multiple different payors in a multi-user content personalization experience during which the payee consumes (e.g., views, listen to, feels, etc.) various types of content curated by the multiple different payors.

The techniques, devices, and systems described herein provide a technical solution to a computer-centric problem. To illustrate, conventional payment service systems are configured to perform operations on behalf of individual user accounts. For example, a user associated with an individual user account may request to send a payment to another user, and the system transfers funds between accounts in order to facilitate the payment on behalf of that individual user account. Accordingly, conventional payment service systems face challenges in the task of facilitating multi-user content personalization involving multiple different payors, especially because they are configured to perform operations on behalf of individual user accounts. The technical solutions to this computer-centric problem, as described herein, provide advantages over conventional systems, in part by receiving multiple screens customized by multiple payors (for personalizing their payments to a common payee), and combining the multiple screens in intelligent ways to generate combined output that is displayable on the payee's user device. For instance, the PSS described herein may be configured to generate combined output by stitching together the multiple screens such that the screens are displayable, on the payee's user device, in a particular sequence and/or for particular durations, thereby providing a multi-user content personalization experience for the payee. The techniques, devices, and systems described herein are configured to determine how to stitch multiple screens together based on various factors, which may include factors such as the respective times at which the PSS received the requests from the payors' user devices to personalize payments, the respective times at which the PSS received the screens from the payors' user devices, the respective payment amounts of the personalized payments, and/or relationships (e.g., social connections) shared between respective payors and the common payee (e.g., mutual connections between the respective payors and the common payee). These intelligent ways of stitching together multiple screens to facilitate multi-user content personalization improve upon conventional systems that are configured send individual payments separately.

In some examples, the techniques, devices, and systems described herein allow for one or more devices to conserve resources with respect to processing resources, memory resources, networking resources, power resources, etc., in the various ways described herein. For example, as noted above, conventional payment service systems are configured to perform operations on behalf of individual user accounts. Accordingly, payment data is generated, processed, stored, and/or transmitted over computer networks separately for each individual payment. For example, conventional payment service systems are configured to transmit payment data associated with multiple different payments over a network via individual messages that correspond to each payment, which consumes valuable resources (e.g., networking resources, processing resources, etc.). The techniques, devices, and systems described herein generate combined output for multi-user content personalization. In some examples, the data representing this combined output can be consolidated (e.g., into a single message), compressed (e.g., to reduce the size of the data), and/or the like, which results in, among other technical benefits, reduced consumption of resources, such as those mentioned above. For example, a single message carrying a payload with combined output for multi-user content personalization can be transmitted more efficiently over a network to a payee's user device, as compared to transmitting multiple separate messages, each message carrying data associated with an individual payment in a separate payload, with a separate message header, and so on.

In some examples, the techniques, devices, and systems described herein selectively and dynamically modify user-facing payment application functionality on an individual user basis. For example, in response to receiving, from a user device executing the payment application, a request to personalize a payment from a payor to a payee, the PSS can selectively enable personalized payment functionality for the payor and/or provide differentiated functionality across multiple payors. That is, the PSS may selectively enable personalized payment functionality that is different for different payors based on various factors. The personalized payment functionality, when enabled for a payor, may allow the payors to, among other things, customize their screen(s) with premium content items, have their screen(s) displayed to the payee earlier in a sequence of multiple screens displayed to the payee, and/or have their screen(s) displayed to the payee for longer durations than other screens of other payors without the same personalized payment functionality enabled. The factors used for providing differentiated functionality across multiple payors may include factors such as the respective times at which the PSS received the requests from the payors' user devices to personalize payments, the respective times at which the PSS received the screens from the payors' user devices, the respective payment amounts of the personalized payments, user account characteristics (e.g., status, tier, ambassador, preference, usage level (e.g., payment volume, payment amounts, product/service usage, etc.), usage patterns (e.g., music listened to, items purchased, etc.), longevity of account, etc.), the content in the personalized screen (e.g., which may tell a story or have a sequential or other contextual relationship), and/or relationships (e.g., social connections) shared between respective payors and a common payee (e.g., mutual connections between the respective payors and the common payee). The selective, dynamic, and time-sensitive enablement of differentiated personalized payment functionality across multiple users of the payment service effects an improvement on computing devices by modifying and tailoring user-facing payment application functionality to a personalized operation workflow.

In some examples, the techniques, devices, and systems described herein allow for associating payments from multiple payors to facilitate multi-user content personalization, either without or with very little user input. For example, the techniques, device, and systems described herein can utilize destination identifiers, tags, and/or group data objects to determine when to associate payments together and which payments to associate together. In some examples, a user can provide a single input to segment an existing alias (which is used for sending/receiving payments via the PSS) to create a segmented alias associated with multiple different destination identifiers, and one or more of the destination identifiers of the segmented alias can be used for multi-user content personalization. That is, if multiple payors submit respective requests to personalize payments, and if the respective requests include the same destination identifier of a segmented alias associated with a payee, the PSS may associate the corresponding payments together based on the destination identifier included in the respective requests. In some examples, the PSS may automatically (without any user input) associate payments together for facilitating multi-user content personalization, as described herein. This intelligence and/or automation offers improvements over conventional payment service systems.

In some examples, the techniques, devices, and systems described herein use an AI model(s) to determine how to combine multiple screens to facilitate multi-user content personalization. For example, a trained AI model(s) (e.g., a machine learning model(s)) may be configured to determine how to generate combined output using multiple screens associated with multiple payments in terms of a sequence of the screens, respective durations of the screens, and/or the like. For example, a trained AI model(s) may be configured to implement a multi-label classification task (e.g., labeling screens as "$1^{st}$", "$2^{nd}$," "$3^{rd}$," and so on) to output a sequence in which the screens are to be displayed and/or to classify screens in terms of "screen time" class labels (e.g., 5 seconds, 10 seconds, 15 seconds, etc.) based on any suitable data received as input. The use of AI to generate combined output, as described herein, offers improvements over conventional payment service systems in that it provides more flexibility for different use cases and adapting to novel types of data that may be used as a basis for generating combined output.

In some examples, the techniques, devices, and systems described herein use generative AI to facilitate multi-user content personalization. To illustrate, a payor who is in the process of customizing a screen(s) can prompt a generative AI model(s) to generate one or more content items for customizing the screen(s). The generative AI model(s), which may be configured to generate text, audio, images, and/or other content as output, may be used to generate a background, text (e.g., a note(s)), stickers, audio content, video content, image content, and/or the like, which can be used to customize a screen(s), as described herein. In some examples, payors can type (or speak) a prompt for a generative AI model(s) to generate a personalized screen (e.g., with a personalized background) that is to be presented to a payee. In some examples, a generative AI model(s) may output multiple different options for content items that may be added to second screen. The use of generative AI, as described herein, offers improvements over conventional payment service systems that are restricted to using static, predefined content for personalization.

While several examples presented herein are directed to multi-user content personalization in association with a payment service associated with a PSS that implements a payment application for users to install and execute on user devices, the techniques described herein are also applicable to other computing systems that implement other types of services and/or applications, such as electronic commerce (ecommerce) services and/or applications, social networking services and/or applications, gaming services and/or applications, a merchant service and/or application, a loyalty program service and/or application, a loan service (e.g., capital loan, buy now pay later loan, etc.) and/or application, a music, podcast and/or video streaming service and/or application, and/or the like.

The preceding summary is provided for the purposes of summarizing some example embodiments to provide an understanding of aspects of the subject matter described herein. Accordingly, the above-described features are merely examples and should not be construed as limiting in any way. Other features, aspects, and advantages of the subject matter described herein will become apparent from the following description of Figures and Claims.

FIG. 1 is an example environment 100 for facilitating multi-user content personalization, according to an implementation of the present subject matter. As depicted, the example environment 100 may include users 102, such as the first user 102(1), the second user 102(2), and the third user 102(3) shown in FIG. 1. The users 102 may be associated with respective electronic devices (sometimes referred to herein as "user devices" 104), such as the first user device 104(1), the second user device 104(2), and the third user device 104(3) shown in FIG. 1. The user devices 104 are configured to execute respective applications, such as a payment application 106. The payment application 106, when executing on the respective user devices 104, may allow the respective users 102 to navigate to the various user interfaces described herein, and/or to interact with or access services, such as a payment service 108. In at least one example, the payment application 106 allows for the efficient transfer of funds (e.g., fiat currency, securities (e.g., stocks, bonds, mutual funds), cryptocurrencies, gift cards, etc.) between users 102 of the payment service 108. Such transfers can be "efficient" in that they can happen electronically, in real-time or near real-time, due to a complex integration of software and hardware components configured to facilitate such transfers. In some examples, the respective users 102 can interact with user interfaces of the payment application 106 to, among other things, facilitate transactions (e.g., electronic payments), view receipts, statements, and/or activity feeds regarding their transactions, and/or the like. In some examples, the payment application 106 allows two users who are "peers" to transfer funds in a P2P transaction. In some examples, the payment application 106 allows a merchant and a customer of the merchant to transfer funds between each other, such as when the customer is purchasing an item(s) from the merchant. In some examples, the payment application 106 installed on respective user devices 104 can be different instances of a same payment application 106, which can be provided by a computing system that implements the payment service 108 (hereinafter, a "payment service system (PSS)" 110). For example, the users 102 may download and install a particular version of the payment application 106 from the PSS 110 on their user devices 104, either via a first time installation, a software update, or the like.

As depicted by FIG. 1, the user devices 104 of the users 102 may be coupled to one or more servers of the PSS 110 via one or more network(s) 112, such as a wide area network (WAN) (e.g., the Internet, a cellular network, etc.). In some examples, the PSS 110 may include a cloud-based computing architecture suitable for hosting and servicing the respective instances of the payment application 106 executing on the respective user devices 104. In particular examples, the PSS 110 may include a Platform as a Service (PaaS) architecture, a Software as a Service (SaaS) architecture, an Infrastructure as a Service (IaaS) architecture, a Data as a Service (DaaS) architecture, a Compute as a Service (CaaS) architecture, or other similar cloud-based computing architecture (e.g., "X" as a Service (XaaS)). The PSS 110 may be used to implement the aforementioned payment service 108, as described herein.

A service provider may operate the PSS 110, which may include one or more processing devices, such as the aforementioned server(s), and one or more data stores 114. The processing devices (e.g., server(s)) of the PSS 110 may be configured to provide processing or computing support for the respective payment applications (e.g., the payment application 106) executing on the respective user devices 104. The data store(s) 114 may include, for example, one or more internal data stores that may be utilized to store various types of data including, among other data, a content item catalogue 116, user accounts 118, group data objects 120, and/or contact book data 122.

As new users 102 are onboarded to the payment service 108, the payment service 108 creates user accounts 118 for the new users 102. A user account 118 is a collection of data (e.g., metadata) that represents an identity of a user 102. Accordingly, when a user 102 is logged into their user account 118, the user 102 can, among other things, send/receive payments to/from other users 102 of the payment service 108 using an alias, or another type of unique user identifier, assigned to the user 102. In some examples, the payment service 108 can prompt the user 102, during the onboarding process or at any other suitable time, to specify whether the user account 118 is a personal account or a business account, and/or the payment service 108 may allow the user 102 to add a business account in addition to a personal account, such that the user's personal finances can be kept separate from the user's business finances. In some examples, the payment service 108 can prompt the user 102, during the onboarding process or at any other suitable time, to allow access to the user's contacts (e.g., stored in their user device 104), and, if the user 102 consents to allowing access to their contacts, a shared contact book of the user 102 is stored in the datastore 114 as the contact book data 122 or can otherwise be accessible to the payment service 108. Contacts in the contact book data 122 may include any suitable contact information, such as a name(s), a phone number(s), an electronic mail (email) address(es), a social media handle(s), and/or the like. In some examples, the contact book data 122 can be encrypted, hashed, tokenized, or otherwise securely stored to protect personal or sensitive data associated with user contacts.

In some examples, a service provider of the payment service 108 issues a payment instrument(s) 124 (e.g., a debit card, a credit card, etc.) to the users 102 who qualify for the payment instrument(s) 124, and the payment instrument(s) 124 can be used in association with the payment service 108. In the example of FIG. 1, the first user 102(1) has been issued the payment instrument(s) 124, and funds available in the user's 102 financial account (e.g., spending account, savings account, investing account, cryptocurrency account, etc.) can be used to facilitate transactions that are conducted using that payment instrument(s) 124 (sometimes referred to herein as "card transactions").

In the example of FIG. 1, the payment service 108 is shown as including a payment personalization component 126, one or more AI models 128, a payment processing component 130, and/or a screen sharing component 132. The components 126, 130, and 132, and the payment service 108 itself, may represent computer-executable instructions that, when executed by a processor(s) (e.g., a processor(s) of the PSS 110) cause performance of one or more operations described herein. In some examples, one or more of these components may utilize the AI model(s) 128 to perform their respective tasks.

The payment personalization component 126 is configured to, among other things, process requests to personalize content, present various user interfaces in respective instances of the payment application 106 executing on the user devices 104 to facilitate the personalization of content, and to generate, and cause display of, combined output on the user devices 104 in association with multi-user content personalization. In some examples, the content is a screen(s) associated with a payment(s) between one or more users, as described in detail below. In some examples, the payment personalization component 126 is configured to facilitate the personalization of payment requests in addition to facilitating the personalization of payments themselves. That is, the payment personalization component 126 may allow users 102 to personalize both payments and payment requests. In some examples, the payment personalization component 126 is configured to facilitate personalization of a one-to-one payment and/or payment request, a one-to-many payment and/or payment request, and/or many-to-one payments and/or payment requests.

Users 102 may wish to personalize content, such as screens associated with payments (and/or payment requests), for various reasons. For example, a user 102 may send a payment to another user 102 for an event, such as a birthday, a holiday (e.g., Christmas, New Years Day, Easter, etc.), a baby shower, and/or the like. In these examples, the payor may wish to personalize the payment by customizing a screen with content items (e.g., a background, a sticker(s), a note(s), etc.), which may be themed in accordance with the event (e.g., a birthday-themed background, birthday-themed stickers, etc.). As another example, a user 102 may send a payment to another user 102 as a general gift, for a fundraiser, for a campaign, as a donation, or "just because" (e.g., some users 102 may wish to add their own "flavor" to some or all of their payments). As yet another example, a user 102 may send a payment to another user 102 as a tip (e.g., tipping a service provider, such as a waiter or waitress at a restaurant), as a "thank you," as a gift card, as a loyalty coupon, and/or the like. In some examples, users 102 that setup a business account (which is a type of user account 118) with the payment service 108, may wish to personalize business-related payments, such as incentive payments (e.g., rewards, cash back, etc.) for customers (e.g., other users 102) who receive an incentive and/or a series of incentives from the business accounts of those users 102. In these examples, the payor associated with the business account may wish to personalize a business-related payment(s) (e.g., an incentive payment(s)) by customizing a screen with content items (e.g., a background, a sticker(s), a note(s), etc.) that are business-related (e.g., a business-related background, business-related stickers, etc.).

Figure 2:
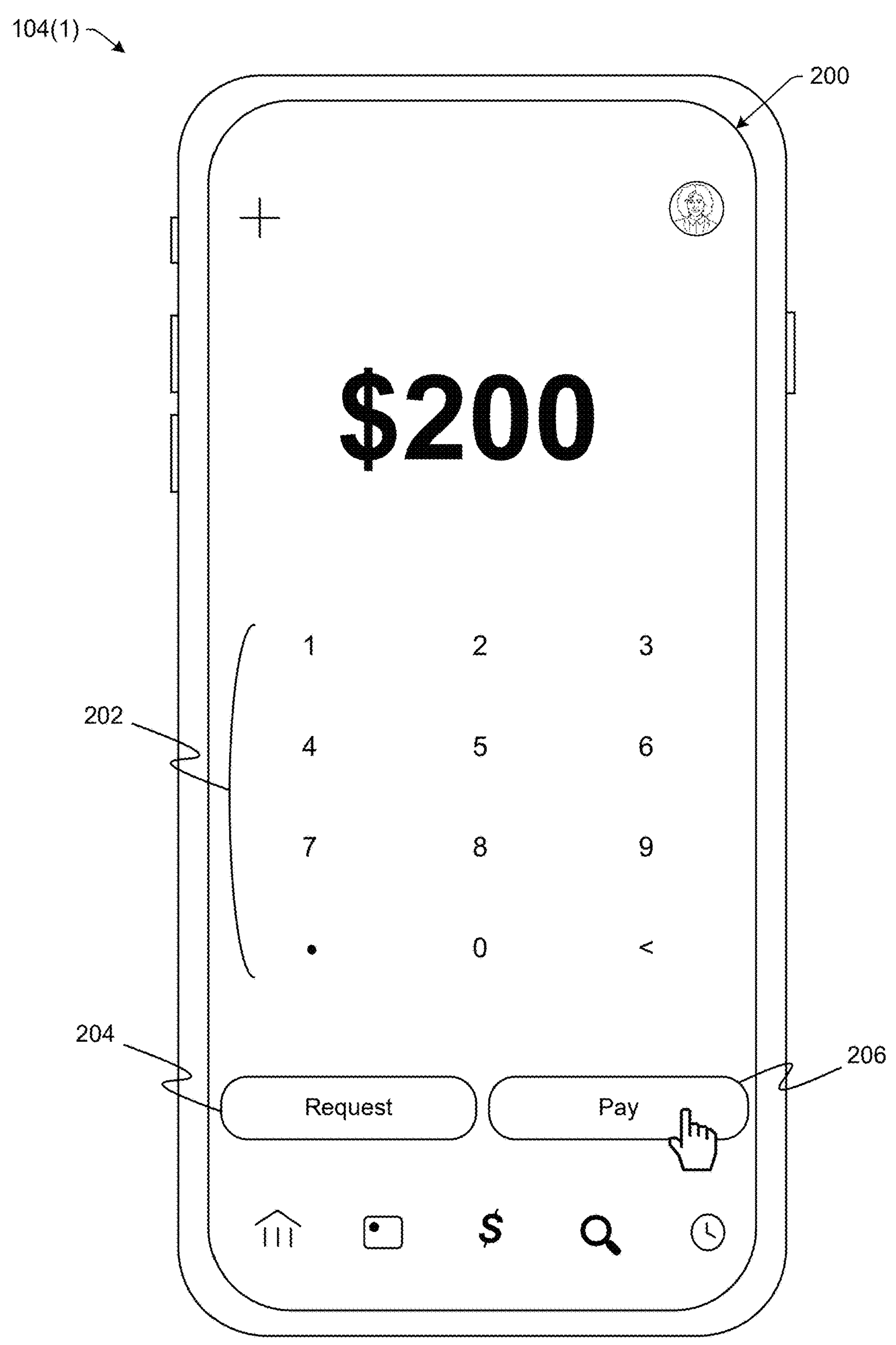
FIG. 2 is an example user interface of a payment application for entering an amount of a payment that is to be personalized, according to an implementation of the present subject matter.

In an illustrative example, the first user 102(1), the second user 102(2), and the third user 102(3) in FIG. 1 may be coworkers who work at the same company, and the third user 102(3) is expecting a baby. To celebrate this occasion, one of the users 102 may organize a baby shower where the third user 102(3) is to receive payments from the other users 102(1), 102(2) as baby shower gifts. In this example, the first user 102(1) (first payor) and the second user 102(2) (second payor) initiate respective payments to the third user 102(3) (payee) via respective instances of the payment application 106 executing on their user devices 104(1), 104(2). Referring briefly to FIGS. 2 and 3, example user interfaces will now be described to illustrate how these payments can be initiated.

FIG. 2 is an example user interface 200 of the payment application 106 for entering an amount of a payment that is to be personalized, according to an implementation of the present subject matter. Specifically, the example user interface 200 of the payment application 106 is shown as being displayed on the first user device 104(1) of FIG. 1, the user interface 200 for entering a first amount of a first payment 134(1) that is to be personalized by the first user 102(1) (first payor). Similarly, the user interface 200 may be displayed on the second user device 104(2) for the second user 102(2) (second payor) to enter a second amount of a second payment 134(2) that is to be personalized by the second user 102(2) (second payor). The user interface 200 may be displayed at any suitable time, such as in response to the first user 102(1) (first payor) opening the payment application 106. The user interface 200 may present a keypad 202 that includes numbers, symbols, and/or other characters for entering the first amount of the first payment 134(1). In the example of FIG. 2, the first user 102(1) (first payor) has entered a first payment amount of $200. The user interface 200 may further present one or more interactive elements, such as the interactive element 204 (e.g., a "Request" button) and/or the interactive element 206 (e.g., a "Pay" button). The first user 102(1) may interact with (e.g., select) the interactive element 204 to send a payment request to another user 102, or the first user 102(1) may interact with (e.g., select) the interactive element 206 to send a payment to another user 102. In the example of FIG. 2, the first user 102(1) (first payor) interacts with (e.g., selects) the interactive element 206 to send the first payment 134(1) to another user 102. It is to be appreciated that the second user 102(2) (second payor) may enter a second payment amount via the user interface 200 displayed on an instance of the payment application 106 executing on the second user device 104(2), and that the second user 102(2) (second payor) may select the interactive element 206 to send the second payment 134(2) to another user 102 in a similar manner to that described above with reference to the first user 102(1) (first payor) sending the first payment 134(1).

Figure 3A:
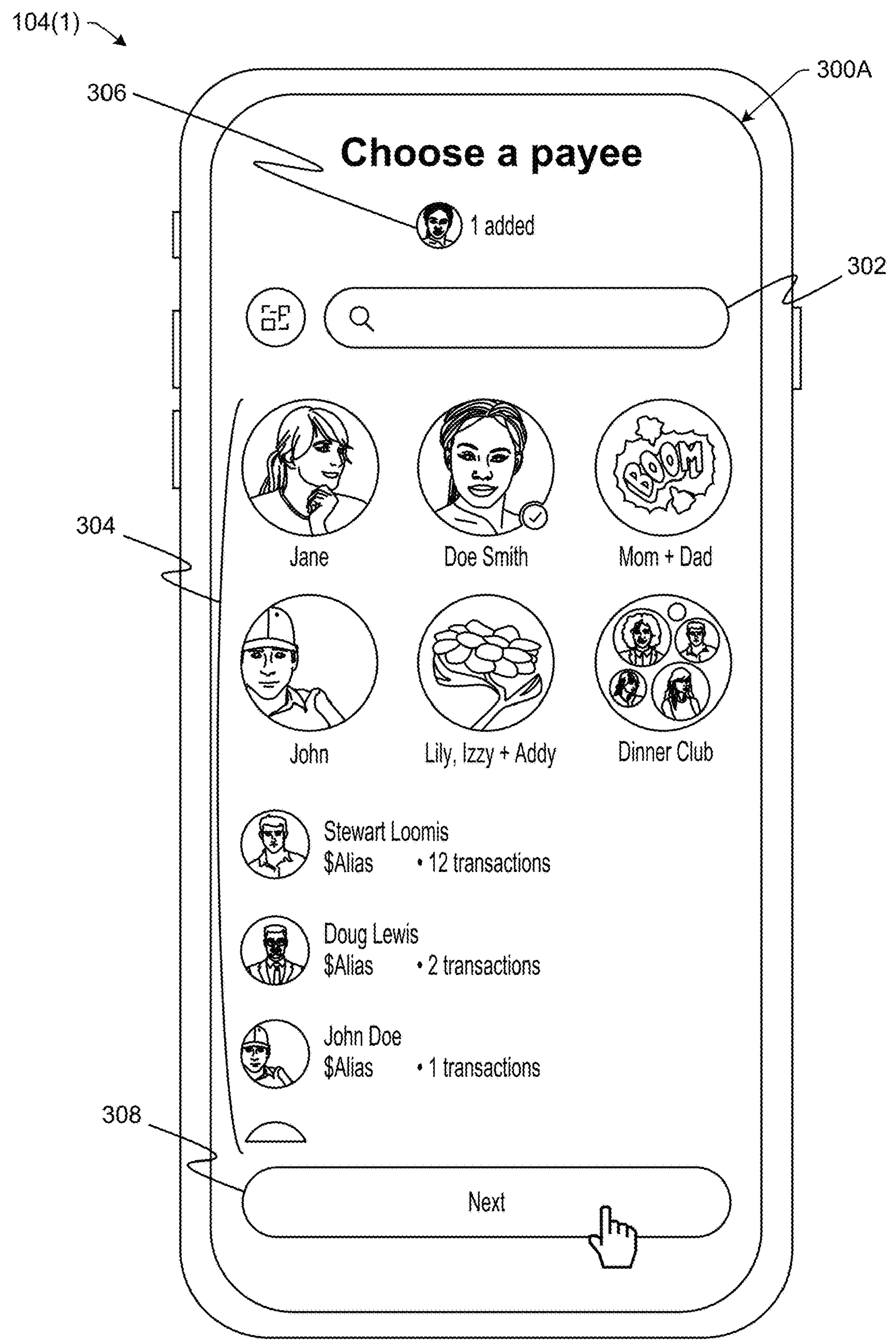
FIG. 3A is an example user interface of the payment application for selecting a payee who is to receive a personalized payment, according to an implementation of the present subject matter.

FIG. 3A is an example user interface 300A of the payment application 106 for selecting a payee who is to receive a personalized payment, according to an implementation of the present subject matter. Specifically, the example user interface 300A of the payment application 106 is shown as being displayed on the first user device 104(1) of FIG. 1, the user interface 300A for selecting a payee who is to receive a first personalized payment from the first payor (e.g., first user 102(1)). Similarly, the user interface 300A may be displayed on the second user device 104(2) for the second user 102(2) (second payor) to select a payee who is to receive a second personalized payment from the second payor (e.g., second user 102(1)). The user interface 300A may be displayed at any suitable time, such as in response to the first user 102(1) (first payor) interacting with (e.g., selecting) the interactive element 206 of the user interface 200. The user interface 300A may present a search bar 302 for the first payor (e.g., first user 102(1)) to search for users 102 of the payment service 108 to select as a payee. The user interface 300A may further present one or more interactive elements 304 in a list for interaction (e.g., selection) by the first payor (e.g., first user 102(1)). The interactive element(s) 304 presented via the user interface 300A may represent users 102 of the payment service 108 who are in a contact book of the first user 102(1) (first payor), "favorite" users 102 of the first user 102(1) (first payor), users 102 with which the first user 102(1) recently transacted, and/or the like. In some examples, the list of interactive elements 304 may be ranked based on context about the first payor (e.g., first user 102(1)) and/or context about the first payment 134(1). For example, the user account 118 and/or contact book data 122 associated with the first user 102(1) (first payor) may be used to determine a ranked order of the interactive elements 304. Additionally, or alternatively, the payment amount of the first payment 134(1) may be used to determine the ranked order of the interactive elements 304. In some examples, users 102 may customize their screens before selecting a payee, and in these examples, the screens themselves, and/or the content items used to customize the screens may be used as a context for ranking the interactive elements 304 in a particular order. In the example of FIG. 3A, the first user 102(1) (first payor) has interacted with (e.g., selected) an interactive element 304 representing the third user 102(3) (payee) of FIG. 1 (e.g., Doe Smith). In response to interacting with (e.g., selecting) the interactive element 304 representing the third user 102(3) (payee), the user interface 300A may dynamically present an indictor 306 of the selected payee to indicate, to the first user 102(1) (first payor), that they have selected a payee, and to indicate the name or alias of the selected payee. The user interface 300A may further present an interactive element 308 (e.g., a "Next" button). In the example of FIG. 3A, the first user 102(1) (first payor) interacts with (e.g., selects) the interactive element 308 to proceed to the next step in personalizing and sending the first payment 134(1) to the selected payee (e.g., third user 102(3)). It is to be appreciated that the second user 102(2) (second payor) may select a payee (e.g., the third user 102(3)) via the user interface 300A displayed on an instance of the payment application 106 executing on the second user device 104(2), and that the second user 102(2) (second payor) may select the interactive element 208 to proceed to the next step in personalizing and sending the second payment 134(2) to the selected payee (e.g., third user 102(3)) in a similar manner to that described above with reference to the first user 102(1) (first payor) sending the first payment 134(1).

Figure 3B:
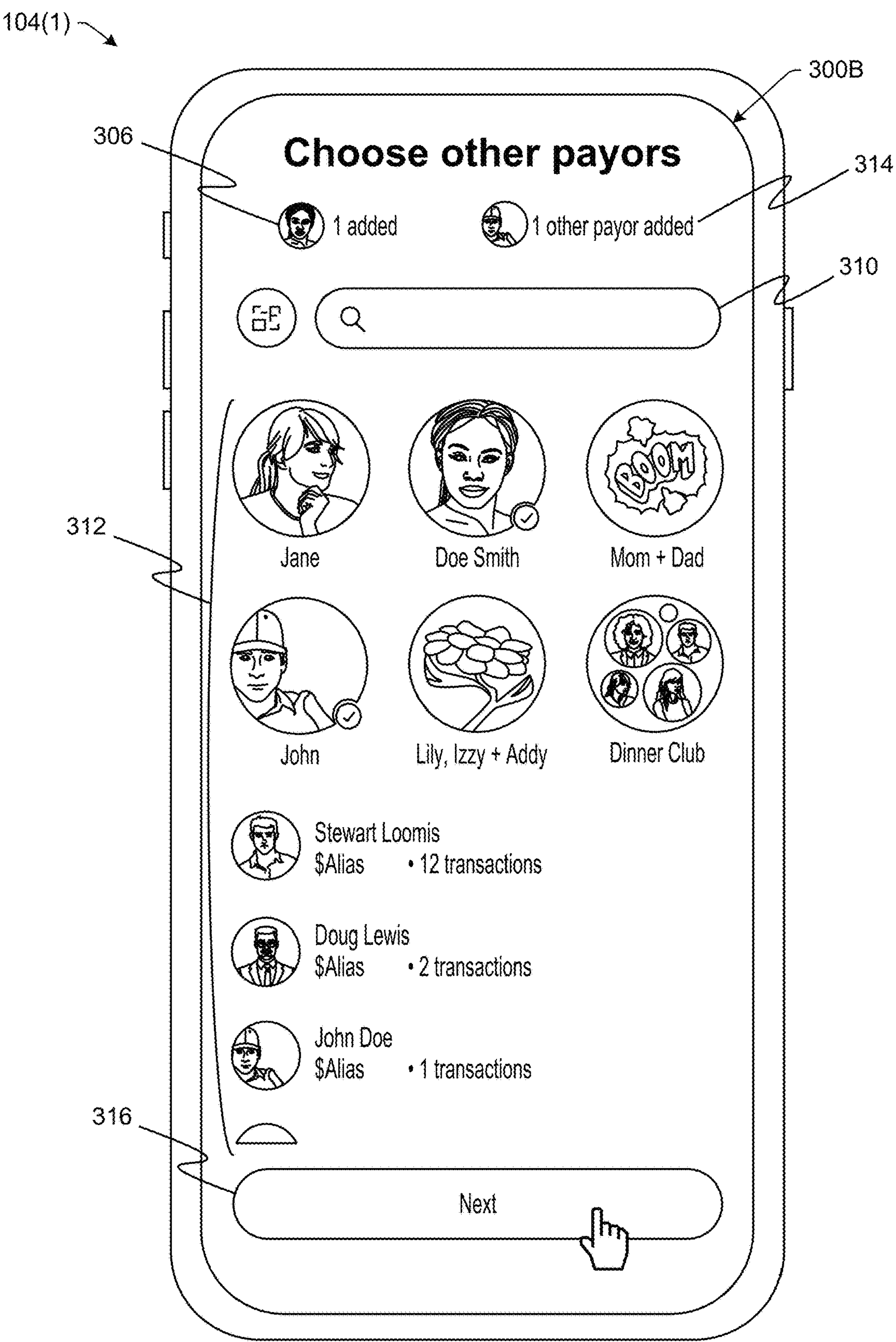
FIG. 3B is an example user interface of the payment application for selecting other payors to facilitate multi-user content personalization, according to an implementation of the present subject matter.

FIG. 3B is an example user interface 300B of the payment application 106 for selecting other payors to facilitate multi-user content personalization, according to an implementation of the present subject matter. The example user interface 300B of the payment application 106 is shown as being displayed on the first user device 104(1) of FIG. 1, the user interface 300B for selecting other payors, if, say, the first payor (e.g., first user 102(1)) would like to invite another payor(s) to contribute to a group payment and/or to otherwise be included in a multi-user content personalization experience for the payee. The user interface 300B may be displayed at any suitable time, such as in response to the first user 102(1) (first payor) interacting with (e.g., selecting) the interactive element 206 of the user interface 200 and/or in response to the first user 102(1) (first payor) interacting with (e.g., selecting) the interactive element 308 of the user interface 300A. The user interface 300B may present a search bar 310 for the first payor (e.g., first user 102(1)) to search for users 102 of the payment service 108 to select as another payor(s). The user interface 300B may further present one or more interactive elements 312 in a list for interaction (e.g., selection) by the first payor (e.g., first user 102(1)). Similar to the user interface 300A described above, the interactive element(s) 312 presented via the user interface 300B may represent users 102 of the payment service 108 who are in a contact book of the first user 102(1) (first payor), "favorite" users 102 of the first user 102(1) (first payor), users 102 with which the first user 102(1) recently transacted, and/or the like, and the list of interactive element(s) 312 may be ranked in similar ways to that described above with respect to the interactive element(s) 304. In the example of FIG. 3B, the first user 102(1) (first payor) has interacted with (e.g., selected) an interactive element 312, which may represent the second user 102(2) (second payor) of FIG. 1 (e.g., John). In response to interacting with (e.g., selecting) the interactive element 312 representing the second user 102(2) (second payor), the user interface 300B may dynamically present an indictor 314 of the selected payor to indicate, to the first user 102(1) (first payor), that they have selected another payor, and to indicate the name or alias of the selected other payor. The user interface 300B may further present an interactive element 316 (e.g., a "Next" button). In the example of FIG. 3B, the first user 102(1) (first payor) interacts with (e.g., selects) the interactive element 316 to proceed to the next step in personalizing and sending the first payment 134(1) to the selected payee (e.g., third user 102(3)). It is to be appreciated that the first user 102(1) (first payor) may select multiple other payors, in some examples. Accordingly, the first payor (e.g., first user 102(1)) may invite any number of other payors as co-contributors to payments made to the selected payee (e.g., third user 102(3)).

Referring again to FIG. 1, the first user 102(1) and the second user 102(2) may also submit, via the respective instances of the payment application 106 executing on the first user device 104(1) and the second user device 104(2), respective requests to personalize the payments 134(1) and 134(2). In some examples, the requests to personalize the payments 134(1) and 134(2) are submitted in response to the users 102(1) and 102(2) independently interacting with (e.g., selecting) the interactive element 308 of the user interface 300A (e.g., without selecting another payor at the time the payment is initiated). In some examples, a different interactive element may be presented via a user interface of the payment application 106 for requesting to personalize a payment 134 (e.g., which may initiate a personalization workflow as a branch to the payment initialization workflow). In some examples, the personalization workflow is initiated in response to the first user 102(1) interacting with (e.g., selecting) the interactive element 316 of the user interface 300B (e.g., after selecting another payor(s) as a co-contributor(s)). In any case, in the example of FIG. 1, the PSS 110 may receive, from the first user device 104(1) executing the payment application 106, a first request to personalize the first payment 134(1) from the first user 102(1) (first payor) to the third user 102(3) (payee). Additionally, or alternatively, the PSS 110 may receive, from the second user device 104(2) executing the payment application 106, a second request to personalize the second payment 134(2) from the second user 102(2) (second payor) to the third user 102(3) (payee).

In response to receiving the aforementioned request(s), the PSS 110 may execute the payment personalization component 126 to present, to each of the first payor (first user 102(1)) and the second payor (second user 102(2)) and in respective instances of the payment application 106 executing on the first user device 104(1) and the second user device 104(2), a customization user interface 136 from which the first payor (first user 102(1)) and the second payor (second user 102(2)) are able to customize a screen 138 to be presented to the payee (third user 102(3)). For example, the PSS 110 may execute the payment personalization component 126 to present, to the first payor (first user 102(1)) via the payment application 106, the customization user interface 136 from which the first payor (first user 102(1)) is able to customize a first screen 138(1) to be presented to the payee (third user 102(3)), and to present, to the second payor (second user 102(2)) via the payment application 106, the customization user interface 136 from which the second payor (second user 102(2)) is able to customize a second screen 138(2) to be presented to the payee (third user 102(3)).

In some examples, the customization user interface 136 is presented to each of payors with one or more interactive elements for customizing the screen 138 with content items available from the content item catalogue 116 stored in the datastore(s) 114. The content item catalogue 116 may represent a library of content items including content items such as backgrounds, stickers, words or phrases, clips of audio content (e.g., music/songs, podcasts, audio books, sound bites from movies, sound bites from television series, sound bites of celebrities or other users talking, user-generated audio content, etc.), clips of video content (e.g., video shorts from movies, video shorts from television series, user-generated video content, etc.), photographs (e.g., movie scenes, scenes from television series, user-generated photographs, etc.), and/or the like. In some examples, the content item catalogue 116 is updated (e.g., periodically) with new content items, and/or content items may be removed (e.g., periodically) from the content item catalogue 116 as part of a catalogue update. In some examples, the content items (e.g., backgrounds, stickers, etc.) in the catalogue 116 are themed in accordance with an event (e.g., a holiday, birthday, cultural moments, brand moments, etc.). In some examples, the content items (e.g., backgrounds, stickers, etc.) are configured to be dynamic content items when presented on a user device 104, such as animated content items, content items with three-dimensional (3D) effects (e.g., confetti falling in front of a static or dynamic background), and/or the like. In some examples, content items (e.g., backgrounds, stickers, etc.) are configured to be interactive content items when presented on a user device 104 (e.g., a viewing user 102 may touch and/or talk to interactive stickers that "react" to the user-interaction by animating and/or moving on the background). In some examples, a subset of the content items in the content item catalogue 116 may be labeled, or otherwise designated, as "premium" content items that are exclusively available to certain users 102 (and not to other users 102).

In some examples, the payment personalization component 126 may be executed to selected content items (from the content item catalogue 116) that are personalized for individual users 102, and to surface those personalized content items to the users 102 in the customization user interface 136. For example, content can be selected for the first user 102(1) (e.g., first payor) based on the user account 118 associated with the first user 102(1), the type of payment instrument 124 issued to the first user 102(1), preferences of the first user 102(1), and/or other user data (e.g., payment history data, past screens 138 customized by the first user 102(1), etc.) associated with the first user 102(1). In some examples, modeling may be used to generate and/or present content to specific users 102. For example, one or more models (e.g., AI model(s) 128) may be trained to ingest interaction data associated with users 102 and dynamically and/or intelligently generate one or more content items that can be used to customize screens 138, as described herein. In some examples, the model(s) (e.g., AI model(s) 128) can be trained to generate content items that are representative of a user 102 and/or their activity. In some examples, the model(s) used to generate one or more content items for users 102 include a generative model(s), which, in some examples, can use AI. That is, in at least one example, a content item can be generated using generative AI. For example, the generative model may generate new content items, such as graphical elements, text elements, visual elements, and/or auditory elements, based at least in part on the user's interaction data.

In some examples, the payment personalization component 126 may be executed to selectively enable, for the first payor (e.g., first user 102(1)) and in the customization user interface 136, a functionality (sometimes referred to herein as a "personalized payment functionality") associated with customizing the first screen 138(1). In some examples, the functionality enabled for the first payor (e.g., first user 102(1)) is not enabled the second payor (e.g., second user 102(2)). For example, the functionality enabled for the first payor (e.g., first user 102(1)) may allow the first payor to customize the first screen 138(1) with one or more premium content items (e.g., backgrounds, stickers, etc.) that are unavailable to the second payor (e.g., second user 102(2)) for customizing the second screen 138(2). In this example, premium content items in the content item catalogue 116 may be exclusively available to users 102 for which a particular personalized payment functionality has been selectively enabled, such as the first user 102(1).

The differentiated functionality may be provided across multiple payors based on various factors. One example factor is payment amount. For example, a personalized payment functionality may be selectively enabled for the first payor (e.g., first user 102(1)) based on a first amount of the first payment 134(1), and this functionality may not be enabled (e.g., may be disabled) for the second payor (e.g., second user 102(2)) based on a second amount of the second payment 134(2). For instance, if the first amount of the first payment 134(1) is greater than the second amount of the second payment 134(2), and/or if the first amount of the first payment 134(1) satisfies a threshold that the second amount of the second payment 134(2) fails to satisfy, the personalized payment functionality may be selectively enabled for the first payor (e.g., first user 102(1)) and not enabled (e.g., disabled) for the second payor (e.g., second user 102(2)). As used herein, a threshold may be "satisfied" by a value (e.g., a payment amount) if the value is equal to or greater than the threshold, or if the value is strictly greater than the threshold. Accordingly, payors may be incentivized to send personalized payments of higher payment amounts in order to unlock premium content items for personalizing the payments 134.

Another example factor that may influence differentiating personalized payment functionality across multiple payors is a time at which the PSS 110 receives a request from a payor's user device 104 to personalize a payment 134. For example, the PSS 110 may be configured to associate a timestamp with a request to personalize a payment 134 whenever the request is received from a user device 104, the timestamp corresponding to a time of receipt of the request. In this example, if the PSS 110 receives a first request to personalize the first payment 134(1) from the first user device 104(1) before the PSS 110 receives a second request to personalize the second payment 134(2) from the second user device 104(2), the personalized payment functionality may be selectively enabled for the first payor (e.g., first user 102(1)) and not enabled (e.g., disabled) for the second payor (e.g., second user 102(2)). Using the timestamp technique described above, if a first timestamp associated with the receiving of the first request precedes a second timestamp associated with the receiving of the second request, the personalized payment functionality may be selectively enabled for the first payor (e.g., first user 102(1)) and not enabled (e.g., disabled) for the second payor (e.g., second user 102(2)). In another example, if the payments are associated with an event, such as a fundraiser or a campaign, if the PSS 110 receives a first request to personalize the first payment 134(1) from the first user device 104(1) within a threshold time period measured from the start of the event (e.g., fundraiser, campaign, etc.), the personalized payment functionality may be selectively enabled for the first payor (e.g., first user 102(1)). Meanwhile, if the PSS 110 receives a second request to personalize the second payment 134(2) from the second user device 104(2) after the threshold time period expires, the personalized payment functionality may not be enabled (e.g., may be disabled) for the second payor (e.g., second user 102(2)). In these examples, the payors may be incentivized to personalize payments sooner rather than later in order to unlock premium content items for personalizing the payments 134.

Another example factor that may influence differentiating personalized payment functionality across multiple payors is a relationship (e.g., social connections) shared between a payor and a payee (e.g., mutual connections between the payor and the payee). For example, if the payee (e.g., third user 102(3)) is included in a shared first contact book of the first payor (e.g., first user 102(1)) as a contact in the first contact book, or vice versa, and if the payee (e.g., third user 102(3)) is not included in a shared second contact book of the second payor (e.g., second user 102(2)), or vice versa, the personalized payment functionality may be selectively enabled for the first payor (e.g., first user 102(1)) and not enabled (e.g., disabled) for the second payor (e.g., second user 102(2)). As another example, if a first number of mutual connections of the first payor (e.g., first user 102(1)) and the payee (e.g., third user 102(3)) satisfies a threshold number, and if a second number of mutual connections of the second payor (e.g., second user 102(2)) and the payee (e.g., third user 102(3)) fails to satisfy the threshold number, and/or if the first number of mutual connections is greater than the second number of mutual connections, the personalized payment functionality may be selectively enabled for the first payor (e.g., first user 102(1)) and not enabled (e.g., disabled) for the second payor (e.g., second user 102(2)). In some examples, "mutual connections" of a payor and a payee means user accounts 118 of the payment service 108 that have shared contact books that include respective identifiers (e.g., aliases, names, etc.) associated with both the payor and the payee. Accordingly, premium content items may be unlocked for payors who have a "close" relationship (or a "strong" social connection) with the payee.

Another example factor that may influence differentiating personalized payment functionality across multiple payors is an engagement with, and/or a level of engagement with, products of the payment service 108, such as the payment instrument 124 mentioned above. For example, since the first user 102(1) qualified for, and received, the payment instrument(s) 124 for use in association with the payment service 108, and if the second user 102(2) is not qualified for the payment instrument(s) 124, the personalized payment functionality may be selectively enabled for the first payor (e.g., first user 102(1)) and not enabled (e.g., disabled) for the second payor (e.g., second user 102(2)). As another example, if a first number of card transactions conducted by the first payor (e.g., first user 102(1)) using the payment instrument(s) 124 satisfies a threshold number, and if a second number of card transactions conducted by the second payor (e.g., second user 102(2)) fails to satisfy the threshold number, and/or if the first number of card transactions is greater than the second number of card transactions, the personalized payment functionality may be selectively enabled for the first payor (e.g., first user 102(1)) and not enabled (e.g., disabled) for the second payor (e.g., second user 102(2)). In these examples, the payors may be incentivized to engage with, and/or engage more with, products of the payment service 108, such as the payment instrument(s) 124, to unlock premium content items for personalizing the payments 134. Other example factors that may influence differentiating personalized payment functionality across multiple payors include user account characteristics (e.g., status, tier, ambassador, preference, usage level (e.g., payment volume, payment amounts, product/service usage, etc.), usage patterns (e.g., music listened to, items purchased, etc.), longevity of account, etc.), the content in the personalized screen 138 (e.g., which may tell a story or have a sequential or other contextual relationship).

In some examples, users 102 may pay for access to premium content items in the content item catalogue 116. For example, users 102 can make one-off purchases of individual premium content items. As another examples, users 102 may subscribe to a premium version of the payment service 108 to unlock premium content items for personalizing payments 134.

Examples of the customization user interface 136 will now be described with reference to FIGS. 4A-4G.

Figure 4A:
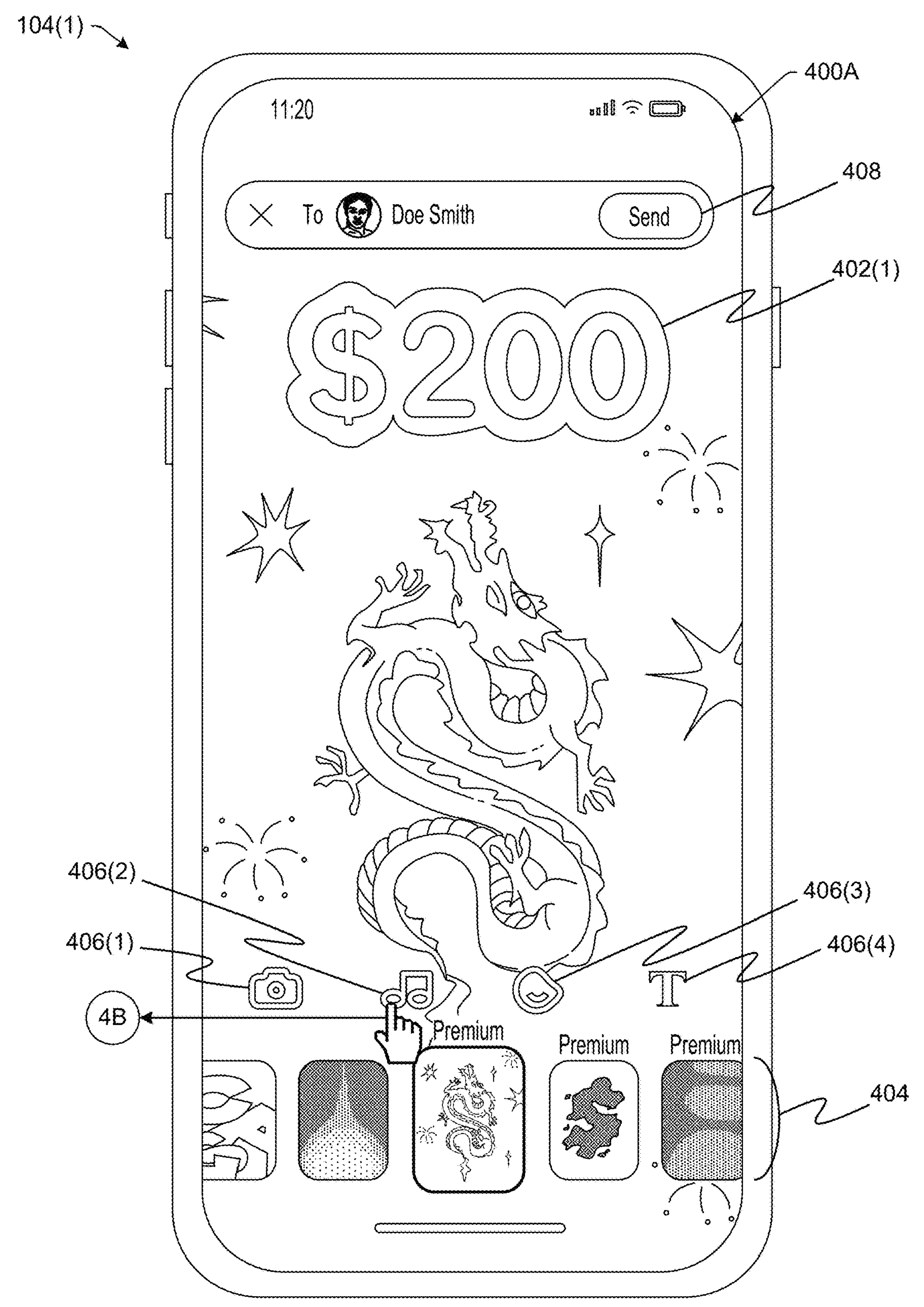
FIG. 4A is an example customization user interface from which a first payor is able to customize a first screen to be presented to the payee, according to an implementation of the present subject matter.

FIG. 4A is an example customization user interface 400A from which the first payor (e.g., first user 102(1)) is able to customize the first screen 138(1) to be presented to the payee (e.g., third user 102(3)), according to an implementation of the present subject matter. The customization user interface 400A may be the same as, or similar to, the customization user interface 136 depicted in FIG. 1 as being presented to the first payor (e.g., first user 102(1)) via the payment application 106. The customization user interface 400A may be displayed at any suitable time after the PSS 110 receives the first request from the first user device 104(1) to personalize the first payment 134(1). In some examples, the customization user interface 400A is displayed in response to the first user 102(1) interacting with (e.g., selecting) an interactive element of the payment application 106, such as in response to the first user 102(1) interacting with (e.g., selecting) an icon indicative of personalizing a payment 134.

The customization user interface 400A of FIG. 4A presents the first amount of the first payment 134(1), or first payment amount 402(1), in an artistic font. The customization user interface 400A of FIG. 4A also includes one or more interactive elements for customizing the first screen 138(1). For example, the customization user interface 400A includes multiple interactive elements 404 in a row along the bottom of the customization user interface 400A for selecting a background to customize the first screen 138(1) with the selected background. In the example of FIG. 4A, the first payor (e.g., first user 102(1)) may swipe left or right and/or interact with (e.g., select) individual ones of the interactive elements 404 to toggle between different backgrounds. The backgrounds are an example type of content item that may be available in the content item catalogue 116. In the example of FIG. 4A, the first payor (e.g., first user 102(1)) has selected the background in the middle of the row of interactive elements 404 along the bottom of the customization user interface 400A, which depicts a dragon in the center of the background with fireworks exploding in the sky around the dragon. Upon selecting the interactive element 404 corresponding to this particular background, the first screen 138(1) (presented via the customization user interface 400A) may be customized with the selected background as a preview for the first payor (e.g., first user 102(1)).

In the example of FIG. 4A, because the personalized payment functionality associated with customizing the first screen 138(1) has been selectively enabled for the first payor (e.g., first user 102(1)), the first payor (e.g., first user 102(1)) is able to customize the first screen 138(1) with one or more premium content items. For example, as shown in FIG. 4A, a subset of the interactive elements 404 are associated with premium backgrounds, which may be unavailable to other payors, such as the second payor (e.g., second user 102(2)). As described above, these premium content items may be unlocked for the first payor (e.g., first user 102(1)) based on various factors. In the example of FIG. 4A, the payment amount of $200 may satisfy a threshold, and, therefore, the personalized payment functionality may be selectively enabled for the first payor (e.g., first user 102(1)), which may unlock the premium content items (e.g., premium backgrounds) for the first payor.

In the example of FIG. 4A, the customization user interface 400A further includes interactive elements 406(1)-406(4) for customizing the first screen 138(1) with content items. For example, the first payor (first user 102(1)) may interact with (e.g., select) a first interactive element 406(1) to customize the first screen 138(1) with clips of video content (e.g., video shorts from movies, video shorts from television series, user-generated video content, etc.), photographs (e.g., movie scenes, scenes from television series, user-generated photographs, etc.), and/or the like. As another example, the first payor (first user 102(1)) may interact with (e.g., select) a second interactive element 406(2) to customize the first screen 138(1) with clips of audio content (e.g., music/songs, podcasts, audio books, sound bites from movies, sound bites from television series, sound bites of celebrities talking, etc.). As another example, the first payor (first user 102(1)) may interact with (e.g., select) a third interactive element 406(3) to customize the first screen 138(1) with stickers. As another example, the first payor (first user 102(1)) may interact with (e.g., select) a fourth interactive element 406(4) to customize the first screen 138(1) with a custom note(s) to the payee (e.g., third user 102(3)) from the first payor (e.g., first user 102(1)).

The customization user interface 400A may further include an interactive element 408 (e.g., a "Send" button) to proceed to the next step in sending the personalized first payment 134(1) to the payee (e.g., third user 102(3)) when the first payor (e.g., first user 102(1)) is finished customizing the first screen 138(1). In the example of FIG. 4A, before interacting with (e.g., selecting) the interactive element 408, the first user 102(1) (first payor) interacts with (e.g., selects) the second interactive element 406(2) to customize the first screen 138(1) with clips of audio content. In response to the PSS 110 receiving an indication that the first payor (e.g., first user 102(1)) interacted with (e.g., selected) the second interactive element 406(2), the PSS 110 may execute the payment personalization component 126 to present, in the customization user interface 400A, a list 410 of at least some of the audio content items available from the content item catalogue 116, which is shown in FIG. 4B.

Figure 4B:
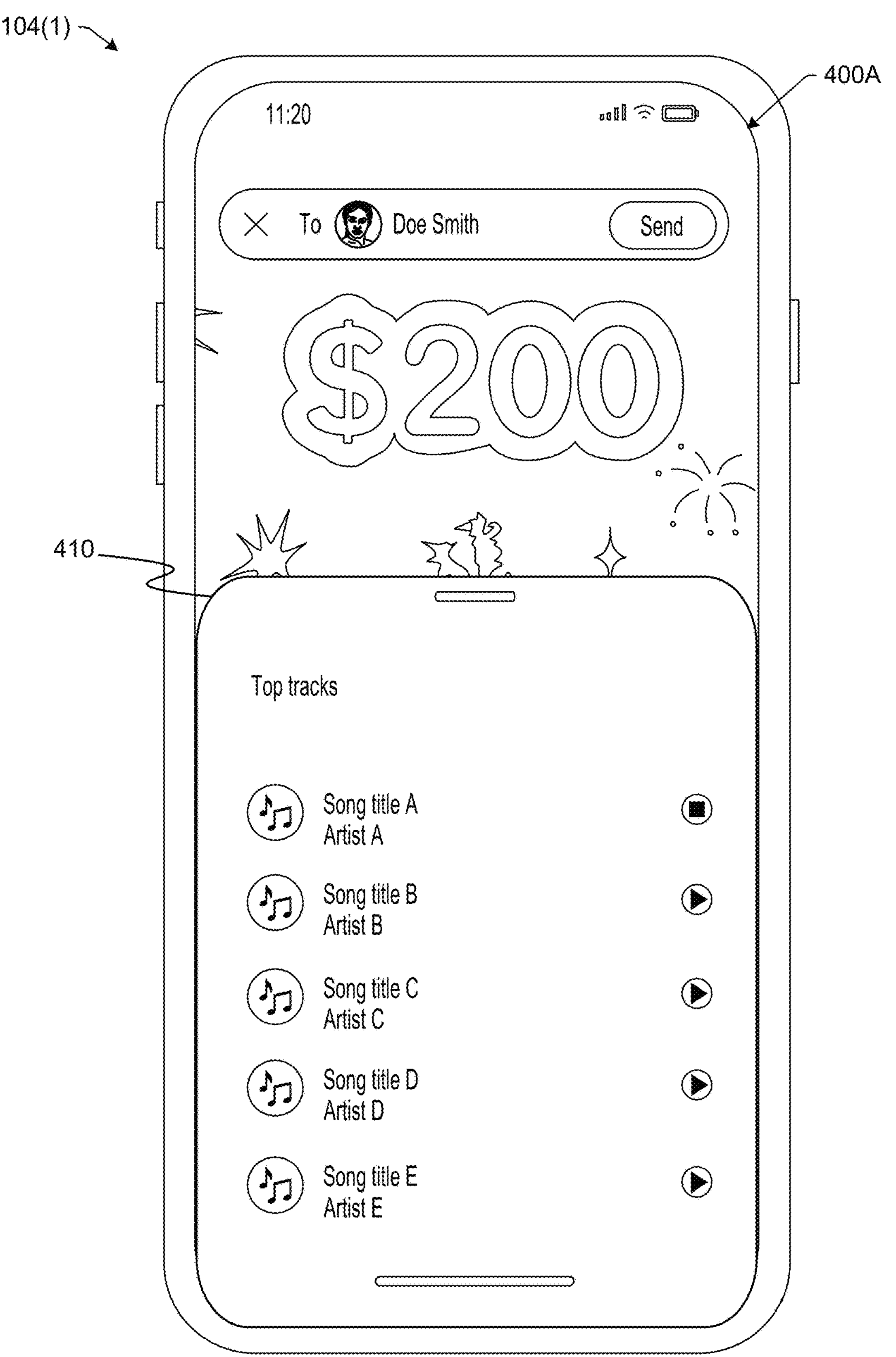
FIG. 4B depicts a list of audio content items presented in the customization user interface of FIG. 4A, the list of audio content items being selectable for customizing the first screen with one or more clips of audio content, according to an implementation of the present subject matter.

In the example of FIG. 4B, the list 410 includes audio content items in the form of songs from different artists. In some examples, the list 410 is populated with audio content items based at least in part on listening trends of the payee (e.g., third user 102(3)), listening trends of the first payor (e.g., first user 102(1)), the context of the first payment 134(1) (e.g., what the payment 134 is for, such as a birthday, a Christmas gift, etc.). In some examples, the first payor (e.g., first user 102(1)) may preview audio clips corresponding to the audio content items by interacting with (e.g., selecting) a "play" button next to each audio content item in the list 410. The first payor (e.g., first user 102(1)) may also select one or more of the audio content items in the list 410 to customize the first screen 138(1) with a clip(s) of audio content corresponding to the selected audio content item. As used herein, customizing a screen 138 with a clip(s) of audio content means that the clip(s) of audio content will be played back (e.g., output) via a speaker(s) of the payee's user device 104(1) when the screen 138 (and/or combined output including the screen 138) is displayed on the payee's user device 104(1). In some examples, the personalized payment functionality that is selectively enabled for the first payor (e.g., first user 102(1)) provides the first payor with access to longer clips of audio content, as compared to other payors for which the personalized payment functionality is not enabled (e.g., disabled). For example, the first payor (e.g., first user 102(1)) may have access to longer clips of audio content (e.g., 20-second audio clips), whereas the second payor (e.g., second user 102(2)) may not have access to these longer clips of audio content, but may still have access to shorter clips of audio content (e.g., 5-second audio clips).

Figure 4C:
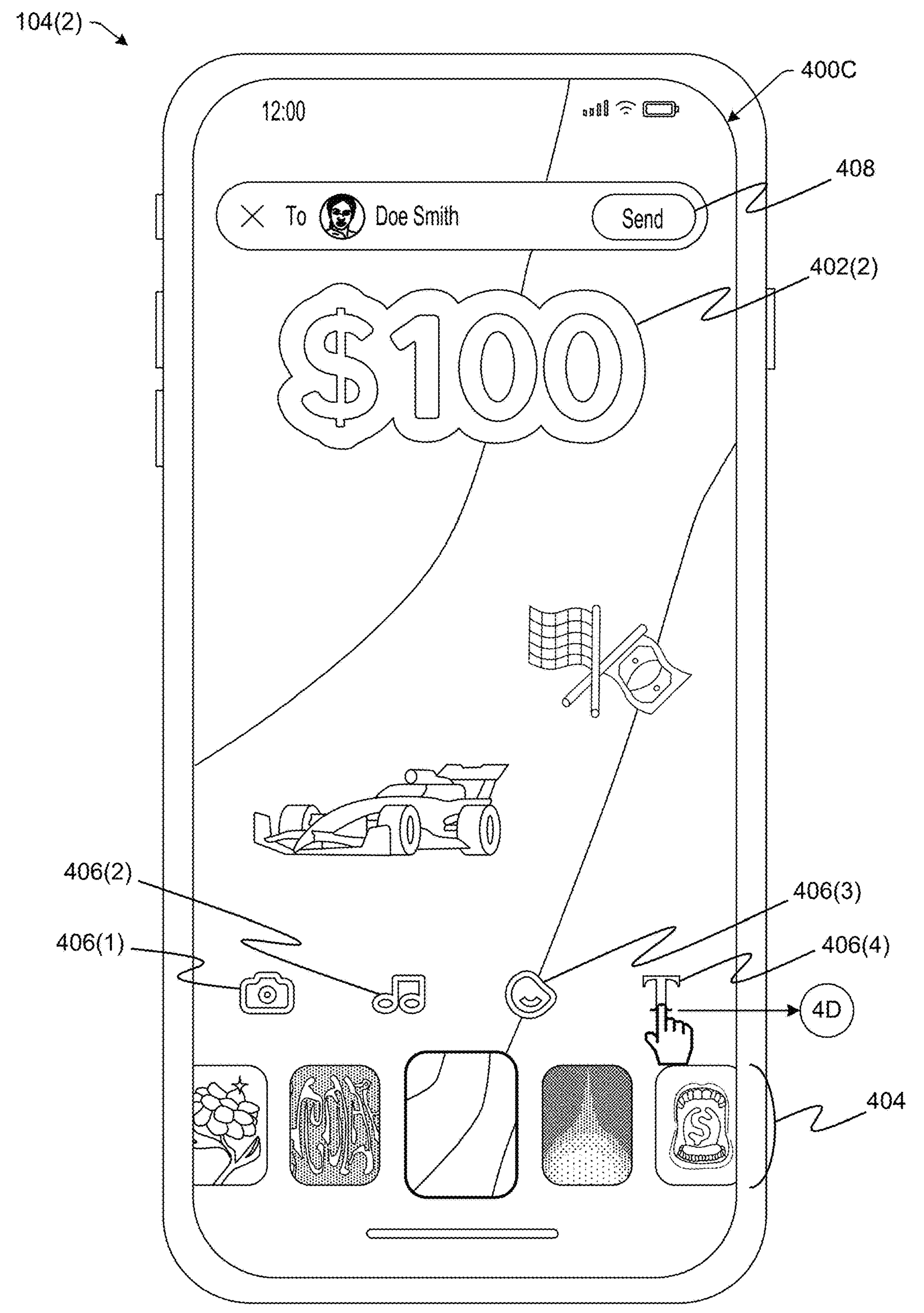
FIG. 4C is an example customization user interface from which a second payor is able to customize a second screen to be presented to the payee, according to an implementation of the present subject matter.

FIG. 4C is an example customization user interface 400C from which the second payor (e.g., second user 102(2)) is able to customize the second screen 138(2) to be presented to the payee (e.g., third user 102(3)), according to an implementation of the present subject matter. The customization user interface 400C may be the same as, or similar to, the customization user interface 136 depicted in FIG. 1 as being presented to the second payor (e.g., second user 102(2)) via the payment application 106. The customization user interface 400C may be displayed at any suitable time after the PSS 110 receives the second request from the second user device 104(2) to personalize the second payment 134(2). In some examples, the customization user interface 400C is displayed in response to the second user 102(2) interacting with (e.g., selecting) an interactive element of the payment application 106, such as in response to the second user 102(2) interacting with (e.g., selecting) an icon indicative of personalizing a payment 134.

The customization user interface 400C of FIG. 4C presents the second amount of the second payment 134(2), or second payment amount 402(2), in an artistic font. In contrast with first payment amount 402(1) presented in the customization user interface 400A, the second payment amount 402(2) is different than (e.g., less than) the first payment amount 402(1). The customization user interface 400C of FIG. 4C also includes similar interactive elements for customizing the second screen 138(2) as the interactive elements described above with respect to the customization user interface 400A. For example, the customization user interface 400C includes the multiple interactive elements 404 in a row along the bottom of the customization user interface 400C for selecting a background to customize the second screen 138(2) with the selected background. In contrast to the backgrounds available for selection in the customization user interface 400A of FIG. 4A, the backgrounds available to the second payor (e.g., second user 102(2)) exclude the premium backgrounds available to the first payor (e.g., first user 102(1). This may be because the personalized payment functionality associated with customizing the second screen 138(2) is not enabled (e.g., disabled) for the second payor (e.g., second user 102(2)). As described above, premium content items may be unlocked for the first payor (e.g., first user 102(1)) and locked for the second payor (e.g., second user 102(2)) based on various factors, such as the second payment amount 402(2) being less than the first payment amount 402(1), and/or the second payment amount 402(2) failing to satisfy a threshold. Therefore, the personalized payment functionality may not be enabled (e.g., may be disabled) for the second payor (e.g., second user 102(2)), which may keep the premium content items (e.g., premium backgrounds) locked and inaccessible to the second payor.

In the example of FIG. 4C, the customization user interface 400C also includes the interactive elements 406(1)-406(4) introduced above with respect to the customization user interface 400A of FIG. 4A. Accordingly, the second payor (e.g., second user 102(2)) may customize the second screen 138(2) with content items by interacting with (e.g., selecting) one or more of the interactive elements 406. In the example of FIG. 4C, before interacting with (e.g., selecting) the interactive element 408, the second user 102(2) (second payor) interacts with (e.g., selects) the fourth interactive element 406(4) to customize the second screen 138(2) with a custom note(s) to the payee (e.g., third user 102(3)) from the second payor (e.g., second user 102(2)). In response to the PSS 110 receiving an indication that the second payor (e.g., second user 102(2)) interacted with (e.g., selected) the fourth interactive element 406(4), the PSS 110 may execute the payment personalization component 126 to present, a user interface 400D enabling the second payor (e.g., second user 102(2)) to add a note to the payee (e.g., third user 102(3)), which is shown in FIG. 4D.

Figure 4D:
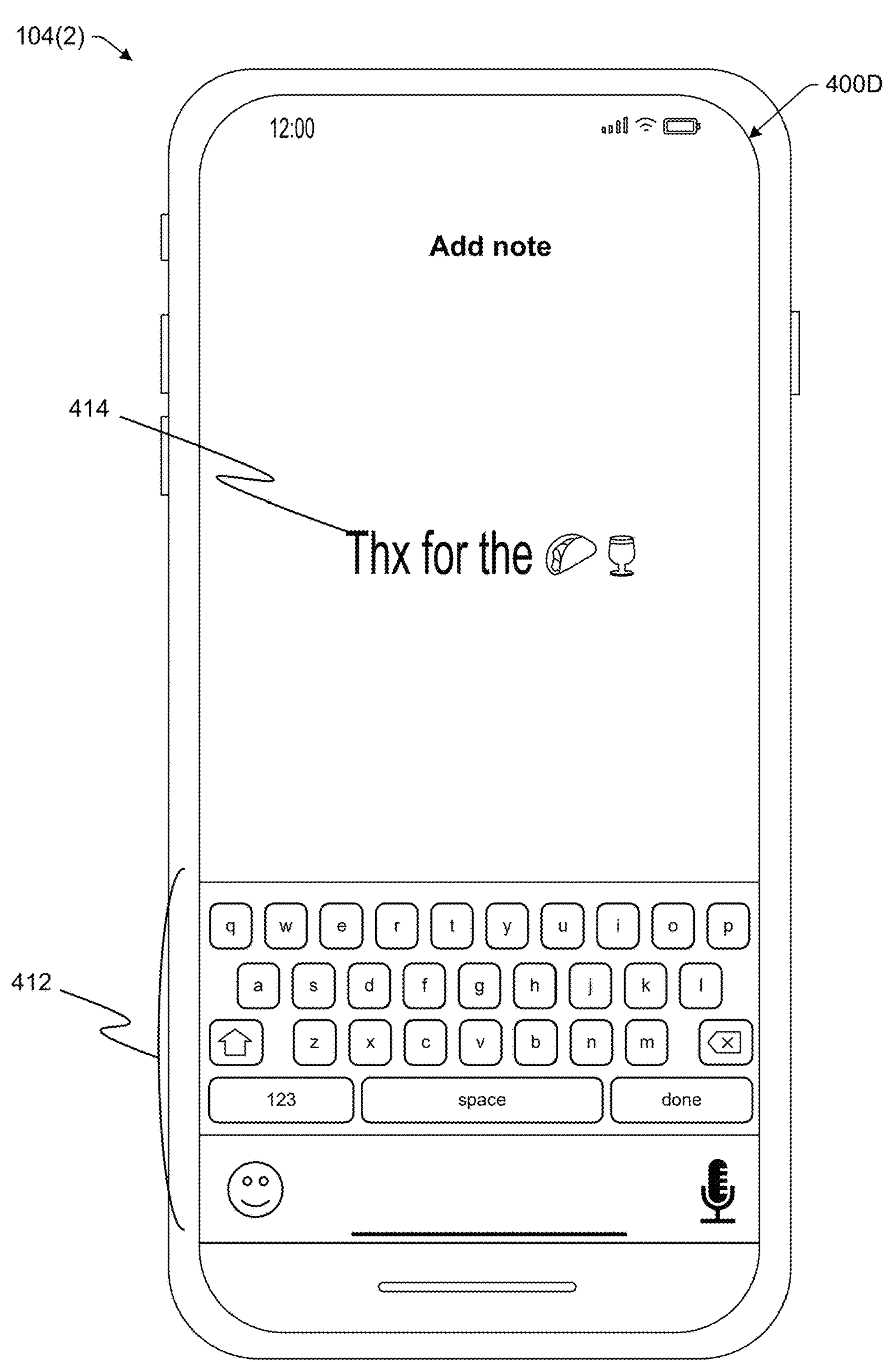
FIG. 4D is an example user interface presented in response to an interaction with an interactive element shown in FIG. 4C, the user interface of FIG. 4D enabling the second payor to add a note to the payee, according to an implementation of the present subject matter.
Figure 4E:
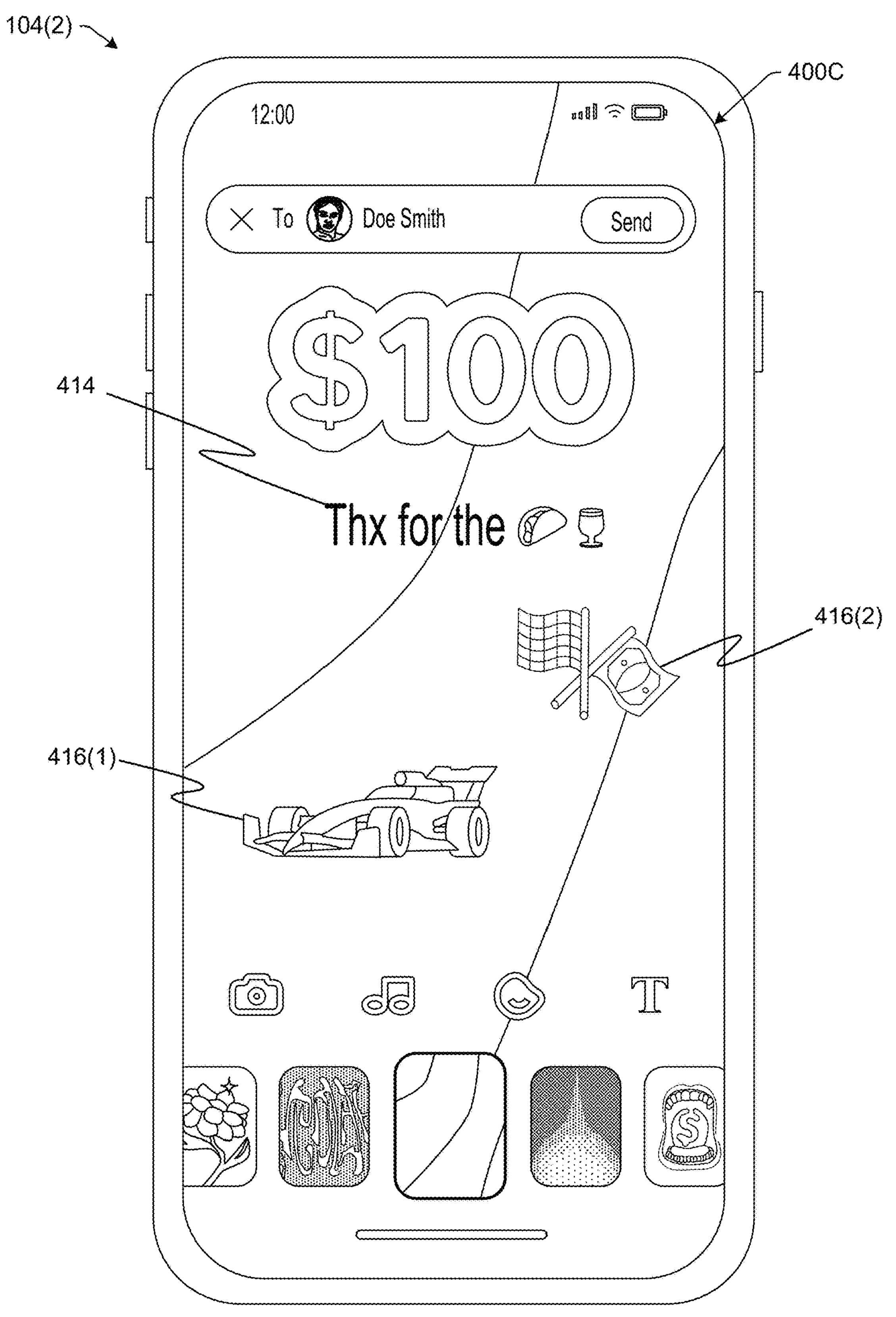
FIG. 4E is the example customization user interface of FIG. 4C, wherein the second screen has been customized with, among other things, the note to the payee from the second payor, according to an implementation of the present subject matter.

As shown in FIG. 4D, the user interface 400D may present a keyboard 412 for the second payor (e.g., second user 102(2)) to type a note(s) 414 to the payee (e.g., third user 102(3)), including emojis and/or other symbols. As shown by the "microphone" icon in the keyboard 412, the second payor (e.g., second user 102(2)) may additionally, or alternatively, speak to the second user device 104(2) to dictate the note 414. FIG. 4E shows the example customization user interface 400C of FIG. 4C with the second screen 138(2) customized by the second payor (e.g., second user 102(2)) with the note 414 to the payee (e.g., third user 102(3)) from the second payor. FIGS. 4C and 4E also show the example customization user interface 400C with the second screen 138(2) customized with stickers 416 selected by the second payor (e.g., second user 102(2)). For example, in response to the PSS 110 receiving an indication that the second payor (e.g., second user 102(2)) interacted with (e.g., selected) the third interactive element 406(3), the PSS 110 may execute the payment personalization component 126 to present a user interface enabling the second payor (e.g., second user 102(2)) select a sticker(s) 416 to customize the second screen 138(2) with the selected sticker(s) 416. In the examples of FIGS. 4C and 4E, the second payor (e.g., second user 102(2)) selected a first sticker 416(1) (e.g., a "race car sticker") and a second sticker 416(2) (e.g., a "racing flags sticker").

Figure 4F:
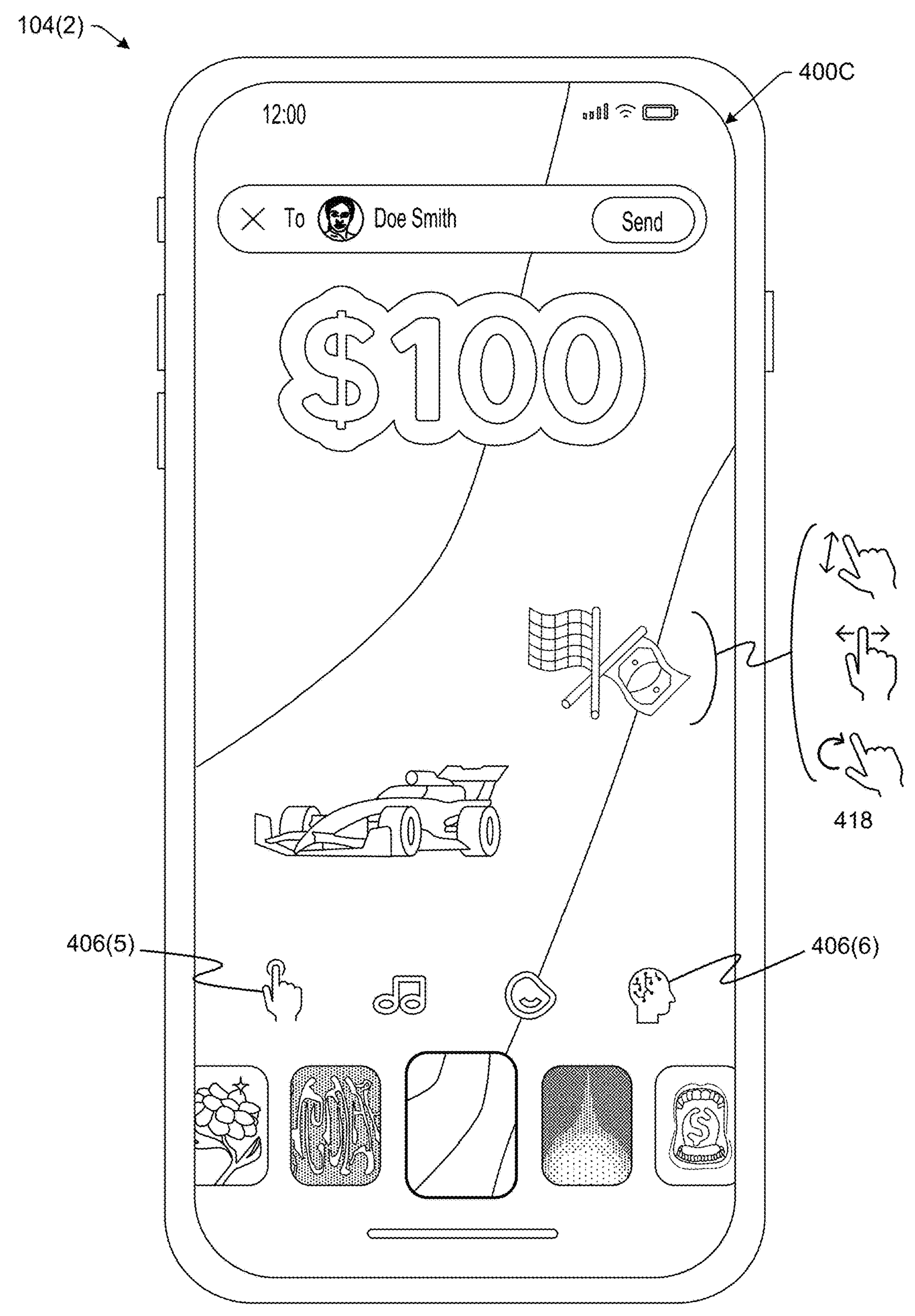
FIG. 4F is the example customization user interface of FIG. 4C with interactive elements for providing gestures to customize the second screen, and for customizing the second screen with, among other things, artificial intelligence (AI)-generated content, according to an implementation of the present subject matter.

FIG. 4F is the example customization user interface 400C with different interactive elements 406, as compared to the interactive elements 406 shown in FIG. 4C. For example, the customization user interface 400C includes a fifth interactive element 406(5) for providing gestures to customize the second screen 138(2), and a sixth interactive element 406(6) for customizing the second screen 138(2) with AI-generated content. Accordingly, if the second payor (e.g., second user 102(2)) interacts with (e.g., selects) the fifth interactive element 406(5), the PSS 110 may execute the payment personalization component 126 to recognize one or more gestures for customizing the second screen 138(2) with content items. For example, the payment personalization component 126 may use gesture recognition technology (e.g., software) to recognize gestures provided by payors, such as the second payor (e.g., the second user 102(2)) in the process of customizing the screen 138. For example, the second payor (e.g., second user 102(2)) may write or draw on the second screen 138(2) (e.g., by touching the display of the second user device 104(2) and writing or drawing words, objects, etc. while maintaining the touch contact of the display) to create user-generated content items, such as a virtual cloud in the background presented on the second screen 138(2). Additionally, or alternatively, the second payor (e.g., second user 102(2)) may utter spoken gestures with their voice to create user-generated content items. For example, the second payor (e.g., second user 102(2)) my say "add an airplane," which is captured by a microphone(s) of the second user device 104(2) and the corresponding audio data is processed by a speech recognition component of, or used by, the payment personalization component 126 to generate an object(s) (e.g., a virtual airplane) in background presented on the second screen 138(2).

In some examples, if the second payor (e.g., second user 102(2)) interacts with (e.g., selects) the sixth interactive element 406(6), the PSS 110 may execute the payment personalization component 126 to receive a prompt from the second payor (e.g., second user 102(2)), and to provide the prompt to an AI model(s) 128 (e.g., a generative AI model(s)) to generate one or more content items for customizing the second screen 138(2). For example, the AI model(s) 128 described herein can be, or include, generative AI models, such as large language models (LLMs), neural networks (e.g., generative adversarial networks (GANs)), and/or the like, which may be configured to generate text, audio, images, and/or other content as output. Accordingly, a generative AI model(s) can be used to generate a background, text (e.g., a note(s)), stickers, audio content, video content, image content, and/or the like, and the second screen 138(2) can be customized with the AI-generated content. In an illustrative example, the second payor (e.g., second user 102(2)) might select the sixth interactive element 406(6) and subsequently type (or speak) a prompt for a generative AI model(s) to generate a personalized background. In some examples, the second payor (e.g., second user 102(2)) might prompt the generative AI model(s) with information about the payee (e.g., third user 102(3)) known to the second payor (e.g., second user 102(2)). For instance, the second payor (e.g., second user 102(2)) may prompt the generative AI model(s) with the following prompt: "can you help me draft a message for Doe?" In this example, the generative AI model(s) may output an AI-generated message for the payee (named Doe). In another example, the second payor (e.g., second user 102(2)) may prompt the generative AI model(s) with the following prompt: "can you help me create a design for Doe?" In this example, the generative AI model(s) may output an AI-generated design (e.g., for a background, a sticker(s), etc.) that can be added to the second screen 138(2). In some examples, the second payor (e.g., second user 102(2)) may prompt the generative AI model(s) to embed a history relating to the second payor (e.g., second user 102(2)) and/or the payee (e.g., third user 102(3)), such as a photo of the second payor (e.g., second user 102(2)) and/or the payee (e.g., third user 102(3)). In some examples, the second payor (e.g., second user 102(2)) may prompt the generative AI model(s) to generate a note for the payee (e.g., third user 102(3)) as a recommendation for spending the funds that the payee will receive via the second payment 134(2) (e.g., a recommendation to spend the funds at a favorite merchant (e.g., restaurant, retailer, etc.) of the payee, which may be determined, by the generative AI model(s), from a user profile of the payee, transaction history data associated with the payee, and/or the like. In this example, if the AI-generated note added to the second screen 138(2) is a recommendation to spend the funds at a particular merchant, and if the payee (e.g., third user 102(3)) orders an item(s) (e.g., a product or a service) from that particular merchant (e.g., within a threshold time period of receiving the personalized payment), the payment service 108 may provide an incentive (e.g., a discount, a loyalty bump, etc.) to an account of the payee (e.g., third user 102(3)). In some examples, a generative AI model(s) may output multiple different options for content items that may be added to second screen 138(2). For example, if the second payor (e.g., second user 102(2)) prompts the generative AI model(s) to create a background for the second screen 138(2), the generative AI model(s) may output two options, three options, four options, etc. of backgrounds from which the second payor (e.g., second user 102(2)) can select a desired background to customize the second screen 138(2).

FIG. 4F also illustrates how the second payor (e.g., second user 102(2)) can reposition, resize, and/or change the orientation of content items (e.g., stickers 416) that have been added to the second screen 138(2) (See reference numeral 418 in FIG. 4F). This allows the second payor (e.g., second user 102(2)) to further curate the appearance of the second screen 138(2). For example, the second payor (e.g., second user 102(2)) may curate the second screen 138(2) by adjusting a size of a content item (e.g., increasing or decreasing a size of a sticker(s) 416), adjusting an orientation of the content item (e.g., rotating a sticker(s) 416 clockwise or counterclockwise), and/or adjusting a position of a content item (e.g., repositioning a sticker(s) 416 on the background). As another example, the second payor (e.g., second user 102(2)) may curate the second screen 138(2) may changing colors of content items (e.g., backgrounds, stickers, etc.).

Figure 4G:
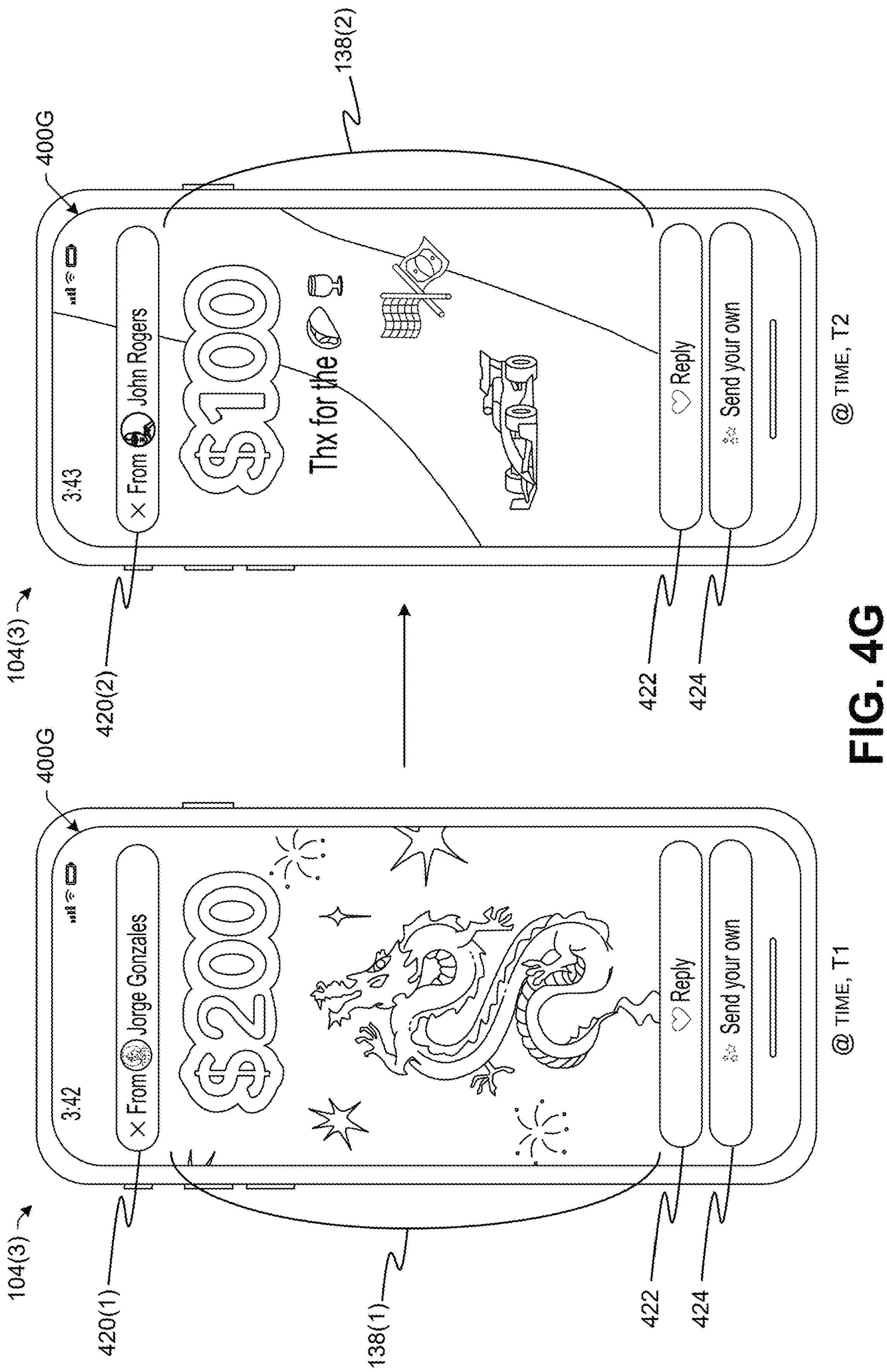
FIG. 4G is an example user interface displaying combined output to the payee by displaying the first screen and the second screen in a sequence, according to an implementation of the present subject matter.

FIG. 4G is an example user interface 400G displaying combined output 140 to the payee (e.g., third user 102(3)) by displaying the first screen 138(1) and the second screen 138(2) in a sequence, according to an implementation of the present subject matter. For example, at time, T1, as depicted on the left side of FIG. 4G, after the payee (e.g., third user 102(3)) has opened the payment application 106 on their user device 104(3), the PSS 110 may execute the payment personalization component 126 to cause the combined output 140 to be displayed via the user interface 400G of the payment application 106 executing on the user device 104(3) of the payee (e.g., third user 102(3)). The user interface 400G may be the same as, or similar to, the user interface 142 shown in FIG. 1.

As shown on the left side of FIG. 4G, at time, T1, the first screen 138(1) customized by the first payor (e.g., first user 102(1)) may be displayed to the payee (e.g., third user 102(3)) with an indicator 420(1) indicating that the first payment 134(1) and/or the first screen 138(1) is from the first payor (e.g., first user 102(1)). In some examples, a communication channel(s) is created for at least some of the payors (e.g., at least the first payor (e.g., first user 102(1))) and the payee (e.g., third user 102(3)) to communicate. In some examples, the payment personalization component 126 of the PSS 110 may be executed to create the communication channel(s). Accordingly, the user interface 400G may further include a first interactive element 422 (e.g., a "Reply" button) for the payee (e.g., third user 102(3)) to utilize the communication channel(s). The communication channel(s) that is created can be any suitable communication channel(s) including a text communication channel(s) (e.g., short message service (SMS) text, rich communication service (RCS) text, etc.), an email communication channel(s), an in-app communication channel (e.g., a first-party application (e.g., payment application 106) communication channel, a third-party application communication channel, etc.), and/or the like. For example, the communication channel(s) may be created for the first payor (e.g., first user 102(1)) and the payee (e.g., third user 102(3)) to communicate with each other. In some examples, the communication channel(s) may be created for the first payor (e.g., first user 102(1)), the second payor (e.g., second user 102(2)), and the payee (e.g., third user 102(3)), and possibly one or more additional payors, to communicate as a group. Accordingly, if the payee (e.g., third user 102(3)) interacts with (e.g., selects) the first interactive element 422 (e.g., the "Reply" button), the payee (e.g., third user 102(3)) may write a message to the first payor (e.g., first user 102(1)) and/or the second payor (e.g., second user 102(2)), and/or possibly one or more additional payors, in either a direct communication or a group communication. The user interface 400G is also shown as including a second interactive element (e.g., a "Send your own" button) for the payee (e.g., third user 102(3)) to customize their own screen 138 for a payment 134 from the payee (e.g., third user 102(3)) to another user 102 of the payment service 108, as described herein.

As shown on the right side of FIG. 4G, at time, T2 (after time, T1), the second screen 138(2) customized by the second payor (e.g., second user 102(2)) may be displayed to the payee (e.g., third user 102(3)) with an indicator 420(2) indicating that the second payment 134(2) and/or the second screen 138(2) is from the second payor (e.g., second user 102(2)). The payee (e.g., third user 102(3)) may have the option to interact with (e.g., select) the interactive elements 422 and/or 424 at time, T2, as well. The transition from time, T1, to time, T2, may occur based on a passage of time (e.g., an expiration of a predetermined time period, such as a first duration for which the first screen 138(1) is displayed), and/or based on a gesture received by the user device 104(3) from the payee (e.g., third user 102(3)), such as a swipe gesture, a tap gesture, a voice command (e.g., the payee uttering the word "Next"), or any other suitable gesture.

In some examples, the combined output 140 is displayed via the user interface 400G by displaying the first screen 138(1) and the second screen 138(2) in a sequence determined based on various factors, as described herein, and/or the combined output 140 is displayed via the user interface 400G by displaying the first screen 138(1) for the first duration and displaying the second screen 138(2) for the second duration. For example, the payee (e.g., third user 102(3)), upon opening the payment application 106, may see the first screen 138(1) customized by the first payor (e.g., first user 102(1)), which may be displayed for a first duration (e.g., 10 seconds), while listening to a clip of audio content selected by the first payor (e.g., first user 102(1)) being output via the speaker(s) of the payee's user device 104(3). After the first screen 138(1) is displayed for the first duration, the payee (e.g., third user 102(3)) may see the second screen 138(2) customized by the second payor (e.g., second user 102(2)), which may be displayed for a second duration (e.g., 5 seconds), while listening to a clip of audio content selected by the second payor (e.g., second user 102(2)), and so on and so forth for any number of payors whose payments 134 are associated and whose screens 138 are combined to generate the combined output 140. As described herein, transitions between screens 138 may be added to, for example, fade out of one screen 138 and fade into another, fade out of one audio clip and fade into another, etc. Additionally, or alternatively, the payee (e.g., third user 102(3)) may experience haptic feedback via their user device 104(3), and/or animations, 3D effects, and/or the like. In some examples, the combined output 140 may be displayed in a carousel, transitioning left-to-right, right-to-left, top-to-bottom, and/or bottom-to-top from one screen 138 to the next.

Figure 5A:
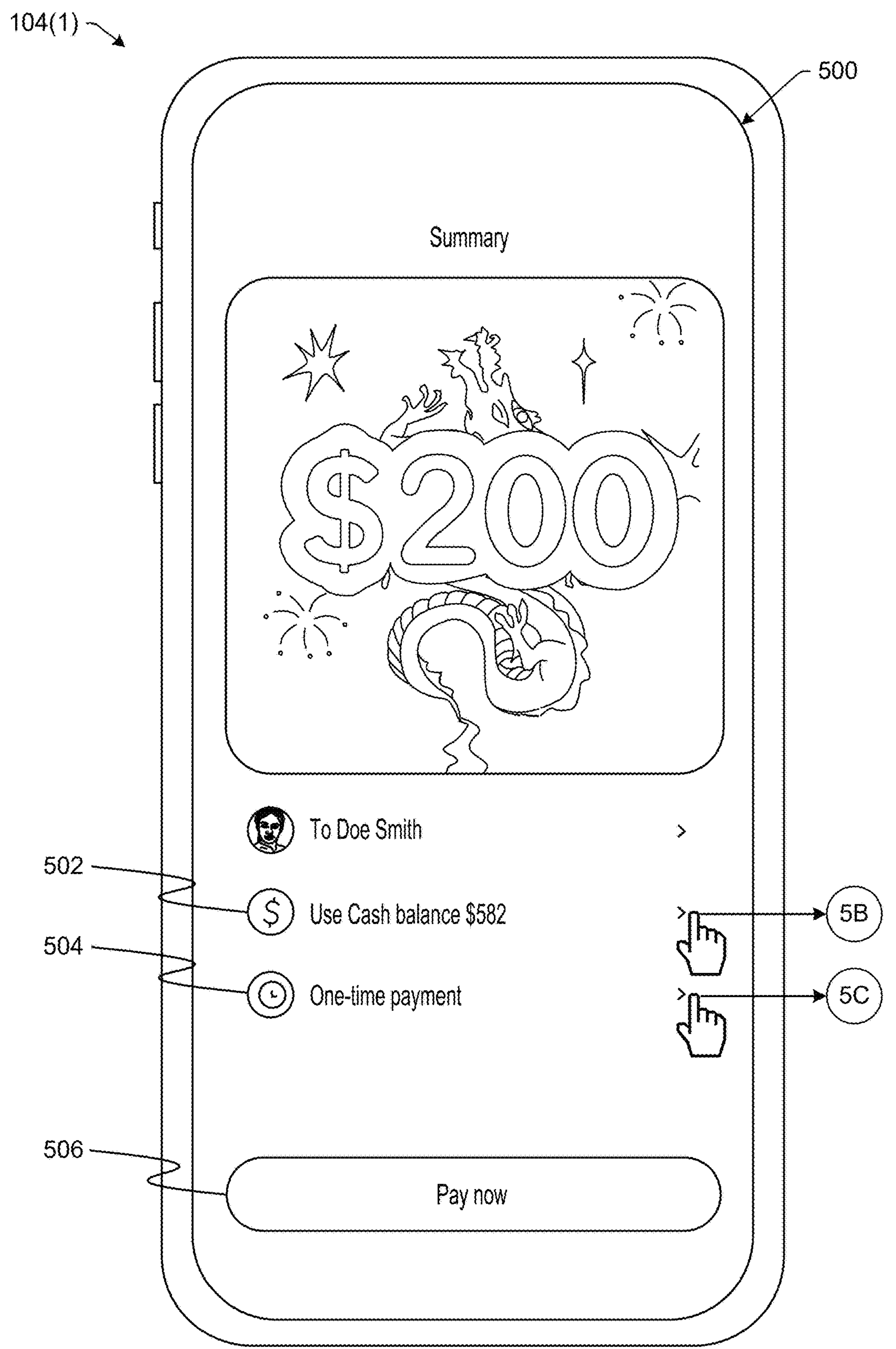
FIG. 5A is an example user interface of the payment application that presents a summary of a personalized payment created by the first payor, according to an implementation of the present subject matter.

With reference again to the customization of a screen 138 via the customization user interface 136, once a payor is finished customizing the screen 138 for a personalized payment, the payor may interact with (e.g., select) the interactive element 408 (e.g., a "Send" button), as shown in FIG. 4A and in FIG. 4C, to proceed to the next step in sending the personalized first payment 134(1) to the payee (e.g., third user 102(3)). For example, in response to the PSS 110 receiving an indication that the first payor (e.g., first user 102(1)) interacted with (e.g., selected) the interactive element 408 of the customization user interface 400A, the PSS 110 may execute the payment processing component 130 to present the user interface 500 shown in FIG. 5A. The example user interface 500 of the payment application 106 presents a summary of a personalized payment created by the first payor (e.g., first user 102(1)), according to an implementation of the present subject matter.

Figure 5B:
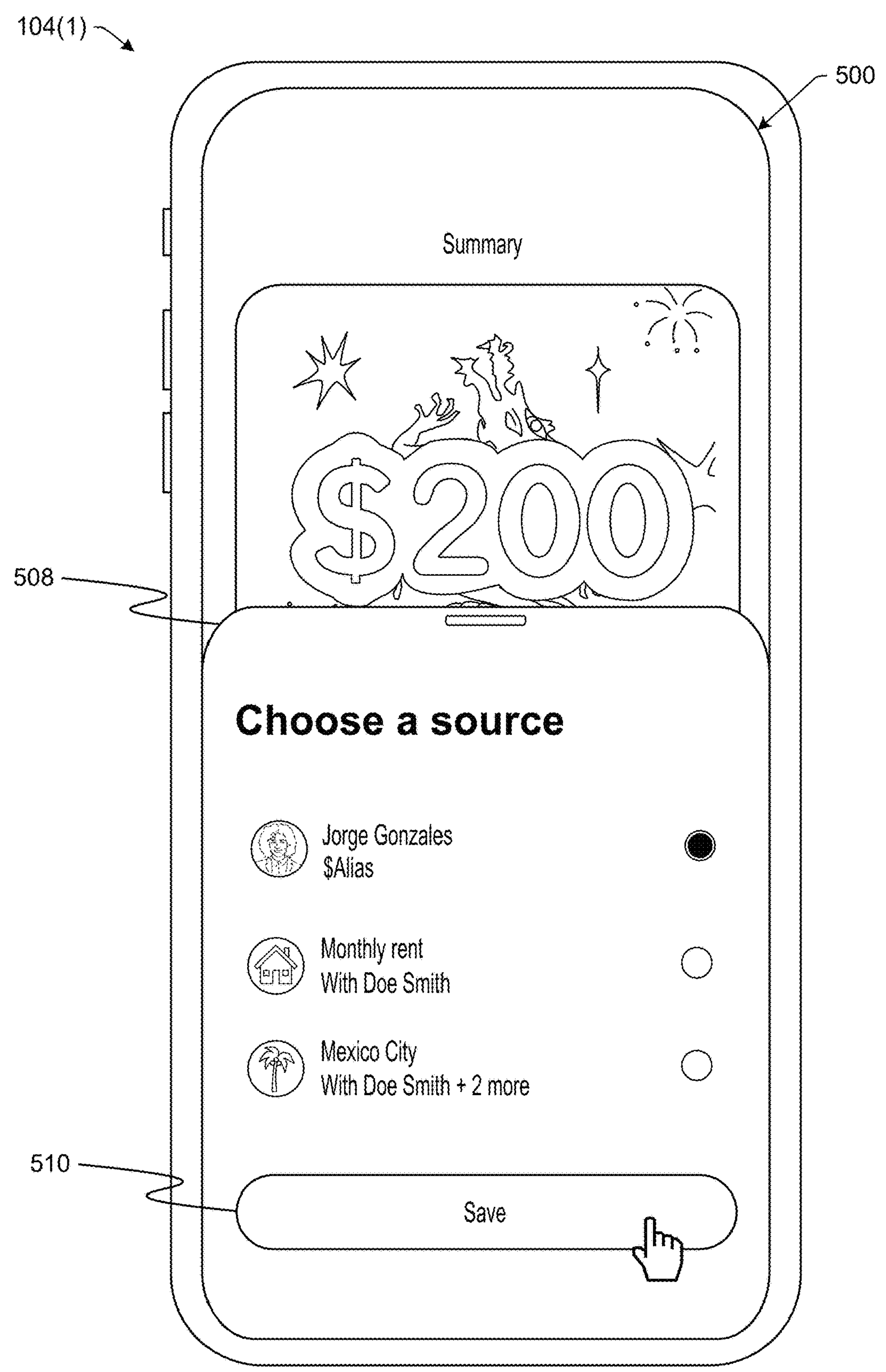
FIG. 5B depicts a list of payment sources presented in the user interface of FIG. 5A, the list of payment sources being selectable for the first payor to choose a source of the personalized payment, according to an implementation of the present subject matter.

The user interface 500 includes an interactive element 502 for selecting and/or changing a payment source. In response to the PSS 110 receiving an indication that the first payor (e.g., first user 102(1)) interacted with (e.g., selected) the interactive element 502 of the user interface 500, the PSS 110 may execute the payment processing component 130 to present a list 508 of payment sources that are selectable for the first payor (e.g., first user 102(1)) to choose a source of the personalized payment. Individual payment sources in the list 508 may correspond to individual financial accounts associated with the user account 118 of the first payor (e.g., first user 102(1)). Additionally, or alternatively, individual payment sources in the list 508 may correspond to different types of accounts (e.g., a personal account, a business account, etc.) setup by the first payor (e.g., first user 102(1)). In the example of FIG. 5B, the first payor (first user 102(1)) selects a first payment source in the list 508 and interacts with (e.g., selects) an interactive element 510 (e.g., a "Save" button) to select the first payment source for the first payment 134(1).

Figure 5C:
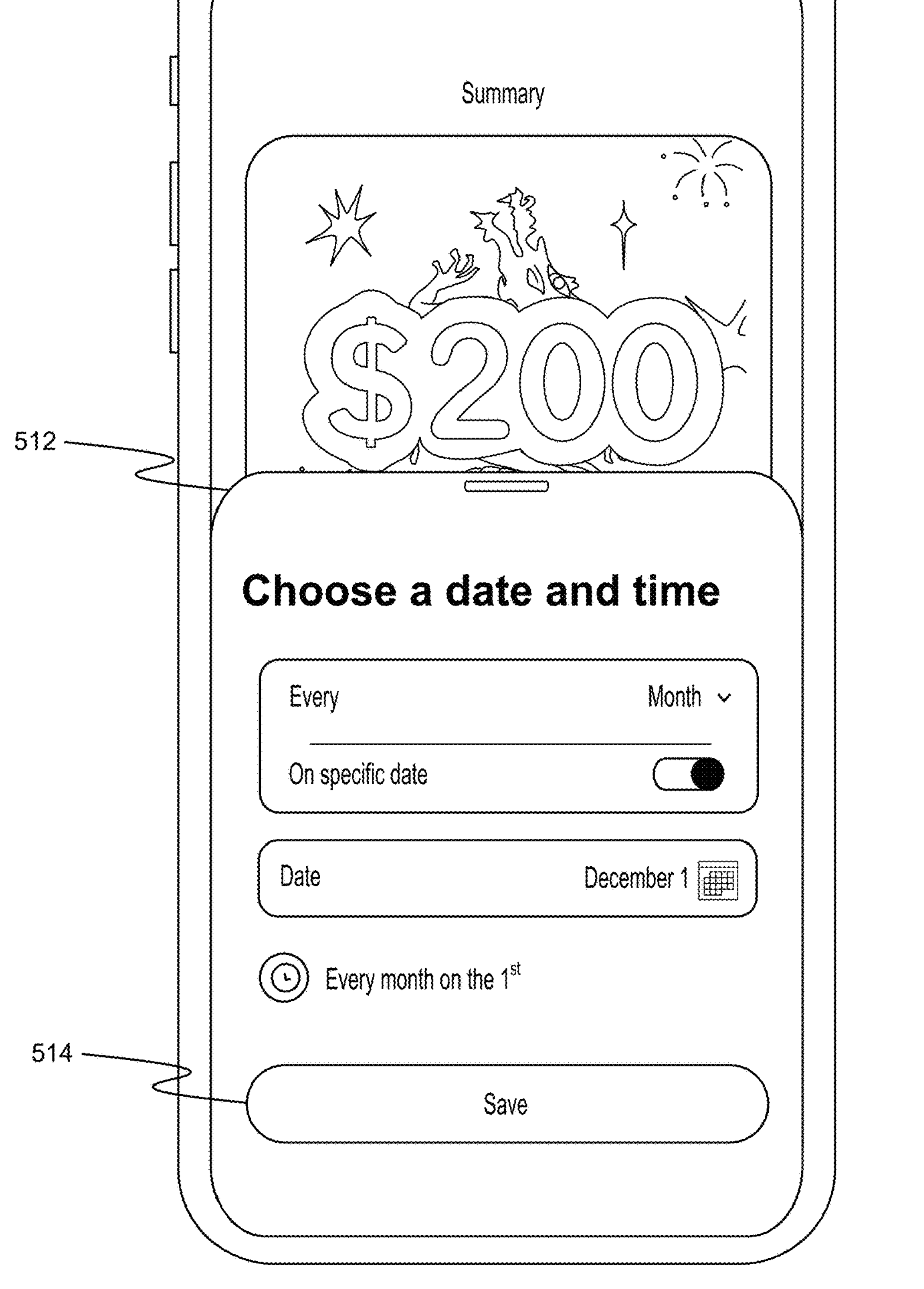
FIG. 5C depicts interactive elements presented in the user interface of FIG. 5A, the interactive elements for controlling the timing of the personalized payment, and for controlling whether the personalized payment is a one-time payment or a recurring payment, according to an implementation of the present subject matter.

With reference again to FIG. 5A, the user interface 500 further includes an interactive element 504 for controlling the timing of the personalized payment, and for controlling whether the personalized payment is a one-time payment or a recurring payment, according to an implementation of the present subject matter. In response to the PSS 110 receiving an indication that the first payor (e.g., first user 102(1)) interacted with (e.g., selected) the interactive element 504 of the user interface 500, the PSS 110 may execute the payment processing component 130 to present a control panel 512 for the first payor (e.g., first user 102(1)) to choose a frequency (e.g., weekly, monthly, yearly, etc.), and/or to select a specific date for the first payment 134(1). In the example of FIG. 5C, the first payor (first user 102(1)) selects a monthly frequency and a specific date of December 1$^{st}$ via the control panel 512, and subsequently interacts with (e.g., selects) an interactive element 514 (e.g., a "Save" button) to save the timing data for the first payment 134(1).

With reference again to FIG. 5A, the user interface 500 further includes an interactive element 506 (e.g., a "Pay now" button) to submit the first payment 134(1). In response to the PSS 110 receiving an indication that the first payor (e.g., first user 102(1)) interacted with (e.g., selected) the interactive element 506 of the user interface 500, the PSS 110 may receive the first screen 138(1) (and payment data associated with the first payment 134(1), such as a destination identifier, the first payment amount 402(1), the timing data for the first payment 134(1), etc.) from the first user device 104(1). Similarly, the PSS 110 receives the second screen 138(2) (and payment data associated with the second payment 134(2)) from the second user device 104(2) in response to the second payor (e.g., second user 102(2)) interacting with (e.g., selecting) the interactive element 506 of the user interface 500 presented to the second payor via the payment application 106.

With reference again to FIG. 1, the PSS 110 is shown as receiving, from the first user device 104(1), the first screen 138(1) customized by the first payor (e.g., first user 102(1)), and, from the second user device 104(2), the second screen 138(2) customized by the second payor (e.g., second user 102(2)). Although the example of FIG. 1 illustrates an example where the PSS 110 receives two screens 138(1) and 138(2) from different payors, any number of screens 138 may be received by the PSS 110, depending on the number of payors making payments 134 and customizing screens 138 to personalize those payments 134. For instance, the PSS 110 may receive tens of screens 138, hundreds of screens 138, thousands of screens 138, and so on, depending on the number of users 102 on the platform and how many of those users 102 are personalizing their payments 134 at any given time. Additionally, or alternatively, an individual user 102 may customize multiple screens 138 in association with a single payment 134. For example, the first user 102(1) (e.g., first payor) may customize a first screen 138 with a note that says "Happy," a second screen 138 with a note that says "Birthday," and a third screen 138 with a note that says "Sister." In this example, the payee may receive the full message when the multiple screens 138 customized by the first user 102(1) are displayed in sequence. In some examples, a user 102 that customizes multiple screens may allocate a portion of the payment 134 to each screen 138. For example, a payment amount of $300 may be allocated across three screens 138 as $100 per screen 138.

In some examples, the PSS 110 may execute the payment personalization component 126 to determine which payments 134 to associate together to facilitate multi-user content personalization. In some examples, the payment personalization component 126 uses destination identifiers, tags, and/or group data objects 120 to determine when to associate payments 134 together and which payments 134 to associate together. In one example, the payee (e.g., third user 102(3)) may have previously segmented their existing alias that they use for sending/receiving payments via the PSS 110 to create a segmented alias associated with multiple different destination identifiers, and one of those destination identifiers may be designated for receiving multi-user content personalization. In an illustrative example where the third user 102(3) is expecting a baby and is receiving payments 134 from friends, coworkers, etc. as baby shower gifts, the third user 102(3) may segment their existing alias to create a segmented alias associated with multiple destination identifiers including a destination identifier that is specific to, or designated for, the baby shower event. In some examples, the payee (e.g., third user 102(3)) may create a sub-alias for this destination identifier, such as "$MyBabyShower," so that payors (e.g., the first user 102 (1), the second user 102(2), etc.) can readily identify the destination identifier (e.g., sub-alias) to include in their request to personalize their payment 134. Accordingly, the payors (e.g., the first user 102(1), the second user 102(2), etc.) may submit requests to personalize their payments 134 with a particular destination identifier (e.g., the destination identifier that is specific to the baby shower) included in those requests so that the PSS 110 can determine, from the destination identifier in the requests, that the payments 134 are to be associated with each other. For instance, in the example of FIG. 1, the first request to personalize the first payment 134(1) may include a destination identifier, and the second request to personalize the second payment 134(2) may also include the same destination identifier. In this example, the PSS 110 associates the first payment 134(1) with the second payment 134(2) based at least in part on the destination identifier being included in the first request and the second request. Additionally, or alternatively, a payee may create a new alias for receiving multi-user content personalization. In this way, payors may send their payments 134 to the new alias, and the PSS 110 may associate multiple payments 134 that are being sent to the new alias.

In another example, the payee (e.g., third user 102(3)) may have previously tagged their existing alias that they use for sending/receiving payments via the PSS 110 with a tag that is selectable by payors when personalizing their payments 134. In the illustrative example described above where the third user 102(3) is expecting a baby and is receiving payments 134 from friends, coworkers, etc. as baby shower gifts, the third user 102(3) may create a tag for the baby shower via the payment application 106. Accordingly, when payors submit requests to personalize their payments 134 for the payee (e.g., third user 102(2)), the payors can select the tag, which may be surfaced via the payment application 106. In this way, the PSS 110 can determine, from the requests where the tag has been selected, that the payments 134 are to be associated with each other. For instance, in the example of FIG. 1, the first payor may select a tag (e.g., a tag for the baby shower) when requesting to personalize the first payment 134(1), and the second payer may select the same tag when requesting to personalize the second payment 134(2). In this example, the PSS 110 associates the first payment 134(1) with the second payment 134(2) based at least in part on that tag being selected in association with, or otherwise included in, the first request and the second request.

In yet another example, group data objects 120 may be created and stored in the datastore(s) 114 for use in associating payments 134 together to facilitate multi-user content personalization. Group data objects 120 may be generated to associate multiple user accounts 118 as a group of users 102. User accounts 118 may be associated with a group data object 120 in various ways. For example, physical location data of user devices 104 may be queried and received, and this physical location data may be utilized to determine if users 102 are proximate to each other. When user devices 104 are near each other and all have an instance of the payment application 106 residing thereon, such data may be utilized as a signal for determining whether to associate user accounts 118 with a group data object 120. Other signals may include, for example, transaction data indicating user accounts 118 have engaged in one or more prior transactions with each other, data indicating social relationships been users 102 of the user accounts 118, data indicating that an event is associated with the physical location where the user devices 104 are located or an event associated with the user accounts 118, data indicating prior user account groupings, data indicating the users 102 have similar interests, data determined from AI model 128 output indicating a likelihood that the user accounts 118 should be associated with a group data object 120. In some examples, group data objects 120 are created by groups of users 102 who explicitly request, via the payment application 106, to be grouped together. For example, a user 102 who is organizing a campaign or a fundraiser may create a group and invite other users 102 to be members of the group, in which case, a group data object 120 may be created for the campaign or the fundraiser to associate user accounts 118 of users 102 who are members of the group. In this example, the PSS 110 may determine, from the group data objects 120 stored in the datastore(s) 114, that certain payments 134 are to be associated with each other. For instance, in the example of FIG. 1, the PSS 110 may determine that a first user account 118 associated with the first payor (e.g., first user 102(1)) is associated with a group data object 120, and that a second user account 118 associated with the second payor (e.g., second user 102(1)) is associated with the same group data object 120. Accordingly, the PSS 110 associates the first payment 134(1) with the second payment 134(2) based at least in part on the group data object 120 that associates the first user account 118 and the second user account 118.

In some examples, the PSS 110 may automatically (without any user input indicating a particular destination/recipient) associate payments 134 together for facilitating multi-user content personalization. This intelligence and/or automation offers improvements over conventional payment service systems.

For payments 134 that are associated together, the PSS 110 may execute the payment personalization component 126 to combine the screens 138 associated with those payments 134. For example, if the PSS 110 associates the first payment 134(1) with the second payment 134(2), the PSS 110 may combine the first screen 138(1) and the second screen 138(2) to generate combined output 140. In some examples, combining the first screen 138(1) and the second screen 138(2) to generate the combined output 140 involves stitching together the first screen 138(1) and the second screen 138(2) such that the screens 138 are displayable, on the payee's user device 104(3), in a particular sequence (e.g., displaying the first screen 138(1) and subsequently displaying the second screen 138(2)) and/or for particular durations or amounts of "screen time" (e.g., displaying the first screen 138(1) for a first duration and displaying the second screen 138(2) for a second duration, which may be different than the first duration). In some examples, the order in which screens 138 are presented in a sequence and/or the durations or amounts of "screen time" for which the screens 138 are presented is/are controlled by providing differentiated personalized payment functionality across multiple users, as described above. For example, if a personalized payment functionality is selectively enabled for the first payor (e.g., first user 102(1)), and if the same personalized payment functionality is not enabled (e.g., is disabled) for the second payor (e.g., second user 102(2)), the functionality (enabled for the first payor and not the second payor) allows the first screen 138(1) to be displayed (via a user interface 142 of the payment application 106 executing on the payee's user device 104(3)) before the second screen 138(2) is displayed (via the user interface 142). As another example, the functionality (enabled for the first payor and not the second payor) may allow the first screen 138(1) to be displayed via the user interface 142 for a first duration that is greater (or longer) than a second duration for which the second screen 138(2) is displayed via the user interface 142. Accordingly, the factors that influence the sequence in which screens 138 are presented to the payee and/or the durations for which screens 138 are presented to the payee may be similar to those discussed above, such as factors including payment amount (e.g., the first payment amount 402(1) of $200 and the second payment amount 402(2) of $100 may cause the first screen 138(1) to be displayed earlier in a sequence and/or for a longer duration than the second screen 138(2) is displayed), the respective times of receipt of the respective requests from the payors' user devices 104 to personalize the respective payments 134, the respective times of receipt of the respective screens 138, the respective relationships (e.g., social connections) shared between the respective payors and the payee, and/or respective engagements with, and/or levels of engagement with, products of the payment service 108, such as the payment instrument 124, as described in detail above.

In some examples, combining multiple screens 138 to generate combined output 140 may include adding transitions and/or blending between the sequential display of the screens 138 to the payee (e.g., fade out, fade in, blending audio, etc.). In some examples, combining multiple screens 138 to generate combined output 140 may include defining rules and/or conditions for triggering transitions between sequentially displayed screens 138 when the combined output 140 is presented to the payee (e.g., third user 102(3)). In some examples, rules and/or conditions for triggering a transition from one screen 138 to the next screen 138 include a lapse of a predefined time period (which may be associated with the respective durations for which the respective screens 138 are to be displayed), user input (e.g., a tap, a swipe, etc.) provided by the viewing user 102 (e.g., the payee), haptic input (e.g., the viewing user 102 may shake the user device 104 to transition to the next screen 138), gestures (e.g., voice gestures, hand gestures, eye movement gestures, etc.). In some examples, generate combined output 140 may include filtering out profanity from notes added to the screens 138 by certain payors. These intelligent ways of stitching together multiple screens 138 to generate combined output 140 for facilitating multi-user content personalization improve upon conventional systems that are only equipped to send individual payments from payors to payees.

In some examples, the payment personalization component 126 may use an AI model(s) 128 to determine how to combine multiple screens 138 of associated payments 134 and/or how to generate the combined output 140. For example, a trained AI model(s) 128 (e.g., a machine learning model(s)) may be configured to implement a multi-label classification task (e.g., labeling screens as "$1^{st}$," "$2^{nd}$," "$3^{rd}$," and so on) to output a sequence in which the screens 138 are to be displayed based on any suitable data received as input. Additionally, or alternatively, a trained AI model(s) 128 may be configured to output respective durations for which the screens 138 are to be displayed, such as by classifying screens 138 in terms of "screen time" class labels (e.g., 5 seconds, 10 seconds, 15 seconds, etc.). The data input to the trained AI model(s) 128 can be data associated with user accounts 118 of the users 102 who are sending the payments 134 (e.g., the payors) and/or data associated with the user account 118 of the user 102 receiving the payments 134 (e.g., the payee), data associated with the payments 138, such as payment amounts, notes provided with the payments 134, the screens 138 customized by the payors, the respective times at which payment personalization requests and/or screens 138 are received by the PSS 110, contact book data 122 associated with the users 102 involved in the multi-user content personalization, and/or the like.

The user interfaces 136, 142, 200, 300A, 300B, 400A, 400C, 400D, 400G, and 500 are provided as examples of user interfaces that can be presented to facilitate techniques described herein. User interfaces can present additional or alternative data in additional or alternative configurations.

That is, user interfaces 136, 142, 200, 300A, 300B, 400A, 400C, 400D, 400G, and 500 should not be construed as limiting.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 6:
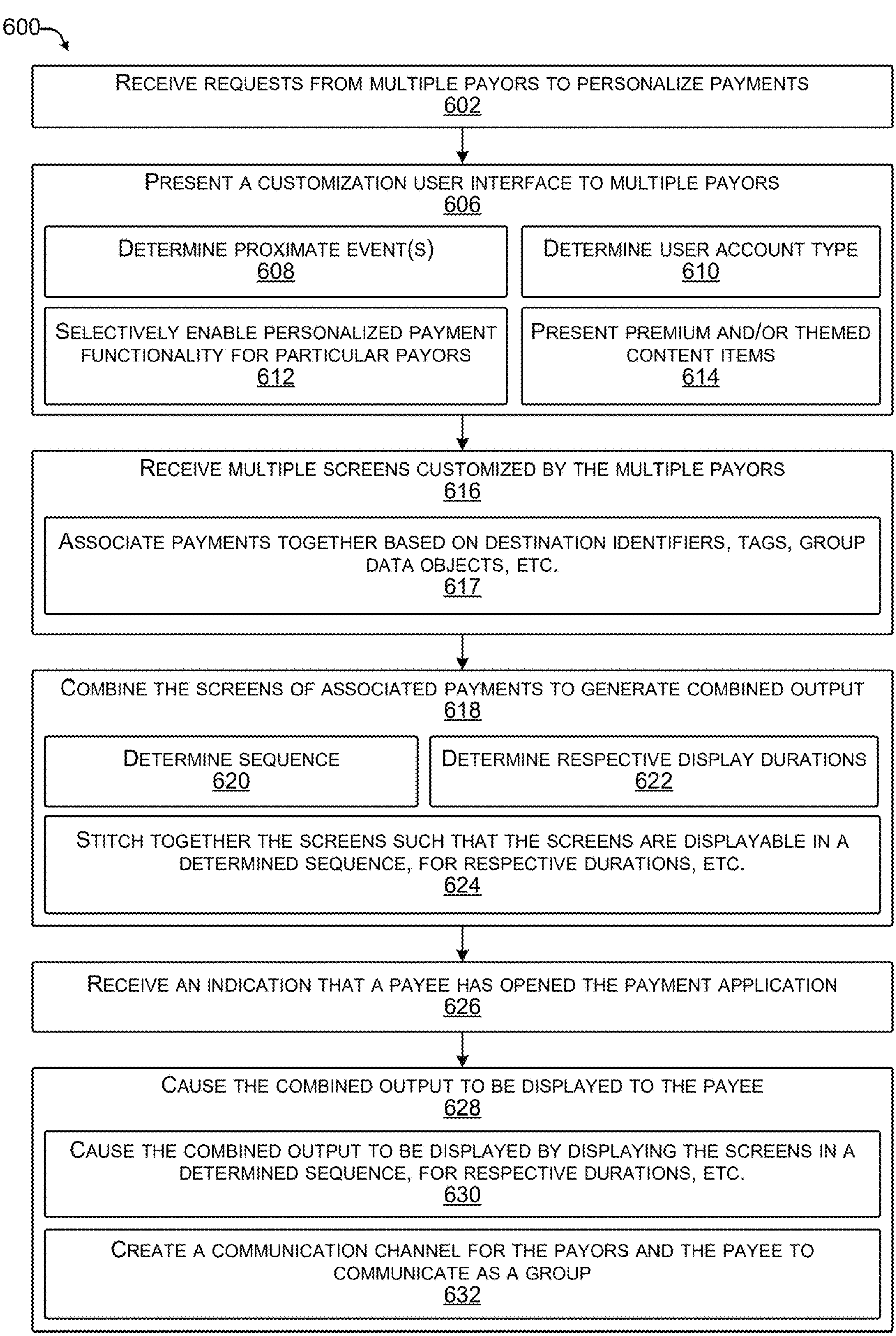
FIG. 6 is an example process for facilitating multi-user content personalization, according to an implementation of the present subject matter.

FIG. 6 is an example process 600 for facilitating multi-user content personalization, according to an implementation of the present subject matter. The process 600 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process 600. The process 600 can be implemented by a system including one or more processors and memory storing computer-executable instructions to cause the one or more processors to perform the process 600. In some examples, the process 600 can be implemented by a processing device(s) (e.g., a computing system and/or a server(s) of the PSS 110). For discussion purposes, the process 600 is described with reference to the previous figures.

At 602, requests to personalize payments 134 are receiving from user devices 104 of multiple payors. In some examples, the PSS 110 receives the requests at block 602. For example, at 602, the PSS 110 may receive, from a first user device 104(1) executing a payment application 106, a first request to personalize a first payment 134(1) from a first payor to a payee. At 602, the PSS 110 may also receive, from a second user device 104(2) executing the payment application 106, a second request to personalize a second payment 134(2) from a second payor to the payee. The payors and the payee, in this example, may correspond to users 102 of a payment service 108. It is to be appreciated that more than two requests to personalize payments 134 may be received at block 602. The example of receiving two requests to personalize payments 134 at block 602 is merely illustrative.

At 606, a customization user interface 136 is presented to each of the payors and in respective instances of the payment application 106 executing on the user devices 104 of the payors. In some examples, the payment personalization component 126 of the PSS 110 may be executed to present the customization user interface 136 to each of the payors at block 606. For example, the payment personalization component 126 may be executed to present, to the first payor via the payment application 106, a customization user interface 400A from which the first payor is able to customize a first screen 138(1) to be presented to the payee, and to present, to the second payor via the payment application 106, the customization user interface 400C from which the second payor is able to customize a second screen 138(2) to be presented to the payee. In some examples, an instruction is sent to the respective user devices 104 of the payors executing the payment application 106, the instruction causing the payment application 106 to present the customization user interface 136. In some examples, the payment personalization component 126 of the PSS 110 may be executed to send the instruction at block 606. In some examples, the instruction may include, or may be sent with, data that, when received by the user device(s) 104, causes the payment application 106 to present the customization user interface 136. As described in detail above, the customization user interface 136 presented to each of the payors at block 606 allows the payors to customize their screens 138 with content items, such as a background, stickers, notes, clips of audio content, clips of video content, photographs, and/or the like. In some examples, the customization user interface 136 presented to each of the payors at block 606 is configured to recognize one or more gestures for customizing the screens 138 with content items, as described in detail above. In some examples, the customization user interface 136 is presented to each of the payors at block 606 with one or more interactive elements for providing a prompt to a generative AI model(s) to generate one or more content items for customizing the screens 138. As shown by sub-blocks 608-614, presenting the customization user interface may involve various sub-operations.

At sub-block 608, in some examples, one or more temporally proximate events are determined. In some examples, the payment personalization component 126 of the PSS 110 may be executed to determine a temporally proximate event(s) at block 608. For example, payment personalization component 126 may be executed to determine that a current date is within a threshold amount of time of an event, such as a birthday, a holiday, and/or the like. In this example, at sub-block 614, the customization user interface 136 presented to each of the payors (e.g., the first payor and the second payor) includes one or more content items that are themed in accordance with the event (e.g., birthday-themed content items, holiday-themed content items).

At sub-block 610, in some examples, user account 118 types of the payors and/or the payee are determined. In some examples, the payment personalization component 126 of the PSS 110 may be executed to determine the user account 118 types at block 610. For example, as described above, users 102 can, at a time of onboarding or at any other suitable time, specify whether their user account 118 is a personal account or a business account, and/or the payment service 108 may allow users 102 to add business accounts in addition to their personal accounts, such that the user's personal finances can be kept separate from the user's business finances. In this example, payment personalization component 126 may be executed to determine whether any of the payments 134 are associated with a business account of the PSS 110 (e.g., created by a payor or the payee), and, if it is determined that a payment 134 is associated with a business account of the PSS 110, the customization user interface 136 presented to a payor may include one or more content items that are business-related (e.g., a payor associated with a business account that is used for receiving payments for a hair salon may be presented with hair-related content items).

As shown by sub-block 612, in some examples, a personalized payment functionality is selectively enabled for the first payor, and is not enabled (e.g., disabled) for the second payor. In some examples, the payment personalization component 126 of the PSS 110 may be executed to selectively enable the personalized payment functionality for a particular payor(s) at block 612. In some examples, the functionality is selectively enabled for the first payor in the customization user interface 400A presented to the first payor. In some examples, the functionality selectively enabled for the first payor is associated with customizing the first screen 138(1). For example, the functionality, when enabled for the first payor, may allow the first payor to customize the first screen 138(1) with one or more premium content items that are unavailable to the second payor for customizing the second screen 138(2). In some examples, the one or more premium content items comprising one or more premium backgrounds, one or more premium stickers, longer clips of audio content and/or video content, and/or any of the content items described herein. In some examples, the functionality, when enabled for the first payor, may allow the first screen 138(1) to be displayed (via a user interface 142, 400G of the payment application 106 executing on the payee's user device 104) before the second screen 138(2) is displayed (via the user interface 142, 400G). In other words, the functionality may prioritize display of the first screen 138(1) before the second screen 138(2). In some examples, the functionality, when enabled for the first payor, may allow the first screen 138(1) to be displayed (via the user interface 142, 400G) for a first duration that is greater (or longer) than a second duration for which the second screen 138(2) is displayed (via the user interface 142, 400G). In other words, the functionality may provide the first payor's personalized payment with more "screen time" than the second payor's personalized payment.

In some examples, the personalized payment functionality is selectively enabled for the first payor and not enabled (e.g., disabled) for the second payor based at least in part on a first amount of the first payment 134(1) and a second amount of the second payment 134(2). For example, if the first payment amount 402(1) is greater than the second payment amount 402(2), the personalized payment functionality may be selectively enabled for the first payor and not enabled (e.g., disabled) for the second payor. As another example, if the first payment amount 402(1) satisfies a threshold, and if the second payment amount 402(2) fails to satisfy a threshold, the personalized payment functionality may be selectively enabled for the first payor and not enabled (e.g., disabled) for the second payor.

In some examples, the personalized payment functionality is selectively enabled for the first payor and not enabled (e.g., disabled) for the second payor based at least in part on a first timestamp associated with the receiving the first request to personalize the first payment 134(1) from the first user device 104(1) and a second timestamp associated with the receiving the second request to personalize the second payment 134(2) from the second user device 104(2). For example, if the first timestamp precedes the second timestamp, the personalized payment functionality may be selectively enabled for the first payor and not enabled (e.g., disabled) for the second payor.

In some examples, the personalized payment functionality is selectively enabled for the first payor and not enabled (e.g., disabled) for the second payor based at least in part on a first number of mutual connections of the first payor and the payee and a second number of mutual connections of the second payor and the payee. For example, if the first number of mutual connections is greater than the second number of mutual connections, the personalized payment functionality may be selectively enabled for the first payor and not enabled (e.g., disabled) for the second payor.

At 616, multiple screens 138 customized by the multiple payors are received. In some examples, the PSS 110 receives the screens 138 at block 616. For example, at 616, the PSS 110 may receive, from the first user device 104(1), the first screen 138(1) customized by the first payor, and the PSS 110 may also receive, from the second user device 104(2), the second screen 138(2) customized by the second payor. In some examples, additional data associated with the payments 134 is also received in association with the screens 138, such as the payment amounts 402. As noted above, in some examples, multiple screens 138 customized by a single payor may be received at 616. For example, the first user 102(1) (e.g., first payor) may customize a first screen 138 with a note that says "Happy," a second screen 138 with a note that says "Birthday," and a third screen 138 with a note that says "Sister."

As shown by sub-block 617, in some examples, the payments 134 are associated together (e.g., based at least in part on destination identifiers, tags, group data objects, payment context, payment content, and/or the like). In some examples, the payment personalization component 126 of the PSS 110 may be executed to associate the payments 134 together at block 617. For example, the first request may include a destination identifier and/or a tag, and the second request may include the destination identifier and/or the tag, and, at block 617, the payment personalization component 126 may be executed to associate the first payment 134(1) with the second payment 134(2) based at least in part on the destination identifier and/or the tag being included in the first request and the second request. As another example, a first user account 118 of the first payor may be associated with a group data object 120 and a second user account 118 of the second payor may be associated with the group data object 120, and, at block 617, the payment personalization component 126 may be executed to associate the first payment 134(1) with the second payment 134(2) based at least in part on the group data object 120 being associated with the user accounts 118 of the payors who submitted the requests to personalize their payments 134. In some examples, the payments 134 are inherently associated based on being destined for a common payee. In some examples, text, music, and/or other content associated with the payments 134 may be analyzed to associate payments 134 together at block 617. For example, if two (or more) payments 134 relate to a similar story, design attributes, time, location where the payments 134 were initiated, participants, payment amounts, and/or the like, such contextual signals and/or content signals can be used to determine payments 134 to associate together. In some examples, associating payments includes determining whether payments are similar (e.g., by determining a similarity metric). In some examples, an AI model(s) 128 can output a similarity metric indicating a similarity between two (or more) payments 134, which can be based on data associated with the payments 134, data associated with the payors of the payments 134, and/or the like. In some examples, a similarity metric may include a score, which may be placed on a scoring scale, which indicates a degree of similarity between data associated with two payments 134. The more similar the data is as between two payments 134, the more favorable the similarity metric may be. In some examples, an AI model(s) 128 may be utilized to weight or otherwise prioritize similarity of given characteristics or may determine that characteristics correspond even if the format, style, etc. of the payment data differs in some respects. In some examples, when a similarity metric determined for two (or more) payments 134 satisfies a threshold similarity, the payments 134 are associated together.

At 618, the screens 138 of associated payments 134 are combined to generate combined output 140. In some examples, the payment personalization component 126 of the PSS 110 may be executed to combine the screens 138 to generate the combined output 140 at block 618. For example, the payment personalization component 126 may be executed at block 618 to combine the first screen 138(1) and the second screen 138(2) to generate combined output 140. In some examples, the combining of the first screen 138(1) and the second screen 138(2) at block 618 is based at least in part on associating the first payment 134(1) with the second payment 134(2). As shown by sub-blocks 620-624, combining the screens 138 to generate combined output 140 may involve various sub-operations.

At sub-block 620, in some examples, a sequence in which to display the screens 138 (e.g., the first screen 138(1) and the second screen 138(2)) is determined. In some examples, the payment personalization component 126 of the PSS 110 may be executed to determine the screen sequence at block 620. In some examples, the sequence is determined at block 620 based at least in part on a first amount of the first payment 134(1) and a second amount of the second payment 134(2). For example, if the first payment amount 402(1) is greater than the second payment amount 402(2), the first screen 138(1) may be positioned earlier in the sequence than the second screen 138(2). In some examples, the sequence is determined at block 620 based at least in part on a first timestamp associated with the receiving the first screen 138(1) from the first user device 104(1) and a second timestamp associated with the receiving the second screen 138(2) from the second user device 104(2). Additionally, or alternatively, the personalized payment functionality may be selectively enabled for the first payor and not enabled (e.g., disabled) for the second payor based at least in part on the first timestamp and the second timestamp. For example, if the first timestamp precedes the second timestamp, the first screen 138(1) may be positioned earlier in the sequence than the second screen 138(2) and/or the personalized payment functionality may be selectively enabled for the first payor and not enabled (e.g., disabled) for the second payor. In some examples, the sequence is determined at block 620 based at least in part on a first number of mutual connections of the first payor and the payee and a second number of mutual connections of the second payor and the payee. For example, if the first number of mutual connections is greater than the second number of mutual connections, the first screen 138(1) may be positioned earlier in the sequence than the second screen 138(2).

At sub-block 622, in some examples, respective durations for displaying the respective screens 138 (e.g., the first screen 138(1) and the second screen 138(2)) are determined. In some examples, the payment personalization component 126 of the PSS 110 may be executed to determine the respective display durations at block 622. For example, the payment personalization component 126 may be executed to determining a first duration for displaying the first screen 138(1) and a second duration for displaying the second screen 138(2). In some examples, the first duration and the second duration are determined at block 622 based at least in part on a first amount of the first payment 134(1) and a second amount of the second payment 134(2). For example, if the first payment amount 402(1) is greater than the second payment amount 402(2), the first duration for displaying the first screen 138(1) may greater than the second duration for displaying the second screen 138(2). In some examples, the first duration and the second duration are determined at block 622 based at least in part on a first timestamp associated with the receiving the first screen 138(1) from the first user device 104(1) and a second timestamp associated with the receiving the second screen 138(2) from the second user device 104(2). For example, if the first timestamp precedes the second timestamp, the first duration for displaying the first screen 138(1) may greater than the second duration for displaying the second screen 138(2). In some examples, the first duration and the second duration are determined at block 622 based at least in part on a first number of mutual connections of the first payor and the payee and a second number of mutual connections of the second payor and the payee. For example, if the first number of mutual connections is greater than the second number of mutual connections, the first duration for displaying the first screen 138(1) may greater than the second duration for displaying the second screen 138(2). In some examples, the respective display durations for the screens 138 are determined based on contextual signals and/or content signals (e.g., payment context, payment content, and/or the like). For example, if two (or more) payments 134 relate to a similar story, design attributes, time, location where the payments 134 were initiated, participants, payment amounts, and/or the like, such contextual signals and/or content signals can be used to determine the respective display durations at block 622.

At sub-block 624, the combining of the screens 138 may include stitching together the screens 138 (e.g., the first screen 138(1) and the second screen 138(2)) such that the screens 138 (e.g., first screen 138(1) and the second screen 138(2)) are displayable in the sequence and/or for the respective durations (e.g., such that the first screen 138(1) is displayable for the first duration and the second screen 138(2) is displayable for the second duration).

At 626, an indication that the payee has opened the payment application 106 on a user device 104 is received. In some examples, the PSS 110 receives the indication at block 626.

At 628, in response to receiving the indication at block 626, the combined output 140 is caused to be displayed to the payee. In some examples, the payment personalization component 126 of the PSS 110 may be executed to cause the combined output 140 to be displayed via a user interface 142, 400G of the payment application 106 executing on the user device 104 of the payee at block 628. In some examples, an instruction is sent to the user device 104 of the payee executing the payment application 106, the instruction causing the payment application 106 to present the combined output 140 via the user interface 142, 400G. In some examples, the payment personalization component 126 of the PSS 110 may be executed to send the instruction at block 628. In some examples, the instruction may include, or may be sent with, data that, when received by the user device 104, causes the payment application 106 to present the combined output 140 via the user interface 142, 400G.

At sub-block 630, in some examples, the combined output 140 is displayed via the user interface 142, 400G by displaying the first screen 138(1) and the second screen 138(2) in the sequence and/or the combined output 140 is displayed via the user interface 142, 400G by displaying the first screen 138(1) for the first duration and displaying the second screen 138(2) for the second duration. For example, the payee, upon opening the payment application 106, may see the first screen 138(1) customized by the first payor, which may be displayed for a first duration (e.g., 10 seconds), while listening to a clip of audio content selected by the first payor being output via the speaker(s) of the payee's user device 104. After the first screen 138(1) is displayed for the first duration, the payee may see the second screen 138(2) customized by the second payor, which may be displayed for a second duration (e.g., 5 seconds), while listening to a clip of audio content selected by the second payor, and so on and so forth for any number of payors whose payments 134 are associated and whose screens 138 are combined to generate the combined output 140. As described above, transitions between screens 138 may be added (e.g., at block 618 and/or sub-block 624) to, for example, fade out of one screen 138 and fade into another, fade out of one audio clip and fade into another, etc. Additionally, or alternatively, the payee may experience haptic feedback via their user device 104, and/or animations, 3D effects, and/or the like, as described in detail above. In some examples, the combined output 140 may be displayed at block 630 in a carousel, transitioning left-to-right, right-to-left, top-to-bottom, and/or bottom-to-top from one screen 138 to the next.

At sub-block 632, in some examples, in response to causing the combined output 140 to be displayed via the user interface 142, 400G, a communication channel(s) is created for at least some of the payors and the payee to communicate as a group. In some examples, the payment personalization component 126 of the PSS 110 may be executed to create the communication channel(s) at block 632. The communication channel(s) that is created can be any suitable communication channel(s) including a text communication channel(s) (e.g., short message service (SMS) text, rich communication service (RCS) text, etc.), an email communication channel(s), an in-app communication channel (e.g., a first-party application (e.g., payment application 106) communication channel, a third-party application communication channel, etc.), and/or the like. For example, the communication channel(s) may be created at block 632 for the first payor, the second payor, and the payee to communicate as a group, to use the running example with two payors. In some examples, individual payors may opt-out of participation in group communications associated with personalized payments, and, in such scenarios, the communication channel(s) may be created at block 632 for the users 102 associated with the multi-user content personalization displayed to the payee who have not opted out of participation in group communications.

Figure 7:
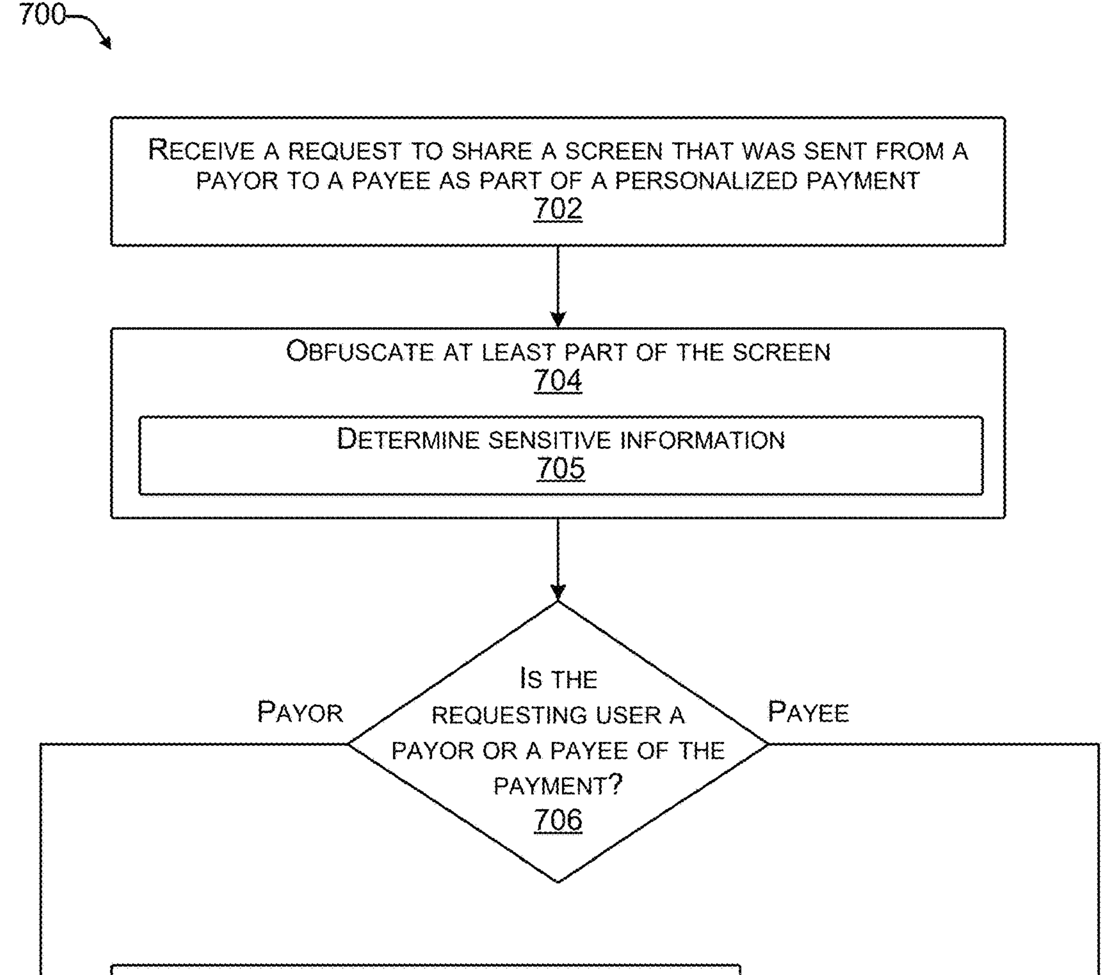
FIG. 7 is an example process for sharing, on a content platform, a screen that was customized by a payor, according to an implementation of the present subject matter.

FIG. 7 is an example process 700 for sharing, on a content platform, a screen(s) that was customized by a payor(s), according to an implementation of the present subject matter. The process 700 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process 700. The process 700 can be implemented by a system including one or more processors and memory storing computer-executable instructions to cause the one or more processors to perform the process 700. In some examples, the process 700 can be implemented by a processing device(s) (e.g., a computing system and/or a server(s) of the PSS 110). For discussion purposes, the process 700 is described with reference to the previous figures At 702, a request to share, via a content platform(s), a screen(s) 138 customized by a payor(s) is received from a user device 104. In some examples, the PSS 110 receives the request to share the screen(s) 138 at block 702. For example, the request to share the screen 138 may be received from the third user device 104(3) of FIG. 1, which may be the user device 104 of a payee who recently received combined output 140 for facilitating multi-user content personalization, as described herein. In this example, the payee may wish to share, on a content platform(s), a particular screen(s) 138 of multiple screens 138 that were combined to generate the combined output 140 displayed via the user interface 142, 400G of the payee's user device 104(3). In some examples, the payment application 106 presents a sharing mechanism (e.g., an interactive element, such as a "Share" button) via the user interface 142, 400G, and the user 102(3) can use the sharing mechanism to share one or more screens 138 of their choice on a content platform(s).

At 704, at least part of the screen(s) 138 is obfuscated. In some examples, the screen sharing component 132 of the PSS 110 may be executed to obfuscate at least part of the screen(s) 138 at block 704. At sub-block 705, in some examples, sensitive information in the screen(s) 138 is determined, and the sensitive information is obfuscated. In some examples, the sensitive information may include a payment amount 402, and/or any other sensitive information, such as personal notes, pictures of a license plate, a home address, etc. In the running example, if the third user 102(3) (payee) requests to share the first screen 138(1) customized by the first user 102(1) (first payor), the screen sharing component 132 may be executed to obfuscate (e.g., cover, blur, conceal, remove, etc.) at least the first amount of the first payment 134(1) (e.g., the first payment amount 402(1)) from the first screen 138(1) to generate a modified first screen. For example, an individual screen 138 customized by a payor may be stored (e.g., in the datastore(s) 114) as multiple different data elements, such as a first data element for the background, a second data element for the payment amount 402, a third data element for a sticker(s) 416, a fourth data element for a note(s) 414, and so on. In this manner, the screen sharing component 132 can implement tight controls over the content that is obfuscated before the screen 138 is shared by identifying data elements associated with a customized screen 138 that correspond to potentially sensitive information that should not be shared publicly.

At 706, a determination is made as to whether the requesting user is a payor or a payee of the payment 134 associated with the screen 138 being shared. In some examples, the screen sharing component 132 of the PSS 110 may be executed to make the determination at block 706. In some examples, the screen sharing component 132 may be executed to make the determination at block 706 using any suitable data to classify the requesting user, such as metadata associated with the screen 138 that indicates identifying data of the user 102 who sent the corresponding payment 134 (e.g., the payor) and identifying data of the user 102 who received the corresponding payment 134 (e.g., the payee). In this example, if the user account 118 of the user 102 who is requesting to share the screen 138 matches the identifying data of the payor (or does not match the identifying data of the payee) in the metadata associated with the screen 138, a determination is made that the requesting user is the payor. If, on the other hand, the user account 118 of the user 102 who is requesting to share the screen 138 does not match the identifying data of the payor (or matches the identifying data of the payee) in the metadata associated with the screen 138, a determination is made that the requesting user is the payee.

If it is determined that the requesting user is the payor, the process 700 follows the PAYOR route from block 706 to block 708. At 708, identifying information associated with the payee is removed from the screen(s) 138. In some examples, the screen sharing component 132 of the PSS 110 may be executed to remove the payee's identifying information from the screen(s) 138 at block 708. In the running example, if the first screen 138(1) customized by the first user 102(1) (first payor) is being shared by the first user 102(1) (first payor), the screen sharing component 132 may be executed to remove at least the identifying information of the payee (e.g., third user 102(3)) from the first screen 138(1) to generate a modified first screen. For example, the first user 102(1) (first payor) may have mentioned the payee's name, address, and/or the like in a note(s) 414 added to the first screen 138(1), and the screen sharing component 132 may be executed to identify or recognize the payee's name, address, and/or the like in the note(s) 414 and to remove the corresponding data element from the data representing the first screen 138(1).

If it is determined that the requesting user is the payee, the process 700 follows the PAYEE route from block 706 to block 710. At 710, identifying information associated with the payor is removed from the screen(s) 138. In some examples, the screen sharing component 132 of the PSS 110 may be executed to remove the payor's identifying information from the screen(s) 138 at block 710. In the running example, if the first screen 138(1) customized by the first user 102(1) (first payor) is being shared by the third user 102(3) (payee), the screen sharing component 132 may be executed to remove at least the identifying information of the first payor (e.g., first user 102(1)) from the first screen 138(1) to generate a modified first screen. For example, the first user 102(1) (first payor) may have mentioned their own name, address, and/or the like in a note(s) 414 added to the first screen 138(1), and the screen sharing component 132 may be executed to identify or recognize the payor's name, address, and/or the like in the note(s) 414 and to remove the corresponding data element from the data representing the first screen 138(1).

At 712, following either block 708 or 710, the modified screen(s) 138 is posted to the content platform(s). In some examples, the screen sharing component 132 of the PSS 110 may be executed to post the modified screen(s) 138 at block 712. The content platform(s) may include a social media platform, a blog platform, a micro-block platform, a payment platform, a gaming platform, a music, podcast and/or video streaming platform, and/or the like.

While the examples presented above are predominantly directed to personalizing payments, as briefly mentioned above, the techniques described herein are applicable to personalizing payment requests. For example, with reference again to FIG. 2, a user 102 may request a payment from another user 102 by interacting with (e.g., selecting) the interactive element 204 (e.g., the "Request" button), and, in this example, after selecting a recipient of the payment request via a user interface of the payment application 106 similar to the user interface 300A of FIG. 3A, the payment requester (e.g., potential payee) may by presented with a customization user interface 136 similar to those described above and depicted in FIGS. 4A-4G to customize a screen 138 for the payment request. To illustrate, a user 102 of the payment service 108 may be organizing a campaign or a fundraiser and may send multiple payment requests to multiple potential donors (or payors). In this example, the user 102 may personalize the individual screens 138 associated with individual ones of the multiple payment requests using the techniques, devices, and systems described herein. In some examples, the PSS 110 may facilitate multi-user content personalization in association with payment requests in a similar manner to facilitating multi-user content personalization in association with payments, as described herein. For example, a potential payor may receive combined output 140 on their user device 104, the combined output 140 having been generated by combining multiple screens 138 customized by multiple potential payees.

In some examples, the techniques described herein are applicable to offers. For example, users 102 that setup a business account (which is a type of user account 118) with the payment service 108, may wish to personalize offers that are related to their business, such as offers, such as a discount on items (e.g., products and/or services) purchased from the user's business. In these examples, the user 102 associated with the business account may wish to personalize a business-related offer by customizing a screen with content items (e.g., a background, a sticker(s), a note(s), etc.) and sending the customized screen to another user(s) 102 in association with a business offer. In general, the techniques described herein are applicable to user interactions, whether those interactions are payments, payment requests, offers, and/or other user engagements.

In some examples, the techniques described herein are applicable in tap-to-pay scenarios. For example, a payee may initialize a payment request on their user device 104 that requests a payment from a payor, and the payor may bring their user device 104 into proximity of the payee's user device 104 to send the payment 134 to the requesting payee. In this example, the payee may customize a screen 138 for the payment request, and when the user devices 104 move into proximity of each other (e.g., when the users tap their user devices 104 together), the customized screen 138 is displayed across the two user devices 104 and/or additional user devices associated with the payor and the payee.

In some examples, the PSS 110 may facilitate piecemeal personalized payments. For example, a payor may customize a screen 138 to personalize a payment 134, as described herein, and the payor may designate the payment 134 as a piecemeal payment to be sent to a payee as a series of multiple payments over a period of time. In these examples, instead of causing the entire screen 138 to be displayed to the payee (e.g., via the user interface 142, 400G of the payment application 106 described above), the payment personalization component 126 may be executed to cause a first portion of the screen 138 to be displayed to the payee (e.g., via the user interface 142, 400G) at a first time when a first payment of a series of payments is sent to the payee, and to subsequently cause a second portion of the screen 138 to be displayed to the payee (e.g., via the user interface 142, 400G) at a second time when a second payment of the series of payments is sent to the payee, and so on and so forth. In this way, the screen 138 is revealed over a period of time by causing display of discrete portions of the screen 138 over time. To illustrate, consider an example where a payor is paying back a loan made by the payee to the payor, and the payor sets up a series of payment to be made to the payee at any suitable frequency (e.g., monthly payments). In this example, the payor may customize a screen 138 for the loan payments, and a portion of the screen 138 is revealed to the payee after each loan payment is made to the payee, and after the loan is paid back in full, the entire screen 138 is revealed to the payee. In another example, a parent may wish to make payments to their child for the child's allowance. In this example, the parent (payor) may customize a screen 138 for the allowance payments and may start making the allowance payments (e.g., on a weekly basis) over a period of time (e.g., one month). Accordingly, after each payment is made, a portion of the screen 138 may be revealed to the child (payee) via a user interface 142, 400G of the payment application 106 executing on the user device 104 of the child, and at the end of the period of time (e.g., at the end of the month), the entire screen 138 is revealed to the child (payee). In some examples, piecemeal payments can be made between users 102 in physical proximity to each other by tapping user devices 104 together. For example, in the previous example, the parent (payor) may tap their user device 104 against the user device 104 of their child (payee) to make a payment 134 of a series of payments, and in response to tapping the user devices 104 together, the user interface 142, 400G of the payment application 106 executing on the user device 104 of the child (payee) may reveal a new portion of the screen 138 customized by the parent (payor). In some examples, the portions of the screen 138 may have the visual appearance of puzzle pieces that are put together to complete a puzzle that spans the screen 138 as the piecemeal payments are made. In some examples, multiple individual screens 138 may correspond to each payment 138 of a series of payments in the piecemeal payment implementation, and as the payments are made, the individual screens 138 are aggregated to tell a story.

Figure 8:
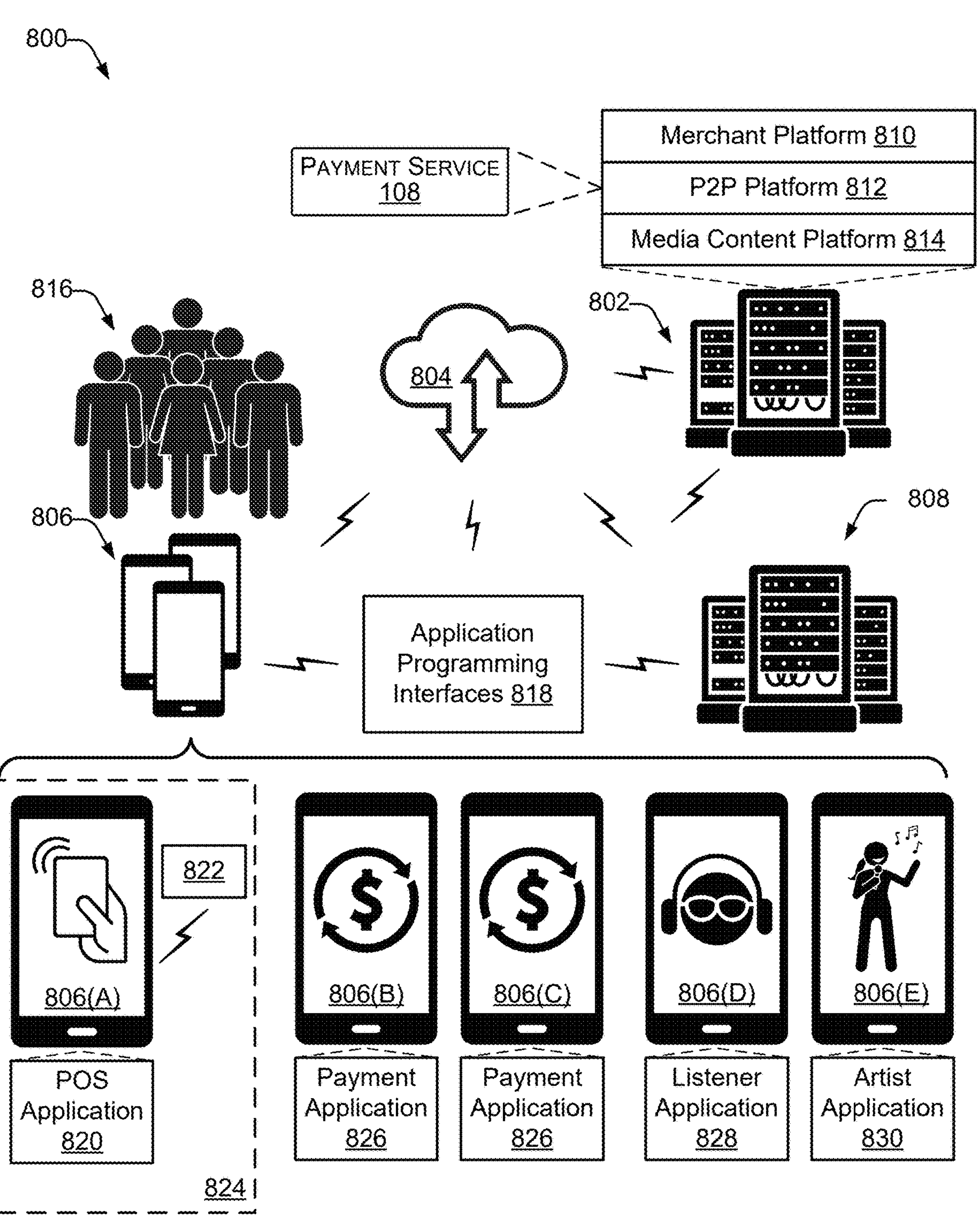
FIG. 8 is an example environment for performing techniques described herein.

FIG. 8 illustrates an example environment 800. The environment 800 includes server(s) 802 that can communicate over a network 804 with end user devices 806 and/or server(s) 808 associated with third-party service provider(s). In various examples, the end user devices 806 may comprise one or more seller devices 806(A), one or more user devices 806(B) and/or 806(C) in a peer network, one or more content consumption devices 806(D), one or more artist user devices 806(E), combinations of these examples, or other categories of user devices. The server(s) 802 can be associated with one or more service providers that can provide one or more services for the benefit of users 816, as described below. For example, the server(s) 802 may enable services of service providers such as in association with a merchant platform 810 (which may further include a buyer platform), a peer-to-peer (P2P) payment platform 812, a media content platform 814, a combination of these platforms, or other platforms associated with other service providers. While services and features are referenced throughout in connection with a particular one of the merchant platform 810, the P2P payment platform 812, or the media content platform 814, it should be understood that any of these platforms may perform the functionality described in relation to any of the other platforms. Actions attributed to the service provider(s) can be performed by the server(s) 802.

In some examples, the server(s) 802 may be the same as or similar to the server(s) of the PSS 110 introduced in FIG. 1, and the server(s) 802 may implement the payment service 108. Accordingly, the server(s) 802 may include the payment personalization component 126, the AI model(s) 128, the payment processing component 130, and/or the screen sharing component 132, as described herein. Furthermore, the end user device(s) 806 may be the same as or similar to the user devices 104 introduced in FIG. 1, the users 816 may be the same as or similar to the users 102 introduced in FIG. 1, and the network(s) 804 may be the same as or similar to the network(s) 112 introduced in FIG. 1. In addition, the application(s) 826 may be the same as or similar to the payment application 106 introduced in FIG. 1.

In accordance with the examples described herein, the server(s) 802 may facilitate multi-user content personalization. The server(s) 802 may receive, from a first user device 806 executing a payment application 826, a first request to personalize a first payment from a first payor 816 to a payee 816. The server(s) 802 may receive, from a second user device 806 executing the payment application 826, a second request to personalize a second payment from a second payor 816 to the payee 816. The server(s) 802 may present, to the first payor 816 via the payment application 826, a customization user interface from which the first payor 816 is able to customize a first screen to be presented to the payee 816, wherein a personalized payment functionality is selectively enabled for the first payor 816. The server(s) 802 may present, to the second payor 816 via the payment application 826, the customization user interface from which the second payor 816 is able to customize a second screen to be presented to the payee 816, wherein the personalized payment functionality is disabled for the second payor 816. The server(s) 802 may receive, from the first user device 806, the first screen customized by the first payor 816. The server(s) 802 may receive, from the second user device 806, the second screen customized by the second payor 816. The server(s) 802 may combine the first screen and the second screen to generate combined output. The server(s) 802 may receive an indication that the payee 816 has opened the payment application 826 on a third user device 806, and, in response to receiving the indication, the server(s) 802 may cause the combined output to be displayed via a user interface of the payment application 826 executing on the third user device 806.

In some examples, individual ones of the end user devices 806 can be operable by users 816. The users 816 (individually referred to herein as "user 816") can be referred to as customers, buyers, merchants, sellers, borrowers, employees, employers, payors, payees, couriers, artists, musicians, listeners, fans, supervisors, hosts, audience members, and so on. The users 816 can interact with the end user devices 806 via user interfaces presented via the end user devices 806. In at least one example, a user interface can be presented via a web browser, or the like. Alternatively or additionally, a user interface can be presented via an application, such as a mobile application or desktop application, which can be provided by the merchant platform 810, the P2P payment platform 812, and/or the media content platform 814, or which can be an otherwise dedicated application. In some examples, individual end user devices 806 can have an instance or versioned instance of an application, which can be downloaded from an application store, for example, which can present the user interface(s) described herein.

In at least one example, the users 816 can include merchants that can operate the seller device(s) 806(A) that are configured for use by merchants. For the purpose of this discussion, a "merchant" can be any entity that offers items (e.g., goods or services) for purchase or other means of acquisition (e.g., rent, borrow, barter, etc.). The merchants can offer items for purchase or other means of acquisition via brick-and-mortar stores, mobile stores (e.g., pop-up shops, food trucks, etc.), online stores, event venues, combinations of the foregoing, and so forth. In some examples, at least some of the merchants can be associated with the same entity but can have different merchant locations and/or can have franchise/franchisee relationships.

In additional or alternative examples, the merchants can be different merchants. For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

The seller device 806(A) can have an instance of a point of sale ("POS") application 820 stored thereon. The POS application 820 can configure the seller device 806(A) as a POS terminal, which enables the merchant to interact with one or more customers. In at least one example, interactions between the customers and the merchants that involve the exchange of funds (from the customers) for items or services (from the merchants) can be referred to as "transactions." In at least one example, the POS application 820 can determine transaction data associated with the POS transactions. Transaction data can include payment information, which can be obtained from a reader device 822 associated with the seller device 806(A), user authentication data, purchase amount information, point-of-purchase information (e.g., item(s) purchased, date of purchase, time of purchase, subscription type, etc.), etc. The POS application 820 can send transaction data to the server(s) 802 such that the server(s) 802 can track transactions of the customers, merchants, and/or the users 816 over time. Furthermore, the POS application 820 can present a UI to enable the merchant to interact with the POS application 820 and/or the merchant platform 810 via the POS application 820.

In at least one example, the seller device 806(A) can be a special-purpose computing device configured as a POS terminal (via the execution of the POS application 820). In at least one example, the POS terminal may be connected to a reader device 822, which is capable of accepting a variety of payment instruments, such as credit cards, debit cards, gift cards, short-range communication based payment instruments, and the like, as described below. In at least one example, the reader device 822 can plug in to a port in the seller device 806(A), such as a microphone port, a headphone port, an audio-jack, a data port, or other suitable port. In additional or alternative examples, the reader device 822 can be coupled to the seller device 806(A) via another wired or wireless connection, such as via Bluetooth®, BLE, and so on. In some examples, the reader device 822 can be a software solution executing on the POS terminal, e.g., a mobile phone. In some examples, the reader device 822 can read information from alternative payment instruments including, but not limited to, wristbands and the like.

In some examples, the reader device 822 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards, hardware wallets, fobs, or devices configured for tapping). The POS terminal may provide a rich user interface, communicate with the reader device 822, and communicate with the merchant platform 810, which can provide, among other services, a payment processing service. The server(s) 802 associated with the merchant platform 810 can communicate with server(s) 808, as described below. In this manner, the POS terminal and reader device 822 may collectively process transaction(s) between the merchants and customers. In some examples, multiple POS terminal(s) may be connected to a number of other devices, such as "secondary" terminals, e.g., back-of-the-house systems, printers, line-buster devices, reader devices, speakers, and the like, to allow for information from the secondary terminal to be shared between the primary POS terminal(s) and secondary terminal(s), for example via short-range communication technology. This kind of arrangement may continue operation in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 822 of the POS system 824 are shown as separate devices, in additional or alternative examples, the POS terminal and the reader device 822 can be part of a single device. In some examples, the reader device 822 can have a display integrated therein for presenting information to customers of a merchant. In additional or alternative examples, the POS terminal can have a display integrated therein for presenting information to the customers of the merchant. POS systems, such as the POS system 824, may be mobile, such that POS terminals and reader devices may process transactions in disparate locations across the world. POS systems can be used for processing card-present transactions and card-not-present (CNP) transactions.

A card-present transaction is a transaction where both a customer and the customer's payment instrument are physically present at the time of the transaction. Card-present transactions may be contact or contactless transactions processed by swipes (e.g., by sliding a magnetic strip through a reader device), dips (e.g., by inserting an embedded microchip into a reader device), taps (e.g., by wirelessly, through Bluetooth, NFC or other short range technology hover or tap a payment instrument into a reader device), or any other interaction between a physical payment instrument (e.g., a card), or otherwise present payment instrument, and a reader device 822, whereby the reader device 822 is able to obtain payment data from the payment instrument.

A CNP transaction is a transaction where a card, or other payment instrument, is not physically present at the POS such that payment data is manually keyed in (e.g., by a merchant, customer, etc.), or payment data is required to be recalled from a card-on-file data store, to complete the transaction.

The POS system 824, the server(s) 802, and/or the server(s) 808 may exchange payment information and transaction data to determine whether transactions are authorized. For example, the POS system 824 may provide encrypted payment data, user authentication data, purchase amount information, point-of-purchase information, etc. (collectively, transaction data) to server(s) 802 over the network(s) 804. The server(s) 802 may send the transaction data to the server(s) 808.

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network.

In at least one example, the service provider can serve as an acquirer and connect directly with the card payment network.

The card payment network (e.g., the server(s) 808 associated therewith) can forward the fund transfer request to an issuing bank (e.g., "issuer"). The issuer is a bank or financial institution that offers a financial account (e.g., credit or debit card account) to a user. The issuer (e.g., the server(s) 808 associated therewith) can make a determination as to whether the customer has the capacity to absorb the relevant charge associated with the payment transaction. In at least one example, the merchant platform 810 can serve as an issuer and/or can partner with an issuer. The transaction is either approved or rejected by the issuer and/or the card payment network (e.g., the server(s) 808 associated therewith), and a payment authorization message is communicated from the issuer to the POS device via a path opposite of that described above, or via an alternate path.

The server(s) 808 may send an authorization notification over the network(s) 804 to the server(s) 802, which may send the authorization notification to the POS system 824 over the network(s) 804 to indicate whether the transaction is authorized. The server(s) 802 may also transmit additional information such as transaction identifiers to the POS system 824. In one example, the server(s) 802 may include a merchant application and/or other functional components for communicating with the POS system 824 and/or the server(s) 808 to authorize or decline transactions (e.g., the API 818). In examples, the merchant platform 810 can enable the merchants to receive cash payments, payment card payments, and/or electronic payments from customers for POS transactions and the service provider can process transactions on behalf of the merchants.

Based on the authentication notification that is received by the POS system 824 from server(s) 802, the merchant may indicate to the customer whether the transaction has been approved. In some examples, approval may be indicated at the POS system 824, for example, at a display of the POS system 824. In some cases, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

The merchant platform 810 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, media content (e.g., music, videos, etc.) management and/or subscription services, and so on. In some examples, the users 816 can access all of the services. In some cases, the users 816 can have gradated access to the services, which can be based on risk tolerance, IDV outputs, subscriptions, and so on. In at least one example, access to such services can be availed to the merchants via the POS application 820. In additional or alternative examples, each service can be associated with its own access point (e.g., application, web browser, etc.).

As the merchant platform 810 processes transactions on behalf of the merchants, the merchant platform 810 can maintain accounts or balances for the merchants in one or more ledgers. For example, the merchant platform 810 can analyze transaction data received for a transaction to determine an amount of funds owed to a merchant for the transaction and deposit funds into an account of the merchant. The account can have a stored balance, which can be managed by the merchant platform 810. The account can be different from a conventional bank account at least because the stored balance is managed by a ledger of the merchant platform 810 and the associated funds are accessible via various withdrawal channels including, but not limited to, scheduled deposit, same-day deposit, instant deposit, and a linked payment instrument.

A scheduled deposit can occur when the merchant platform 810 transfers funds associated with a stored balance of the merchant to a bank account of the merchant that is held at a bank or other financial institution (e.g., associated with the server(s) 808). Scheduled deposits can occur at a prearranged time after a POS transaction is funded, which can be a business day after the POS transaction occurred, or sooner or later. In some examples, the merchant can access funds prior to a scheduled deposit (e.g., same-day deposits and/or real-time deposits). Further, in at least one example, the merchant can have a payment instrument that is linked to the stored balance that enables the merchant to access the funds without first transferring the funds from the account managed by the merchant platform 810 to the bank account of the merchant.

In at least one example, the merchant platform 810 may provide inventory management services. That is, the merchant platform 810 may provide inventory tracking and reporting. Inventory management services may enable the merchant to access and manage a database storing data associated with a quantity of each item that the merchant has available (i.e., an inventory). Furthermore, in at least one example, the merchant platform 810 can provide catalog management services to enable the merchant to maintain a catalog, which can be a database storing data associated with items that the merchant has available for acquisition (i.e., catalog management services). The merchant platform 810 can offer recommendations related to pricing of the items, placement of items on the catalog, and multi-party fulfillment of the inventory, to name a few examples.

In at least one example, the merchant platform 810 can provide business banking services, which allow the merchant to track deposits (from payment processing and/or other sources of funds) into an account of the merchant, payroll payments from the account (e.g., payments to employees of the merchant), payments to other merchants (e.g., business-to-business) directly from the account or from a linked debit card, withdrawals made via scheduled deposit and/or real-time deposit, configure allocations among multiple balances or accounts (e.g., spending, saving, taxes, etc.), etc. Furthermore, the business banking services can enable the merchant to obtain a customized payment instrument (e.g., credit card), check how much money the merchant is earning (e.g., via presentation of available earned balance), understand where the money of the merchant is going (e.g., via deposit reports (which can include a breakdown of fees), spend reports, etc.), access/use earned money (e.g., via scheduled deposit, real-time deposit, linked payment instrument, etc.), have improved control of the money of the merchant (e.g., via management of deposit schedule, deposit speed, linked instruments, etc.), etc. Moreover, the business banking services can enable the merchants to visualize their cash flow to track their financial health, set aside money for upcoming obligations (e.g., savings), organize money around goals, etc.

In at least one example, the merchant platform 810 can provide financing services and products, such as via business loans, consumer loans, fixed term loans, flexible term loans, and the like. In at least one example, the service provider can utilize one or more risk signals to determine whether to extend financing offers and/or terms associated with such financing offers. Such risk signals can be particular to an individual platform or service, as described herein, or can be based on aggregated data associated with multiple of the platforms or services. In at least one example, the merchant platform 810 can provide financing services for offering and/or lending a loan to a borrower that is to be used for, in some instances, financing the borrower's short-term operational needs (e.g., a capital loan). Additionally or alternatively, the merchant platform 810 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant. The merchant platform 810 can generate the loan based at least in part on determining that the borrower purchased or intends to purchase the item from the merchant. Advances, loans, or other funds provided to a merchant or other user can be repaid via a variety of mechanisms. In some examples, loans can be repaid in installments (e.g., multiple payments over time), at a particular date, from a portion of incoming funds (e.g., payments processed for the merchant, tax refunds, direct deposits, etc.), or the like.

The merchant platform 810 can provide web-development services, which enable users 816 who are unfamiliar with HTML, XML, Javascript, CSS, or other web design tools to create and maintain functional websites. Further, in addition to websites, the web-development services can create and maintain other online omni-channel presences, such as social media posts for example. In some examples, the resulting web page(s) and/or other content items can be used for offering item(s) for sale via an online/e-commerce platform. In at least one example, the merchant platform 810 can recommend and/or generate content items to supplement omni-channel presences of the merchants.

Furthermore, the merchant platform 810 can provide payroll services to enable employers to pay employees for work performed on behalf of employers. In at least one example, the merchant platform 810 can receive data that includes time worked by an employee (e.g., through imported timecards and/or POS interactions), sales made by the employee, gratuities received by the employee, and so forth. Based on such data, the merchant platform 810 can make payroll payments to employee(s) on behalf of an employer via the payroll service. For instance, the merchant platform 810 can facilitate the transfer of a total amount to be paid out for the payroll of an employee from the bank of the employer to the bank of the merchant platform 810 to be used to make payroll payments. In at least one example, when the funds have been received at the bank of the merchant platform 810, the merchant platform 810 can pay the employee, such as by check or direct deposit.

Moreover, in at least one example, the merchant platform 810 can provide employee management services for managing schedules of employees. Further, the merchant platform 810 can provide appointment services for enabling users 816 to set schedules for scheduling appointments and/or users 816 to schedule appointments.

In some examples, the merchant platform 810 can provide restaurant management services to enable users 816 to make and/or manage reservations, to monitor front-of-house and/or back-of-house operations, and so on. In such examples, the seller device(s) 806(A) and/or server(s) 802 can be configured to communicate with one or more other computing devices, which can be located in the front-of-house (e.g., POS device(s)) and/or back-of-house (e.g., kitchen display system(s) (KDS)). In at least one example, the merchant platform 810 can provide order management services and/or fulfillment services to enable restaurants (or other merchant types) to manage open tickets, split tickets, and so on and/or manage fulfillment services.

In some examples, the merchant platform 810 can provide omni-channel fulfillment services. A fulfillment service includes item ordering and delivery services, such as via a courier. In some examples, the courier can be an unmanned aerial vehicle (e.g., a drone), an autonomous vehicle, or any other type of vehicle capable of receiving instructions for traveling between locations. For instance, if a customer places an order with a merchant and the merchant cannot fulfill the order because one or more items are out of stock or otherwise unavailable, the merchant platform 810 can leverage other merchants and/or sales channels that are part of the merchant platform 810 to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the merchant platform 810 can enable conversational commerce via conversational commerce services, which can use one or more machine learning mechanisms to analyze messages exchanged between two or more users 816, voice inputs into a virtual assistant or the like, to determine intents of user(s) 816. In some examples, the merchant platform 810 can utilize determined intents to automate customer service, offer promotions, provide recommendations, or otherwise interact with customers in real-time. In at least one example, the merchant platform 810 can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 816 may be new to the merchant platform 810 such that the user 816 that has not registered (e.g., subscribed to receive access to one or more services offered by the merchant platform 810) with the merchant platform 810. The merchant platform 810 can offer onboarding services for registering a potential user 816 with the merchant platform 810. In some examples, onboarding can involve presenting various questions, prompts, and the like to a potential user 816 to obtain information that can be used to generate a profile for the potential user 816. In at least one example, the merchant platform 810 can provide limited or short-term access to its services prior to, or during, onboarding (e.g., a user of a peer-to-peer payment service can transfer and/or receive funds prior to being fully onboarded, a merchant can process payments prior to being fully onboarded, a user of a music streaming service can listen to music having advertisement breaks prior to being fully onboarded, etc.). In response to full or partial completion of onboarding, any limited or short-term access to services of the merchant platform 810 can be transitioned to more permissive (e.g., less limited) or longer-term access to such services.

The merchant platform 810 can be associated with IDV services, which can be used by the merchant platform 810 for compliance purposes and/or can be offered as a service, for instance to third-party service providers (e.g., associated with the server(s) 808). That is, the merchant platform 810 can offer IDV services to verify the identity of users 816 seeking to use or using their services. Identity verification may involve requesting a customer (or potential customer) to provide information that is used by compliance departments to prove that the information is associated with an identity of a real person or entity (e.g., an artist). In at least one example, the merchant platform 810 can perform services for determining whether identifying information provided by a user 816 accurately identifies the customer (or potential customer).

Techniques described herein can be configured to operate in both real-time/online and offline modes. "Online" modes refer to modes when devices are capable of communicating with the merchant platform 810 while offline mode refers to modes when devices are unable to communicate with the server(s) 808 due to network connectivity issue, for example. In such examples, devices may operate in "offline" mode where at least some payment data is stored (e.g., on the seller device(s) 806(A)) and/or the server(s) 802 until connectivity is restored and the payment data can be transmitted to the server(s) 802 and/or the server(s) 808 for processing.

In at least one example, the merchant platform 810 can be associated with a hub, such as an order hub, an inventory hub, a fulfillment hub and so on, which can enable integration with one or more additional service providers (e.g., associated with the additional server(s) 808). In some examples, such additional service providers can offer additional or alternative services and the service provider can provide an interface or other computer-readable instructions to integrate functionality of the service provider into the one or more additional service providers.

Turning now to the P2P functionality provided by the environment 800, the P2P platform 812 can provide a peer-to-peer payment service that enables peer-to-peer payments between two or more of the users 816. Two or more of the users 816 may be considered "peers" in a peer-to-peer interaction, such as a payment. In at least one example, the P2P platform 812 can communicate with instances of a payment application 826 (or other access point) installed on end user devices 806 configured for operation by the users 816. In an example, an instance of the payment application 826 executing on a first user device 806(B) operated by a payor (e.g., one of the users 816) can send a request to the P2P platform 812 to transfer an asset (e.g., fiat currency, non-fiat currency, digital assets such as non-fungible tokens (NFTs), cryptocurrency, securities, gift cards, and/or related assets) from the payor to a payee (e.g., a different one of the users 816) via a peer-to-peer payment. In some examples, assets associated with an account of the payor are transferred to an account of the payee. In some examples, assets can be held at least temporarily in an account of the P2P platform 812 prior to transferring the assets to the account of the payee.

Figure 9:
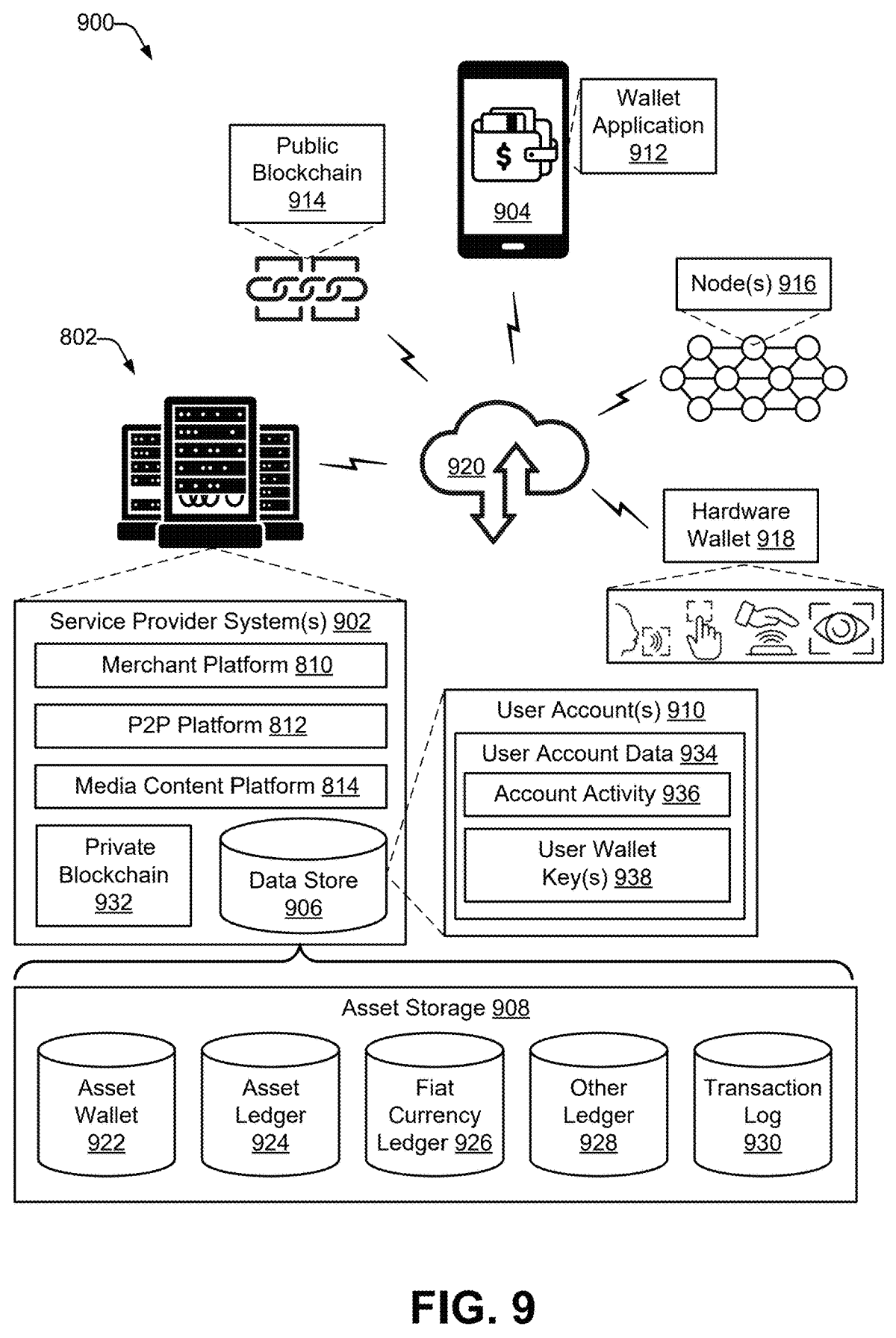

In some examples, the P2P platform 812 can utilize a ledger system to track transfers of assets between users 816. FIG. 9, below, provides additional details associated with such a ledger system. The ledger system can enable users 816 to own fractional shares of assets that are not conventionally available. For instance, a user can own a fraction of a Bitcoin, an NFT, or a stock. Additional details are described herein.

In at least one example, the P2P platform 812 can facilitate transfers and can send notifications related thereto to instances of the payment application 826 executing on user device(s) of payee(s). As an example, the P2P platform 812 can transfer assets from an account of a first user to an account of a second user and can send a notification to the user device 806(B) of the second user for presentation via a user interface. The notification can indicate that a transfer is in process, a transfer is complete, or the like. In some examples, the P2P platform 812 can send additional or alternative information to the instances of the payment application 826 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the P2P platform 812 funds the request to payee on behalf of the payor, to speed up the transfer process and compensate for lags that may be attributed to the payor's financial network.

In some examples, the P2P platform 812 can trigger the peer-to-peer payment process through identification of a "payment proxy" having a particular syntax. The payment proxy is useable in lieu of payment data. That is, payment data and a payment proxy can be linked to, or otherwise associated with, a user account of a user and either can be used for making payments. In an example, the syntax can include a monetary currency indicator prefixing one or more alphanumeric characters (e.g., $Cash). The currency indicator operates as the tagging mechanism that indicates to the server(s) 802 to treat the inputs as a request from the payor to transfer assets, where detection of the syntax triggers a transfer of assets. The currency indicator can correspond to various currencies including but not limited to, dollar ($), euro (€), pound (£), rupee ( (₹)), yuan (¥), etc. Although use of the dollar currency indicator ($) is used herein, it is to be understood that any currency symbol or other symbol could equally be used. In some examples, additional or alternative identifiers can be used to trigger the peer-to-peer payment process. For instance, email, telephone number, social media handles, artist or band names, and/or the like can be used to trigger and/or identify users of a peer-to-peer payment process.

In some examples, the peer-to-peer payment process can be initiated through instances of the payment application 826 executing on the end user devices 806. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can be a uniform resource locator (URL), which can include a payment proxy discussed above. The P2P platform 812 can generate the landing page to enable the recipient to conveniently receive one or more payments from one or more senders.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through streaming of content, comments, posts, messages on electronic bulletin boards, messages on a social networking platform, and/or any other types of messages. In some examples, the content provider can be the service provider as described with reference to FIG. 8 or a third-party service provider associated with the server(s) 808. In examples where the content provider is a third-party service provider, the server(s) 808 can be accessible via one or more APIs 818 or other integrations. In some examples, "forum" may also refer to an application or webpage of an e-commerce or retail organization that offers products and/or services. Such websites can provide an online "form" to complete before or after the products or services are added to a virtual cart. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be internal to the P2P platform 812 (e.g., the P2P platform 812 offers a chat or messaging service that is within the payment application or accessible via the payment application). In some examples, the messaging application can be external to the P2P platform 812. (e.g., the messaging application is hosted by a third-party service provider associated with the server(s) 808, which can be accessible via one or more of the APIs 818 or other integrations). The messaging application can include, for example, a text messaging application for communication between phones (e.g., conventional mobile telephones or smartphones), or a cross-platform instant messaging application for smartphones and phones that use the Internet for communication.

Funds received from payments can be stored in stored balances that are linked to, or otherwise associated with, user accounts. In some examples, the P2P platform 812 can enable users 816 to perform banking transactions via instances of the payment application 826. For example, users can configure direct deposits, recurring deposits, or other deposits (e.g., tax refunds, loans, etc.) for adding assets to their various ledgers/balances. In some examples, users can deposit physical cash via ATMs or other deposit sources, which can include merchants, such as those merchants that utilize the payment processing system described above. In some examples, the P2P platform 812 can enable users to allocate funds between different accounts, sub-accounts, or balances (e.g., spending, saving, different assets, different currencies), etc. Further, users 816 can configure bill pay, recurring payments, and/or the like using assets associated with their accounts. In some examples, the P2P platform 812, with consent of the user, can track individual transactions made using the payment application and can utilize such transaction data to make personalized or customized recommendations, determine creditworthiness, generate tax documentation, and/or the like.

In addition to sending and/or receiving assets via peer-to-peer transactions, the P2P platform 812 enables users to buy and/or sell assets via asset networks such as cryptocurrency networks, securities networks, and/or the like. In some examples, acquisition of such assets can be in whole or fractional shares. The ledger system described below with reference to FIG. 9 can enable such assets to be acquired in fractional shares and/or in real-time or near real-time (by delaying or omitting the need to buy/sell assets via asset networks or exchanges). In some examples, users can "gift" assets to other users, for example, by transferring cryptocurrency, stocks, or the like to one another.

In some examples, the P2P platform 812 can enable users to link payment instruments to their user accounts. As a result, users can use their linked payment instruments to access funds in their accounts or balances. In some examples, the payment instrument can be a credit card, debit card, card linked to multiple accounts or balances via software or hardware, a fob or other object having payment data stored thereon, or the like. In some examples, the payment instrument can be a virtual payment instrument or a physical payment instrument. In some examples, the virtual payment instrument can be issued in real-time or for temporary usage. In some examples, the virtual payment instrument can have the same or different payment data as a corresponding physical payment instrument. Payment instruments can be customizable using a design user interface of the payment application. Such customization can enable users to select colors, stamps, images, text, or the like for surface(s) of their payment instruments. In some examples, users can draw or otherwise interact with the design user interface to personalize surface(s) of their payment instruments.

In some examples, users can associate incentives with their payment instruments. Incentives can be recommended to users based on user preferences (inferred or explicitly identified), geolocation, propensity to redeem, value, and/or the like. In some examples, incentives can be particular to individual merchants, types of merchants, types of transactions, and/or the like. In at least one example, when a user uses their payment instrument at a merchant or type of merchant associated with an incentive, or for a transaction type associated with an incentive, the P2P platform 812 can automatically apply the incentive to the transaction. In some examples, users can gift other users "gift cards" that can be associated with payment instruments. That is, a user can transfer an amount of funds to another user and such funds can be associated with a condition (e.g., merchant, merchant type, transaction type, location, etc.) that, upon satisfaction, enables the amount of funds, or a portion thereof, to be applied to a transaction. In at least one example, when a user uses their payment instrument for a transaction that satisfies the condition, the P2P platform 812 can automatically apply the amount of funds associated with the gift card to the transaction.

In some examples, users can configure their account such that when they use their payment instruments, the P2P platform 812 can deposit an amount of funds into a savings account, investing account, bitcoin account, or the like.

In some examples, users can search for or browse other users, merchants, items, or the like via the payment application. In some examples, search results can be personalized and/or customized for the user (e.g., based on user data collected with consent of the user). In some examples, users can shop or otherwise purchase items from other users, merchants, or the like from within the payment application or via a deep link to a merchant application or website.

The P2P platform 812 can offer primary and secondary accounts, wherein a primary account is a sponsor or other delegate of one or more secondary accounts. Such accounts can be useful for families, wherein a parent or other guardian is a sponsor or delegate to one or more child accounts, or where a child is a sponsor or delegate of an elderly parent's account. In some examples, primary accounts can establish limits on secondary accounts, such as spending limits, or the like. In some examples, the primary account owner is the user legally responsible for the account and their identity may be verifiable for secondary user accounts to perform certain transactions, such as buying/selling cryptocurrency or stocks. In some examples, one or more primary accounts and one or more secondary accounts can form a "group" with shared goals, such as saving, investing, or the like.

The P2P platform 812 can present activity data via an activity user interface of the payment application. In some examples, activity can be presented by merchant, date, time, amount, or the like. In some examples, interactions between entities can be represented in conversational communications such that each interaction or transaction is represented as a message. In some examples, users can interact with individual messages and/or send/request funds from within such a conversational communication. In some examples, such conversational communications can represent conversations of a group of two or more users. Groups can be used to pool funds, obtain group discounts or incentives, or enable multiple users to participate in financial transactions together (e.g., group investing, group savings, etc.).

The P2P platform 812 can offer a variety of financial training or learning opportunities. In some examples, such training or learning can be personalized for individual users, for example, based on user data and/or transaction data of the user that is obtained with consent of the user. In some examples, such user data and/or transaction data can be analyzed to make actionable recommendations with respect to optimizing financial health of users of the P2P platform 812.

In some examples, components of the environment 800 may be integrated to enable payments at the point-of-sale using assets associated with user accounts of the P2P platform 812. As illustrated in the environment 800, the components can communicate with one another via the network 804, where one or more APIs 818 or other functional components can be used to facilitate such communication.

In at least one example, an integration can enable a customer to participate in a transaction via their own computing device (e.g., user device 806(B)) instead of interacting with a merchant device of a merchant, such as the seller device 806(A). In such an example, the POS application 820, associated with a payment processing platform and executable by the seller device 806(A) of the merchant, can present a Quick Response (QR) code, or other code that can be used to identify a transaction (e.g., a transaction code), in association with a transaction between the customer and the merchant. The QR code, or other transaction code, can be provided to the POS application 820 via an API 818 associated with the peer-to-peer payment platform. In an example, the customer can utilize their own computing device, such as the user device 806(B), to capture the QR code, or the other transaction code, and to provide an indication of the captured QR code, or other transaction code, to server(s) 802.

Based at least in part on the integration of the peer-to-peer payment platform and the payment processing platform (e.g., via the API 818), the server(s) 802 of the merchant platform 810 can exchange communications with a payment application 826 associated with the P2P platform 812 and/or the POS application 820 to process payment for the transaction using a peer-to-peer payment where the customer is a first "peer" and the merchant is a second "peer."

Based at least in part on receiving an indication of which payment method a user (e.g., customer or merchant) intends to use for a transaction, techniques described herein utilize an integration between the P2P platform 812 and merchant platform 810 (which can be a first- or third-party integration) such that a QR code, or other transaction code, specific to the transaction can be used for providing transaction details, location details, customer details, or the like to a computing device of the customer, such as the user device 806(1B), to enable a contactless (peer-to-peer) payment for the transaction, and transferring funds from an account of the customer to an account of the merchant.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 806(B), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 820 and the payment application 826, as described herein, can process a payment transaction by routing information input via the merchant application to the payment application for completing a "frictionless" payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecoimerce transactions. A customer computing device, such as the user device 806(B), can be specially configured as a buyer-facing device having functionality similar to the functionality described above in the brick-and-mortar example.

In some examples, based at least in part on capturing the QR code, or other transaction code, the merchant platform 810 can provide transaction data to the P2P platform 812 for presentation via the payment application 826 on the computing device of the customer, such as the user device 80613(B), to enable the customer to complete the transaction via their own computing device. In some examples, in response to receiving an indication that the QR code, or other transaction code, has been captured or otherwise interacted with via the customer computing device, the P2P platform 812 can determine that the customer authorizes payment of the transaction using funds associated with a stored balance of the customer that is managed and/or maintained by the P2P platform 812. Such authorization can be implicit such that the interaction with the transaction code can imply authorization of the customer. Alternatively or additionally, the P2P platform 812 can request express authorization to process payment for the transaction using the funds associated with the stored balance and the customer can interact with the payment application to expressly authorize the settlement of the transaction. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance e.g., implicitly or explicitly) of the customer, the P2P platform 812 can transfer funds from the stored balance of the customer to the merchant platform 810. In at least one example, the merchant platform 810 can deposit the funds, or a portion thereof, into a stored balance of the merchant that is managed and/or maintained by the merchant platform 810. In such an example, the merchant platform 810 can be a "peer" to the customer in a peer-to-peer transaction.

In some examples, techniques described herein can enable the customer to interact with the transaction after payment for the transaction has been settled. For example, in at least one example, the merchant platform 810 can cause a total amount of a transaction to be presented via a user interface associated with the payment application 826 such that the customer can provide gratuity, feedback, loyalty information, or the like, via an interaction with the user interface. In another example, the merchant platform 810 can adjust a total amount of a transaction based on events during a shopping experience, such as adding or removing a charge to the total amount based on whether a media content item requested by the customer to be played during a shopping experience was in fact played. In some examples, because the customer has already authorized payment via the P2P platform 812, if the customer inputs a tip and/or an event affecting the total amount of the transaction is triggered, the P2P platform 812 can transfer additional funds, associated with the tip or event, to the merchant platform 810. This pre-authorization (or maintained authorization) of sorts can enable faster, more efficient payment processing when the tip is received and/or the event initiates the trigger. Further, the customer can provide feedback and/or loyalty information via the user interface presented by the payment application, which can be associated with the transaction. Using the pre-authorization techniques described herein results in fewer data transmissions and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 826 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. In some examples, the payment instrument can be associated with the P2P platform 812 as described herein (e.g., a debit card linked to a stored balance of a customer) such that when the payment instrument is caused to interact with a payment reader, the merchant platform 810 can exchange communications with the P2P platform 812 to authorize payment for a transaction and/or provision associated transaction data to a computing device of the customer associated with the transaction.

Turning now to media content functionality provided by the environment 800, the media content platform 814 can provide digital media to a content consumption device 806(D) where playback may occur using "streaming." In examples, "streaming" media content involves encoding the media content and transmitting the encoded media content over the network 804 to a media player or a media application executing on a device (e.g., via a speaker). The device then decodes and plays the media content while data is being received. In some cases, a buffer queues some of the data of the media content (e.g., audio data, video data, etc.) ahead of the media being played. During moments of network congestion, which leads to lower available bandwidth, less media content data is added to the buffer, which drains down as media content is being dequeued during streaming playback. However, during moments of high network bandwidth, the buffer is replenished, adding media content data to the buffer.

In at least one example, the media content platform 814 can provide a digital media streaming service (e.g., subscription-based, non-subscription-based) that enables a content consumption device 806(D) to stream and/or download digital media content via a listener application 828 installed on the content consumption device 806(1)). For instance, the media content platform 814 may comprise a digital audio streaming service (e.g., for music, podcasts, audiobooks, etc.), a digital video streaming service, and/or a streaming service that provides streaming of various different types of digital media content or multimedia. In such cases where digital media content items are downloaded and stored locally on the content consumption devices 806(D), the listener application 828 may verify access rights to the digital media content items at time intervals, for instance intermittently (e.g., when the content consumption device 806(D) has a network connection with the media content platform 814 via the network(s) 804), and/or at regular intervals (e.g., daily, weekly, monthly, etc.). In examples, access rights to the digital media content items may be provided when a subscription to the media content platform 814 is active, while access rights to the digital media content items may be withheld when the subscription to the media content platform 814 is terminated. Enabling storage on the end user devices 806 and subsequent access to digital media content items via the listener application 828 provides the users 816 with the ability to access the digital media content items "offline" such as when a connection to the media content platform 814 via the network(s) 804 is unavailable or unreliable.

In some examples, the media content platform 814 may additionally or alternatively provide an artist management service that enables the users 816 to manage aspects of artist business via an artist application 830 installed on the artist user device 806(E), such as data analytics and management (e.g., listener data, consumer data, etc.), marketing, regulatory obligations, cash flow management, publishing, customer relationship management (CR M), social media, event coordination, industry communications, digital media content ingestion and storage, and so forth. In some cases, the users 816 can have graduated access to the services, which can be based on a user type (e.g., artist, group member, personal manager, business manager, attorney, agent, etc.), risk tolerance, artist verification status, listener and/or viewer analytics (e.g., number of streams in a month), and so on. In some cases, multiple users 816 may have access to a single user account via respective end user devices 806, with the various users having different access privileges to services provided by the artist management service. In various scenarios, an artist can designate functions provided by the artist management service to different members of the team associated with the artist, thus granting the respective team members access to services suited to the skills of the individual team members.

In some cases, the artist application 830 and the listener application 828 may be distinct applications having differing user experiences and verification processes for access, such as illustrated in the environment 800. For instance, the media content platform 814 may request additional verification, such as a link to an artist website, a sample of an artist's work, a verified credential supplied by a third party, etc. to grant access to the artist application 830 in addition to information requested to access the listener application 828. Further, the artist application 830 may provide the artist management services described herein, without the subscription-based digital media streaming services described herein, and vice versa. However, examples are also considered in which functionality provided by the artist application 830 and the listener application 828 partially or fully overlap, and/or where verification processes for access are substantially similar.

In at least some examples, the media content platform 814 enables interaction between the users 816 utilizing the listener application 828 installed on the content consumption devices 806(D), and the users 816 utilizing the artist application 830 installed on the artist user devices 806(E). For example, the media content platform 814 may provide interconnectivity between the subscription-based digital media streaming service and the artist management service. Functionality provided by the media content platform 814 in such instances may include a communication channel between one or more of the users 816 (e.g., a listener, fan, music supervisor, publisher, etc.) utilizing the listener application 828 and another user (e.g., an artist) of the users 816 utilizing the artist application 830. The communication channel may include, for instance, a messaging platform (also referred to as a "messaging application" herein), a live streaming platform, a videoconferencing or teleconferencing platform, and/or a combination of these.

Additionally, in some cases, the media content platform 814 may facilitate a resource transfer between the listener application 828 and the artist application 830. In an example, the media content platform 814 may direct a resource, such as a portion of a subscription fee paid by one of the users 816 designated as a listener, to one or more of the users 816 designated as artists based on a number of instances that the listening user consumed (e.g., streamed, downloaded, etc.) content created by respective ones of the artist users. Alternatively or additionally, the media content platform 814 may direct a resource, such as funds, from an account associated with a listening user to an account associated with an artist user (or vice versa), in accordance with transfers between accounts as described herein. The media content platform 814 may facilitate resource transfers in examples such as merchandise purchases, event ticket purchases, "tipping" an artist, payments for royalties or other fees, and so forth.

In some examples, the media content platform 814 enables interaction between individual ones of the users 816 with one another via the listener application 828 installed on the content consumption device 806(D) and other of the content consumption devices 806( )) via a communication channel as described above. In an example, the listener application 828 may provide functionality via a communication channel for a user to stream an individual digital media item, a playlist, or the like to an audience comprising other ones of the content consumption devices 806(D). Alternatively or additionally, the communication channel may facilitate sharing of individual digital media items, playlists, user and/or artist profiles, and the like between the users 816 via messages, uniform resource locators (URLs), quick response (QR) codes, and so forth.

In some cases, the media content platform 814 enables interaction between individual ones of the users 816 with one another via the artist application 830 installed on the artist user device 806(E) and other of the artist devices 806 via a communication channel as described above. In some instances, the media content platform 814 may provide recommendations for a particular user indicating which of the other users 816 to communicate with. Such a recommendation may be based on a similarity (or dissimilarity) of content created by two or more of the users 816, an overlap (or lack thereof) of audience members of the users 816, a geographic location of the users 816, a coinciding event location of the users 816, and so forth. In some examples, a user may input parameters for a desired connection via the artist application 830, and the media content platform 814 may filter which of the users 816 to surface for recommendations to the user based on the input parameters. Alternatively or additionally, the media content platform 814 may implement one or more machine learning models to filter which of the users 816 to surface for recommendations to the user. The recommendations provided by the media content platform 814 may be data driven and thus increase relevance of communications presented to the users 816 and reduce unsolicited communications that may be received by the users 816.

The media content platform 814 may interact with the server(s) 808 associated with the third-party service providers to, for instance, ingest digital media items, report digital media consumption data, pay royalties, and the like. In some examples, the server(s) 808 may be accessible by the media content platform 814 via one or more APIs 818 or other integrations. In some cases, the third-party service provider may be a digital media content provider (e.g., a record label, a performance rights organization (PRO), an independent artist, etc.). In such cases, the media content platform 814 may receive digital media content items from the server(s) 808, along with metadata associated with the digital media content items. The metadata, in some instances, may indicate individual contributors to a digital media content item such as an artist or artists, a songwriter (e.g., a composer, lyricist, author, etc.), a producer (which may further include a co-producer, a mastering engineer, a mixing engineer, a recording engineer, an arranger, a programmer, etc.), a musician (e.g., instrumentalist, vocalist, etc.), a visual artist, and so forth, with an indication of the role of the individual contributor. Alternatively or additionally, the metadata may indicate information such as release date, track title., track duration, clean or explicit version, jurisdiction information, and the like. The media content platform 814 may use the metadata to associate the digital media content item as being created by a particular user, to provide search results to the users 816, to generate playlists, and so forth. Further, the media content platform 814 may provide payments (e.g., royalties) to the third-party service provider based on a number of streams and/or downloads of individual digital media content items by the users 806 via the listener application 828.

Techniques described herein are directed to services provided via a distributed system of end user devices 806 that are in communication with server(s) 802 of the service provider. That is, techniques described herein are directed to a specific implementation—or, a practical application—of utilizing a distributed system of end user devices 806 that are in communication with server(s) 802 of the merchant platform 810, the P2P platform 812, and/or the media content platform 814 to perform a variety of services, as described above. The unconventional configuration of the distributed system described herein enables the server(s) 802 that are remotely-located from end-users (e.g., users 816) to intelligently offer services based on aggregated data associated with the end-users, such as the users 816 (e.g., data associated with multiple, different merchants and/or multiple, different buyers; data associated with multiple different listeners and/or multiple different artists, etc.), in some examples, in near-real time. Accordingly, techniques described herein are directed to a particular arrangement of elements that offer technical improvements over conventional techniques for performing payment processing services, P2P payment services, media content services, and the like. For small business owners and artists in particular, the business environment is typically fragmented and relies on unrelated tools and programs, making it difficult for an owner or an artist to manually consolidate and view such data. The techniques described herein constantly or periodically monitor disparate and distinct user accounts, e.g., accounts within the control of the merchant platform 810, the P2P platform 812, and/or the media content platform 814, and those outside of the control of these service providers, to track the standing (payables, receivables, payroll, invoices, appointments, capital, balances, collaborations, etc.) of the users 816. The techniques herein provide a consolidated view of a user's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services, P2P payment services, media content services, and/or additional or alternative services described herein. In some implementations, the distributed system is capable of applying the intelligence derived from an existing user base to a new user, thereby making the onboarding experience for the new user personalized and frictionless when compared to traditional onboarding methods. Further, models or algorithms that are used to implement techniques described herein may be retrained over time to improve outcomes for subsequent scenarios based on outcomes of previous scenarios. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 816 and end user devices 806. Furthermore, such features are changed dynamically based on the profiles of the users involved interacting with the GUIs. As such, techniques described herein are directed to improvements to computing systems.

The merchant platform 810, the P2P platform 812, and/or the media content platform 814 are capable of providing additional or alternative services, and the services described above are offered as a sampling of services. In at least one example, the merchant platform 810, the P2P platform 812, and/or the media content platform 814 can exchange data with the server(s) 808 associated with third-party service providers. Such third-party service providers can provide information that enables the merchant platform 810, the P2P platform 812, and/or the media content platform 814 to provide services, such as those described above. In additional or alternative examples, such third-party service providers can access services of the merchant platform 810, the P2P platform 812, and/or the media content platform 814. That is, in some examples, the third-party service providers can be subscribers, or otherwise access, services of the merchant platform 810, the P2P platform 812, and/or the media content platform 814.

FIG. 9 illustrates an example environment 900 including a service provider system 902 which may be associated with the server(s) 802 of FIG. 8. The environment 900 may also include a user device 904, which may correspond to any of the end user devices 806 described in relation to FIG. 8. In examples, the service provider system 902 may include one or a combination of the merchant platform 810, the P2P platform 812, or the media content platform 814, as well as one or more data store(s) 906 that can store assets in an asset storage 908, as well as data in user account(s) 910. In some examples, the data store(s) 906 may be the same as or similar to the data store(s) 114 introduced in FIG. 1. In some examples, the environment 900 may also include a public blockchain 914, one or more nodes 916, and/or a hardware wallet 918. The service provider system 902, the user device 904, public blockchain 914, the node(s) 916, and the hardware wallet 918 may be connected and able to communicate via one or more networks 920, which may have the same or similar functionality described in relation to the network 804 of FIG. 8.

In some examples, user account(s) 910 can include merchant account(s), customer account(s), media content subscriber account(s), artist account(s), and so forth. In at least one example, the asset storage 908 can be used to record whether individual assets are registered to a user account 910. For example, the asset storage 908 can include asset wallet(s) 922 for storing records of assets owned by the service provider system 902, such as cryptocurrency, securities, NFTs, or the like, and communicating with one or more asset networks, such as cryptocurrency networks, NFT networks, securities networks, or the like. In some examples, the asset network can be a first-party network or a third-party network, such as a cryptocurrency exchange or the stock market. In examples where the asset network is a third-party network, the server(s) 808 of FIG. 8 can be associated therewith.

The asset wallet 922 can be associated with one or more addresses and can vary addresses used to acquire assets (e.g., from the asset network(s)) so that its holdings are represented under a variety of addresses on the asset network. In examples where the service provider system 902 has holdings of cryptocurrency (e.g., in the asset wallet 922), a user can acquire cryptocurrency directly from the service provider system 902. In some examples, the service provider system 902 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In some scenarios, the buying and selling of cryptocurrency, and therefore the associated updating of the public ledger of an asset network can be separate from a customer-merchant transaction or a peer-to-peer transaction, and therefore not necessarily time-sensitive. This can enable batching transactions to reduce computational resources and/or costs. The service provider system 902 can provide the same or similar functionality for securities or other assets.

The asset storage 908 may contain ledgers that store records of assignments of assets to users 816. Specifically, the asset storage 908 may include asset ledger 924, fiat currency ledger 926, and/or other ledger(s) 928, which can be used to record transfers of assets between users 816 and/or one or more third parties (e.g., merchant network(s), payment card network(s), ACH network(s), equities network(s), the asset network, securities networks, etc.). In doing so, the asset storage 908 can maintain a running balance of assets managed by the service provider system 902. The ledger(s) of the asset storage 908 can further indicate some of the running balance for individual ledger(s) stored in the asset storage 908 are assigned or registered to one or more user account(s) 910.

In at least one example, the asset storage 908 can include transaction logs 930, which can include, as transaction data, records of past transactions involving the service provider system 902 and/or the user account 910. In some examples, the data store(s) 906 can store a private blockchain 932. A private blockchain 932 can function to record sender addresses, recipient addresses, public keys, values of cryptocurrency transferred, and/or can be used to verify ownership of cryptocurrency tokens to be transferred. In some examples, the service provider system 902 can record transactions involving cryptocurrency until the number of transactions has exceeded a determined limit (e.g., number of transactions, storage space allocation, etc.). Based at least in part on determining that the limit has been reached, the service provider system 902 can publish the transactions in the private blockchain 932 to the public blockchain 914 (e.g., associated with the asset network), where miners can verify the transactions and record the transactions to blocks on the public blockchain 914. In at least one example, the service provider system 902 can participate as miner(s) at least for transactions to which the respective platform is a party to, to be posted to the public blockchain 914.

In some cases, the data store(s) 906 can store and/or manage multiple user accounts, an example of which is described in relation to the user account 910. In at least one example, the user account 910 can include user account data 934, which can include, but is not limited to, data associated with user identifying information (e.g., name, phone number, address, artist or band name, verified credentials, etc.), user identifier(s) (e.g., alphanumeric identifiers, etc.), user preferences (e.g., learned or user-specified), purchase history data (e.g., identifying one or more items purchased (and respective item information), subscription tier information, etc.), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 934 can include account activity 936 and user wallet key(s) 938. In some examples, the user wallet key(s) 938 can include a public-private key-pair and a respective address associated with the asset network or other asset networks. In some examples, the user wallet key(s) 938 may include one or more key pairs, which can be unique to the asset network or other asset networks.

In addition to the user account data 934, the user account 910 can include ledger(s) for account(s) managed by the service provider system 902, for the user. For example, the user account 910 may include an asset ledger 924, a fiat currency ledger 926, and/or one or more other ledgers 928. The ledger(s) can indicate that a corresponding user utilizes the service provider system 902 to manage corresponding accounts (e.g., a cryptocurrency account, a securities account, a fiat currency account, an artist account, etc.). It should be noted that in some examples, the ledger(s) can be logical ledger(s) and the data can be represented in a single database. In some examples, individual ones of the ledger(s), or portions thereof, can be maintained by the service provider system 902.

In some examples, the asset ledger 924 can store a balance for each of one or more cryptocurrencies (e.g., Bitcoin, Ethereum, Litecoin, etc.) registered to the user account 910. In at least one example, the asset ledger 924 can further record transactions of cryptocurrency assets associated with the user account 910. For example, the user account 910 can receive cryptocurrency from the asset network using the user wallet key(s) 938. In some examples, the user wallet key(s) 938 may be generated for the user upon request. User wallet key(s) 938 can be requested by the user in order to send, exchange, or otherwise control the balance of cryptocurrency held by the service provider system 902 (e.g., in the asset wallet 922) and registered to the user. In some examples, the user wallet key(s) 938 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider system 902 and the value is credited as a balance in asset ledger 924), by purchasing currency in the form associated with the account using currency in a different form (e.g., buying a value of cryptocurrency from the service provider system 902 using a value of fiat currency reflected in fiat currency ledger 926, and crediting the value of cryptocurrency in asset ledger 924), or by conducting a transaction with another user (customer or merchant) of the service provider system 902 wherein the account receives incoming currency (which can be in the form associated with the account or a different form, in which the incoming currency may be converted to the form associated with the account).

With specific reference to funding a cryptocurrency account, a user may have a balance of cryptocurrency stored in another cryptocurrency wallet. In some examples, the other cryptocurrency wallet can be associated with a third-party unrelated to the service provider system 902 (i.e., an external account). Such a transaction can request that the user to transfer an amount of the cryptocurrency in a message signed by user's private key to an address provided by the service provider system 902. In at least one example, the transaction can be sent to miners to bundle the transaction into a block of transactions and to verify the authenticity of the transactions in the block. Once a miner has verified the block, the block is written to the public blockchain 914 where the service provider system 902 can then verify that the transaction has been confirmed and can credit the user's asset ledger 924 with the transferred amount. When an account is funded by transferring cryptocurrency from a third-party cryptocurrency wallet, an update can be made to the public blockchain 914. In some cases, this update of the public blockchain 914 need not take place at a time-critical moment, such as when a transaction is being processed by a merchant in store or online.

In some examples, a user can purchase cryptocurrency to fund their cryptocurrency account. In some examples, the user can purchase cryptocurrency through services offered by the service provider system 902. As described above, in some examples, the service provider system 902 can acquire cryptocurrency from a third-party source. In examples where the service provider system 902 has its own cryptocurrency assets, cryptocurrency transferred in a transaction (e.g., data with address provided for receipt of transaction and a balance of cryptocurrency transferred in the transaction) can be stored in an asset wallet 922 associated with the service provider system 902. In at least one example, the service provider system 902 can credit the asset ledger 924 of the user. Additionally, while the service provider system 902 recognizes that the user retains the value of the transferred cryptocurrency through crediting the asset ledger 924, an inspection of the blockchain will show the cryptocurrency as having been transferred to the service provider system 902. In some examples, the asset wallet 922 can be associated with many different addresses. In such examples, an inspection of the blockchain may not necessarily associate all cryptocurrency stored in asset wallet 922 as belonging to the same entity. The presence of a private ledger used for real-time transactions and maintained by the service provider system 902, combined with updates to the public ledger at other times, allows for extremely fast transactions using cryptocurrency to be achieved. In some examples, the "private ledger" can refer to the asset ledger 924, which in some examples, can utilize the private blockchain 932, as described herein. The "public ledger" can correspond to the public blockchain 914 associated with the asset network.

In at least one example, an asset ledger 924, fiat currency ledger 926, or the like associated with the user account 910 can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 924. In some examples, a user can receive fiat currency or another currency in the form of payment for a transaction with another user. In at least one example, at least a portion of such funds can be converted into cryptocurrency by the service provider system 902 and used to fund the asset ledger 924 of the user.

In examples, a user can also have an account in U.S. dollars, which can be tracked, for example, via the fiat currency ledger 926. Such an account can be funded by transferring money from a bank account at a third-party bank to an account maintained by the service provider system 902 as is conventionally known. In some examples, a user can receive fiat currency in the form of payment for a transaction with another user. In such examples, at least a portion of such funds can be used to fund the fiat currency ledger 926.

In some examples, a user can have one or more internal payment cards registered with the service provider system 902. Internal payment cards can be linked to one or more of the accounts associated with the user account 910. In some embodiments, options with respect to internal payment cards can be adjusted and managed using an application (e.g., the payment application 826, a wallet application 912, etc.).

In at least one example, the user account 910 can be associated with the asset wallet accessible via a wallet application 912 of the user device 904, or a stored balance for use in payment transactions, peer-to-peer transactions, payroll payments, etc. In at least one example, the asset wallet 922 can store data indicating an address provided for receipt of a cryptocurrency transaction. In at least one example, the balance of the asset wallet 922 can be based at least in part on a balance of the asset ledger 924. In at least one example, funds availed via the asset wallet 922 can be stored in the asset wallet 922. Funds availed via the asset wallet 922 can be tracked via the asset ledger 924. The asset wallet 922, however, can be associated with additional cryptocurrency funds.

In at least one example, when the service provider system 902 includes a private blockchain 932 for recording and validating cryptocurrency transactions, the asset wallet 922 can be used instead of, or in addition to, the asset ledger 924. For example, a merchant can provide the address of the asset wallet 922 for receiving payments. In an example where a customer is paying in cryptocurrency and the customer has their own cryptocurrency wallet account associated with the service provider system 902, the customer can send a message signed by its private key including its wallet address (i.e., of the customer) and identifying the cryptocurrency and value to be transferred to the merchant's asset wallet 922. The service provider system 902 can complete the transaction by reducing the cryptocurrency balance in the customer's cryptocurrency wallet and increasing the cryptocurrency balance in the merchant's asset wallet 922. In addition to recording the transaction in the respective cryptocurrency wallets, the transaction can be recorded in the private blockchain 932 and the transaction can be confirmed. A user can perform a similar transaction with cryptocurrency in a peer-to-peer transaction as described above.

While the asset ledger 924 and/or asset wallet 922 are each described above with reference to cryptocurrency, the asset ledger 924 and/or asset wallet 922 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider system 902 is an aspect of the technology disclosed that enables technical advantages of increased processing speed and improved security.

The description of the environment 900 above generally relates to a centralized service provider system 902 that at least partially facilitates storing and managing assets in the data store 906. However, the environment 900 may also facilitate decentralized storage and management of assets alternatively or in addition to centralized storage and management as described above. For instance, the environment 900 may include a decentralized platform implemented using a plurality of nodes (e.g., web nodes), an example of which is illustrated as node 916. The node 916 is representative of a computer or other device tasked with validating transactions and/or maintaining a copy of a blockchain ledger, such as a ledger associated with the public blockchain 914. The decentralized platform may be implemented via the environment 900 through use of decentralized identifiers and verifiable credentials that are stored and managed by user devices 904. A decentralized identifier is configured as a self-owned identifier that supports decentralized authentication and routing. A self-owned identifier in a blockchain network is a unique identifier that is owned and controlled by an individual entity on the blockchain, as contrasted with an entity controlled by a centralized authority (e.g., the service provider system 902). The decentralized identity referenced by a decentralized identifier gives an entity control over what data can be accessed, stored, modified, and so forth by other entities, such as the service provider system 902.

The node 916, as representative of one of a plurality of decentralized nodes (e.g., decentralized web nodes), supports data storage and relays that allows entities, service provider systems, individuals, organizations and so forth to send, store, and receive encrypted or public messages and data. The node 916 is universally addressable and is "crawlable" using data addressing in relation to the decentralized identifiers. The node 916 is also configured to support decentralized replication of data across the nodes that is consistent across multiple nodes over time through continued data communication between the nodes in the decentralized platform. The node 916 is configurable to support secure encryption through use of a cryptographic key associated with an individual's decentralized identifier and support semantic discovery to discover different forms of published data.

Verifiable credentials are an open standard for digital credentials, and employ a data format for cryptographic presentation and verification of claims. A verifiable credential represents an indication of trust of a piece of information related to an entity. For example, a verifiable credential indicates that the issuer of the verifiable credential trusts the holder of the verifiable credential; the holder trusts a verifier of the verifiable credential; and that the verifier trusts the issuer. Verifiable credentials may be issued by anyone, about anything, and can be presented to and verified by everyone granted access to the verifiable credential. Accordingly, a user of the user device 904 may be an issuer, a holder, and/or a verifier, as can the service provider system 902.

In some examples, the user device 904 may implement a wallet application 912 configured to manage decentralized identifiers and/or verifiable credentials. For instance, the wallet application 912 may provide a user interface for implementation of access controls to various data associated with the decentralized identifier by the service provider system 902, to other user devices, and so forth. Additionally, the wallet application 912 may be configured to provide functionality for resource transfers (e.g., cryptocurrency, fiat currency, etc.) with the service provider system 902, other user devices, and the like, based on techniques described herein.

In some examples, the hardware wallet 918 may store cryptocurrency assets in combination with the wallet application 912 and the service provider system 902. For instance, the hardware wallet 918, the wallet application 912, and the service provider system 902 may each store a respective, different private key, where a transaction with the cryptocurrency assets is signed by at least two of the three private keys. The user interface provided by the wallet application 912 may allow a user to request a transaction. The wallet application 912 may then sign the transaction with the private key of the wallet application 912, have either the hardware wallet 918 or the service provider system 902 use a second of the three private keys to sign the transaction, and then provide the transaction with two signatures to the public blockchain 914 for processing.

Figure 10:
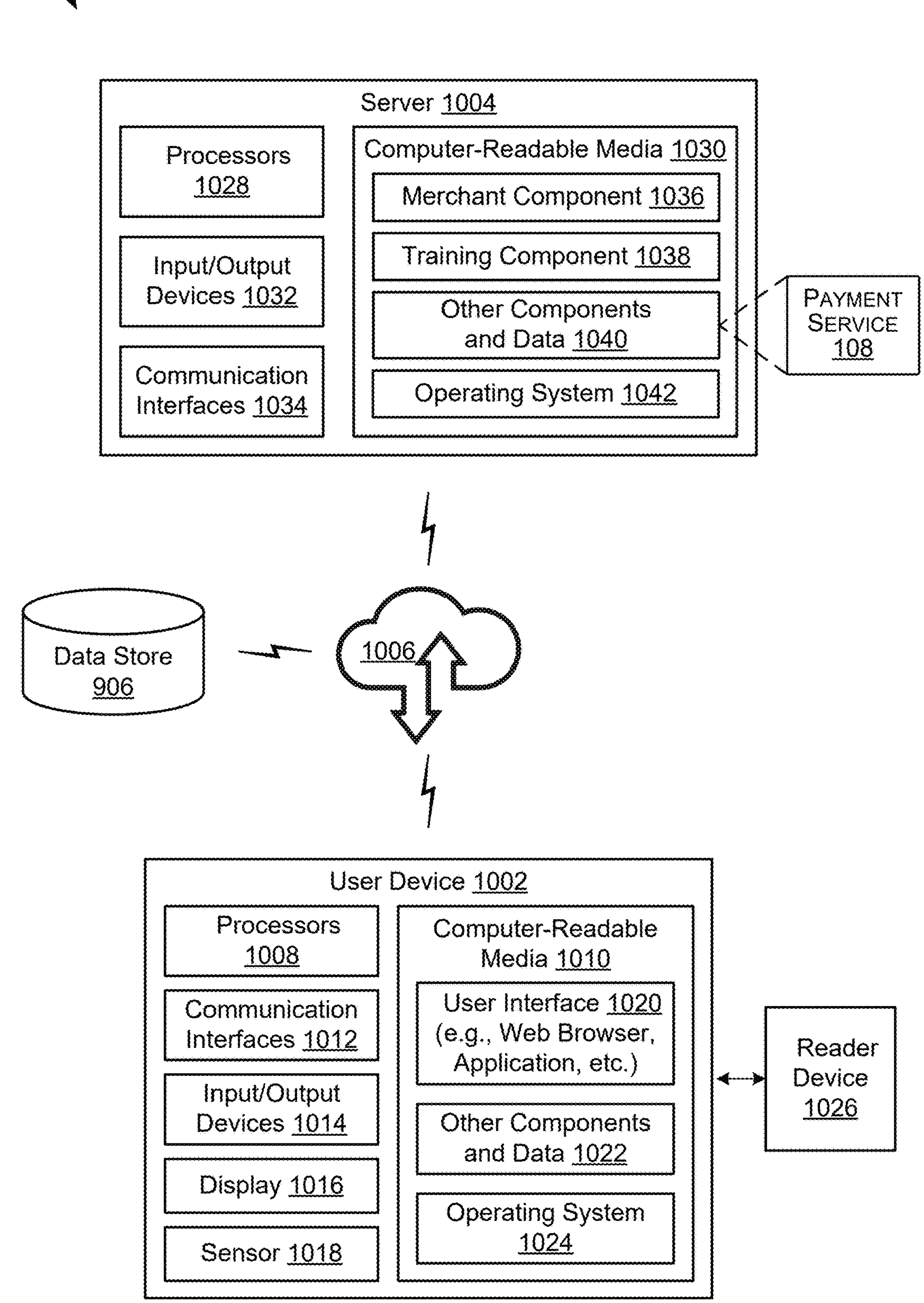
FIG. 10 is an example data store used for performing techniques described herein.

FIG. 10 depicts an illustrative block diagram illustrating a system 1000 for performing techniques described herein. The system 1000 includes a user device 1002, that communicates with server computing device(s) (e.g., server(s) 1004) via network(s) 1006 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1002 is illustrated, in additional or alternate examples, the system 1000 can have multiple user devices, as described above with reference to FIG. 8.

In some examples, the server(s) 1004 may be the same as or similar to the server(s) of the PSS 110 introduced in FIG. 1, and the server(s) 1004 may implement the payment service 108. Accordingly, the server(s) 1004 may include the payment personalization component 126, the AI model(s) 128, the payment processing component 130, and/or the screen sharing component 132, as described herein. Furthermore, the user device(s) 1002 may be the same as or similar to the user device(s) 104 introduced in FIG. 1, the network(s) 1006 may be the same as or similar to the network(s) 112 introduced in FIG. 1, and/or the data store(s) 906 may be the same as or similar to the data store(s) 114 introduced in FIG. 1. In addition, the user interface 1020 may be a user interface of the payment application 106 introduced in FIG. 1.

In accordance with the examples described herein, the server(s) 1004 may facilitate multi-user content personalization. The server(s) 1004 may receive, from a first user device 1002 executing a payment application, a first request to personalize a first payment from a first payor to a payee. The server(s) 1004 may receive, from a second user device 1002 executing the payment application, a second request to personalize a second payment from a second payor to the payee. The server(s) 1004 may present, to the first payor via the payment application, a customization user interface 1020 from which the first payor is able to customize a first screen to be presented to the payee, wherein a personalized payment functionality is selectively enabled for the first payor. The server(s) 1004 may present, to the second payor via the payment application, the customization user interface 1020 from which the second payor is able to customize a second screen to be presented to the payee, wherein the personalized payment functionality is disabled for the second payor. The server(s) 1004 may receive, from the first user device 1002, the first screen customized by the first payor. The server(s) 1004 may receive, from the second user device 1002, the second screen customized by the second payor. The server(s) 1004 may combine the first screen and the second screen to generate combined output. The server(s) 1004 may receive an indication that the payee has opened the payment application on a third user device 1002, and, in response to receiving the indication, the server(s) 1004 may cause the combined output to be displayed via a user interface 1020 of the payment application executing on the third user device 1002.

In at least one example, the user device 1002 can be any suitable type of computing device, e.g., portable, semi-portable, semi-stationary, or stationary. Some examples of the user device 1002 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, a speaker device, an automobile or other vehicle type, an Internet of Things (IoT) device, etc. That is, the user device 1002 can be any computing device capable of sending communications and performing the functions according to the techniques described herein. The user device 1002 can include devices, e.g., payment card readers, or components capable of accepting payments, as described below. The user device 1002 may be representative of, and provide functionality for, the user devices 806 described in relation to FIG. 8.

In the illustrated example, the user device 1002 includes one or more processors 1008, one or more computer-readable media 1010, one or more communication interface(s) 1012, one or more input/output (I/O) devices 1014, a display 1016, sensor(s) 1018, one or more encoders 1046, and one or more decoders 1048.

In at least one example, each processor 1008 can itself comprise one or more processors or processing cores. For example, the processor(s) 1008 can be implemented as one or more microprocessors, microcomputers, microcontrollers, digital signal processors, central processing units, state machines, logic circuitries, and/or any devices that manipulate signals based on operational instructions. In some examples, the processor(s) 1008 can be one or more hardware processors and/or logic circuits of any suitable type specifically programmed or configured to execute the algorithms and processes described herein. The processor(s) 1008 can be configured to fetch and execute computer-readable processor-executable instructions stored in the computer-readable media 1010.

Depending on the configuration of the user device 1002, the computer-readable media 1010 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1010 can include, but is not limited to, RAM, ROM, EEPROM, flash memory, solid-state storage, magnetic disk storage, optical storage, and/or other computer-readable media technology. Further, in some examples, the user device 1002 can access external storage, such as RAID storage systems, storage arrays, network attached storage, storage area networks, cloud storage, or any other medium that can be used to store information and that can be accessed by the processor(s) 1008 directly or through another computing device or network. Accordingly, the computer-readable media 1010 can be computer storage media able to store instructions, components or components that can be executed by the processor(s) 1008. Further, when mentioned, non-transitory computer-readable media exclude media such as energy, carrier signals, electromagnetic waves, and signals per se.

The computer-readable media 1010 can be used to store and maintain any number of functional components that are executable by the processor(s) 1008. In some implementations, these functional components comprise instructions or programs that are executable by the processor(s) 1008 and that, when executed, implement operational logic for performing the actions and services attributed above to the user device 1002. Functional components stored in the computer-readable media 1010 can include a user interface 1020 to enable users to interact with the user device 1002, and thus the server(s) 1004 and/or other networked devices. In some examples, the user interface 1020 can be the user interfaces 136, 142, 200, 300A, 300B, 400A, 400C, 400D, 400G, and 500 described above. In at least one example, a user can interact with the user interface via touch input, spoken input, gesture, or any other type of input. The word "input" is also used to describe "contextual" input that may not be directly provided by the user via the user interface 1020. For example, user's interactions with the user interface 1020 are analyzed using, e.g., natural language processing techniques, user movement tracking techniques, eye tracking techniques, etc. to determine context or intent of the user, which may be treated in a manner similar to "direct" user input.

Depending on the type of the user device 1002, the computer-readable media 1010 can also optionally include other functional components and data, such as other components and data 1022, which can include programs, drivers, etc., and the data used or generated by the functional components. In addition, the computer-readable media 1010 can also store data, data structures and the like, that are used by the functional components. Further, the user device 1002 can include many other logical, programmatic and physical components, of which those described are merely examples that are related to the discussion herein.

In at least one example, the computer-readable media 1010 can include additional functional components, such as an operating system 1024 for controlling and managing various functions of the user device 1002 and for enabling user interactions.

The communication interface(s) 1012 can include one or more interfaces and hardware components for enabling communication with various other devices, such as over the network(s) 1006 or directly. For example, communication interface(s) 1012 can enable communication through one or more network(s) 1006, which can include, but are not limited to any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1006 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1002 can further include one or more input/output (I/O) devices 1014. The I/O devices 1014 can include speakers, a microphone, a camera, and various user controls (e.g., buttons, a joystick, a keyboard, a keypad, etc.), a haptic output device, and so forth. The I/O devices 1014 can also include attachments that leverage the accessories (audio-jack, USB-C, Bluetooth, etc.) to connect with the user device 1002.

In at least one example, user device 1002 can include a display 1016. Depending on the type of computing device(s) used as the user device 1002, the display 1016 can employ any suitable display technology. For example, the display 1016 can be a liquid crystal display, a plasma display, a light emitting diode display, an OLED (organic light-emitting diode) display, an electronic paper display, or any other suitable type of display able to present digital content thereon. In at least one example, the display 1016 can be an augmented reality display, a virtual reality display, or any other display able to present and/or project digital content. In some examples, the display 1016 can have a touch sensor associated with the display 1016 to provide a touchscreen display configured to receive touch inputs for enabling interaction with a graphic interface presented on the display 1016. Accordingly, implementations herein are not limited to any particular display technology. In some examples, the user device 1002 may not include the display 1016, and information can be presented by other means, such as aurally, haptically, etc.

In addition, the user device 1002 can include sensor(s) 1018. The sensor(s) 1018 can include a global positioning system ("GPS") device able to indicate location information. Further, the sensor(s) 1018 can include, but are not limited to, an accelerometer, gyroscope, compass, proximity sensor, camera, microphone, and/or a switch.

In some examples, the GPS device can be used to identify a location of a user. In at least one example, the location of the user can be used by the merchant platform 810, the P2P platform 812, and/or the media content platform 814, described above, to provide one or more services. That is, in some examples, the service provider can implement geofencing to provide particular services to users by the merchant platform 810, the P2P platform 812, and/or the media content platform 814.

In examples, the user device 1002 includes a codec system, which may comprise an encoder 1046 and/or a decoder 1048. The encoder 1046 is configured to encode a data stream or signal from an analog signal (e.g., an analog audio signal, an analog video signal, etc.) to a digital signal for transmission or storage. The decoder 1048 is configured to convert the digital signal back to an analog signal, such as for playback or editing. In some cases, the encoder 1046 may be configured to encode the data stream or analog signal in an encrypted format, and the decoder 1048 may accordingly be configured to decrypt the digital signal as part of the decoding process (e.g., using a cryptographic key). Additionally, in some examples, the encoder 1046 may compress data to reduce transmission bandwidth and/or storage space for the digital signal. One example of a compression codec system is a lossless codec, in which the digital data stream is a compressed format of the original data stream, but retains the information present in the original data stream. Another example of a compression codec system is a lossy codec which reduces the quality of the digital data stream but can increase the compression of the data stream relative to lossless codec systems. The codec system comprising the encoder 1046 and/or the decoder 1048 may be specialized to accomplish various different objectives, such as to preserve motion, preserve color, minimize latency, maintain fidelity, minimize bit-rate, optimize for different output device types, maintain synchronization of audio and video (e.g., using a metadata synchronization data stream), and so on. Although not explicitly illustrated in the example system 1000, the server 1004 may include an encoder 1046 and/or a decoder 1048 as well.

Additionally, the user device 1002 can include various other components that are not shown, examples of which include removable storage, a power source, such as a battery and power control unit, a barcode scanner, a printer, a cash drawer, and so forth.

In addition, as described in relation to FIG. 8, the user device 1002 can include, be connectable to, or otherwise be coupled to a reader device 1026, for reading payment instruments and/or identifiers associated with payment objects. The reader device 1026 can include a read head for reading a magnetic strip of a payment card, and further can include encryption technology for encrypting the information read from the magnetic strip. Additionally or alternatively, the reader device 1026 can be an EMV payment reader, which in some examples, can be embedded in the user device 1002. Moreover, numerous other types of readers can be employed with the user device 1002 herein, depending on the type and configuration of the user device 1002.

The reader device 1026 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data from various types of payment instruments. Accordingly, the reader device 1026 may include hardware implementation, such as slots, magnetic tracks, and rails with one or more sensors or electrical contacts to facilitate detection and acceptance of a payment instrument. That is, the reader device 1026 may include hardware implementations to enable the reader device 1026 to interact with a payment instrument via a swipe, a dip, or a tap to obtain payment data associated with a customer. Additionally or optionally, the reader device 1026 may also include a biometric sensor to receive and process biometric characteristics and process them as payment instruments, given that such biometric characteristics are registered with the payment service and connected to a financial account with a bank server. The reader device 1026 may include processing unit(s), computer-readable media, a reader chip, a transaction chip, a timer, a clock, a network interface, a power supply, and so on. That is, the reader device 1026 may include any of the computing components described herein with reference to the user device 1002 to implement the functionality provided by the reader device 1026.

In examples, the reader device 1026 includes a reader chip, which may perform functionality to control the power supply, among other functionality of the reader device 1026. The power supply may include one or more power supplies such as a physical connection to AC power or a battery. Power supply may include power conversion circuitry for converting AC power and generating a plurality of DC voltages for use by components of reader device 1026. When power supply includes a battery, the battery may be charged via a physical power connection, via inductive charging, or via any other suitable method.

The reader device 1026 may also include a transaction chip that may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. The transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1002, which can be a POS terminal, and the reader device 1026 are shown as separate devices, in additional or alternative examples, the user device 1002 and the reader device 1026 can be part of a single device, which may be a battery-operated device. In some examples, the reader device 1026 can have a display integrated therewith, which can be in addition to (or as an alternative of) the display 1016 associated with the user device 1002.

The server(s) 1004 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1004 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1004 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1004 can include one or more processors 1028, one or more computer-readable media 1030, one or more I/O devices 1032, and one or more communication interfaces 1034. Each processor 1028 can be a single processing unit or a number of processing units, and can include single or multiple computing units or multiple processing cores. The processor(s) 1028 can be implemented as one or more microprocessors, microcomputers, microcontrollers, digital signal processors, central processing units, state machines, logic circuitries, and/or any devices that manipulate signals based on operational instructions. For example, the processor(s) 1028 can be one or more hardware processors and/or logic circuits of any suitable type specifically programmed or configured to execute the algorithms and processes described herein. The processor(s) 1028 can be configured to fetch and execute computer-readable instructions stored in the computer-readable media 1030, which can program the processor(s) 1028 to perform the functions described herein.

The computer-readable media 1030 can include volatile and nonvolatile memory and/or removable and non-removable media implemented in any type of technology for storage of information, such as computer-readable instructions, data structures, program components, or other data. Such computer-readable media 1030 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1004, the computer-readable media 1030 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1030 can be used to store any number of functional components that are executable by the processor(s) 1028. In many implementations, these functional components comprise instructions or programs that are executable by the processors 1028 and that, when executed, specifically configure the one or more processors 1028 to perform the actions attributed above to the merchant platform 810, the P2P platform 812, and/or the media content platform 814. Functional components stored in the computer-readable media 1030 can optionally include a merchant component 1036, a training component 1038, and one or more other components and data 1040. In some examples, the one or more other components and data 1040 may include the payment service 108, which may include the AI model(s) 128, the payment personalization component 126, the AI model(s) 128, the payment processing component 130, and/or the screen sharing component 132, as described herein. The computer-readable media 1030 can additionally include an operating system 1042 for controlling and managing various functions of the server(s) 1004.

The merchant component 1036 can be configured to receive transaction data from POS systems, such as the POS system 824 described above with reference to FIG. 8. The merchant component 1036 can transmit requests (e.g., authorization, capture, settlement, etc.) to payment service server computing device(s) to facilitate POS transactions between merchants and customers. The merchant component 1036 can communicate the successes or failures of the POS transactions to the POS systems.

The training component 1038 can be configured to train models using machine-learning mechanisms, as well as retrain the models to improve outputs provided by the models based on feedback received over time. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1002 and/or the server(s) 1004 for use at a time after the data models have been trained (e.g., at runtime).

The one or more other components and data 1040 can include the payment service 108, which may include the AI model(s) 128, the payment personalization component 126, the AI model(s) 128, the payment processing component 130, and/or the screen sharing component 132, the functionality of which is described, at least partially, above. Further, the one or more other components and data 1040 can include programs, drivers, etc., and the data used or generated by the functional components. Further, the server(s) 1004 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The communication interface(s) 1034 can include one or more interfaces and hardware components for enabling communication with various other devices, such as over the network(s) 1006 or directly. For example, communication interface(s) 1034 can enable communication through one or more network(s) 1006, which can include, but are not limited to any type of network known in the art, as described herein.

The server(s) 1004 can further be equipped with various I/O devices 1032. Such I/O devices 1032 can include a display, various user interface controls (e.g., buttons, joystick, keyboard, mouse, touch screen, biometric or sensory input devices, etc.), audio speakers, connection ports and so forth.

In at least one example, the system 1000 can include a datastore 1044 that can be configured to store data that is accessible, manageable, and updatable. In some examples, the datastore 1044 can be integrated with the user device 1002 and/or the server(s) 1004. In other examples, as shown in FIG. 10, the datastore 1044 can be located remotely from the server(s) 1004 and can be accessible to the server(s) 1004. The datastore 1044 can comprise multiple databases and/or servers connected locally and/or remotely via the network(s) 1006. In at least one example, the datastore 1044 can store user profiles, which can include merchant profiles, customer profiles, artist profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, media content consumption data (e.g., number of streams of media content and by which artists, direct artist payouts, playlists generated or "favorited," durations of listening and/or watching individual media content items, actions performed while consuming media content (e.g., skips, repeats, volume changes, etc.), locations at which media content is consumed, devices used to consume media content, activities during which media content is consumed, etc.), etc.

Artist profiles can store data including, but not limited to, artist information (e.g., artist's performance or stage name, band name, artist's legal name, record label, phone number, address, social media handles, website address, banking information, etc.), artist preferences (e.g., learned or artist-specified), media content (and/or associated data) at least partially attributed to the artist (e.g., songs, videos, artists in a same genre or having shared listeners, etc.), event data (e.g., tour dates, appearance dates, appointments, etc.), financial data (e.g., advance data, recoupment data, royalty data, payouts data, etc.), payroll data (e.g., employees, contractors, venues, payroll frequency, etc.), listening data (e.g., number of streams on media content platform(s), listening trends, etc.), fan data (number of followers on media content platform(s), number of followers on social media platform(s), etc.), reservations data (e.g., venue reservations, studio recording reservations, previous reservations, upcoming (scheduled) reservations, reservation duration, interactions associated with such reservations, etc.), inventory data (e.g., merchandise inventory), customer service data, and so forth.

Furthermore, in at least one example, the datastore 1044 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1044 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described in the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

What is claimed is:

1. A computer-implemented method comprising:

receiving, by a payment service system, from a first user device executing a payment application associated with the payment service system, a first request to personalize a first payment from a first payor to a payee;

receiving, by the payment service system, from a second user device executing the payment application, a second request to personalize a second payment from a second payor to the payee;

presenting, by the payment service system, to each of the first payor and the second payor and in respective instances of the payment application executing on the first user device and the second user device, a customization user interface from which the first payor and the second payor are able to customize a screen to be presented to the payee;

selectively enabling, by the payment service system, for the first payor and in the customization user interface, a functionality associated with customizing a first screen based on a first amount of the first payment, the functionality being disabled for the second payor based on a second amount of the second payment;

receiving, by the payment service system, from the first user device, the first screen customized by the first payor;

receiving, by the payment service system, from the second user device, a second screen customized by the second payor;

determining, by the payment service system, and using a trained artificial intelligence model, a sequence in which the first screen and the second screen are to be displayed to the payee;

combining, by the payment service system, the first screen and the second screen to generate combined output by stitching together the first screen and the second screen such that the first screen and the second screen are displayable in the sequence;

receiving, by the payment service system, an indication that the payee has opened the payment application on a third user device; and in response to receiving the indication, causing, by the payment service system, the combined output to be displayed via a user interface of the payment application executing on the third user device, wherein the combined output is displayed by displaying the first screen and the second screen in the sequence.

2. The computer-implemented method of claim 1, further comprising:

determining, by the payment service system, that the first payment and the second payment are being sent to the same payee; and associating, by the payment service system, the first payment with the second payment based at least in part on the determining that the first payment and the second payment are being sent to the same payee.

3. The computer-implemented method of claim 1, wherein:

the combining further comprises determining a first duration for displaying the first screen and a second duration for displaying the second screen;

the stitching further comprises stitching together the first screen and the second screen such that the first screen is displayable for the first duration and the second screen is displayable for the second duration; and the combined output is displayed via the user interface by displaying the first screen for the first duration and displaying the second screen for the second duration.

4. The computer-implemented method of claim 1, further comprising:

determining, by the payment service system, a similarity metric associated with the first payment and the second payment;

determining, by the payment service system, that the similarity metric satisfies a threshold similarity; and associating, by the payment service system, the first payment with the second payment based at least in part on the similarity metric satisfying the threshold similarity.

5. The computer-implemented method of claim 1, wherein the customization user interface presented to each of the first payor and the second payor is configured to recognize one or more gestures for customizing the first screen and the second screen with content items.

6. A system comprising:

one or more processors; and memory storing computer-executable instructions that, when executed by the one or more processors, cause the one or more processors to perform operations comprising:

receiving, from a first user device executing a payment application, a first request to personalize a first payment from a first payor to a payee;

receiving, from a second user device executing the payment application, a second request to personalize a second payment from a second payor to the payee;

presenting, to the first payor via the payment application, a customization user interface from which the first payor is able to customize a first screen to be presented to the payee, wherein a personalized payment functionality is selectively enabled for the first payor;

presenting, to the second payor via the payment application, the customization user interface from which the second payor is able to customize a second screen to be presented to the payee, wherein the personalized payment functionality is disabled for the second payor;

receiving, from the first user device, the first screen customized by the first payor;

receiving, from the second user device, the second screen customized by the second payor;

determining, using a trained artificial intelligence model, at least one of:

a sequence in which the first screen and the second screen are to be displayed to the payee; or respective durations for which the first screen and the second screen are to be displayed to the payee;

combining, based on at least one of the sequence or the respective durations, the first screen and the second screen to generate combined output;

receiving an indication that the payee has opened the payment application on a third user device; and in response to receiving the indication, causing the combined output to be displayed via a user interface of the payment application executing on the third user device.

7. The system of claim 6, wherein:

the determining comprises determining the sequence;

the combining further comprises stitching together the first screen and the second screen such that the first screen and the second screen are displayable in the sequence; and the combined output is displayed via the user interface by displaying the first screen and the second screen in the sequence.

8. The system of claim 7, wherein the sequence is determined based at least in part on at least one of:

a first timestamp associated with the receiving the first screen from the first user device and a second timestamp associated with the receiving the second screen from the second user device;

a first amount of the first payment and a second amount of the second payment; or a first number of mutual connections of the first payor and the payee and a second number of mutual connections of the second payor and the payee.

9. The system of claim 6, wherein:

the determining comprises determining the respective durations as a first duration for displaying the first screen and a second duration for displaying the second screen;

the combining further comprises stitching together the first screen and the second screen such that the first screen is displayable for the first duration and the second screen is displayable for the second duration; and the combined output is displayed via the user interface by displaying the first screen for the first duration and displaying the second screen for the second duration.

10. The system of claim 9, wherein the first duration and the second duration are determined based at least in part on at least one of:

a first timestamp associated with the receiving the first screen from the first user device and a second timestamp associated with the receiving the second screen from the second user device;

a first amount of the first payment and a second amount of the second payment; or a first number of mutual connections of the first payor and the payee and a second number of mutual connections of the second payor and the payee.

11. The system of claim 6, wherein the personalized payment functionality is selectively enabled for the first payor and disabled for the second payor based at least in part on at least one of:

a first timestamp associated with the receiving the first screen from the first user device preceding a second timestamp associated with the receiving the second screen from the second user device;

a first amount of the first payment being greater than a second amount of the second payment; or a first number of mutual connections of the first payor and the payee being greater than a second number of mutual connections of the second payor and the payee.

12. The system of claim 6, wherein the personalized payment functionality allows at least one of:

the first payor to customize the first screen with one or more premium content items that are unavailable to the second payor for customizing the second screen;

the first screen to be displayed via the user interface before the second screen is displayed via the user interface; or the first screen to be displayed via the user interface for a first duration that is greater than a second duration for which the second screen is displayed via the user interface.

13. The system of claim 6, wherein:

the customization user interface is presented to each of the first payor and the second payor with an interactive element for customizing the first screen and the second screen with clips of audio content; and the operations further comprise:

receiving a second indication that the first payor interacted with the interactive element; and presenting, in the customization user interface displayed on the first user device, a list of audio content items available from a content item catalogue stored in a datastore.

14. The system of claim 6, wherein the customization user interface is presented to each of the first payor and the second payor with one or more interactive elements for providing a prompt to a generative artificial intelligence model to generate one or more content items for customizing the first screen and the second screen.

15. The system of claim 6, wherein:

the first request includes a destination identifier;

the second request includes the destination identifier;

the operations further comprise associating the first payment with the second payment based at least in part on the destination identifier being included in the first request and the second request; and the combining is based at least in part on the associating the first payment with the second payment.

16. A computer-implemented method comprising:

receiving, by a payment service system, from a first user device executing a payment application associated with the payment service system, a first request to personalize a first payment from a first payor to a payee;

receiving, by the payment service system, from a second user device executing the payment application, a second request to personalize a second payment from a second payor to the payee;

presenting, by the payment service system, to the first payor via the payment application, a customization user interface from which the first payor is able to customize a first screen to be presented to the payee, wherein a personalized payment functionality is selectively enabled for the first payor;

presenting, by the payment service system, to the second payor via the payment application, the customization user interface from which the second payor is able to customize a second screen to be presented to the payee, wherein the personalized payment functionality is disabled for the second payor;

receiving, by the payment service system, from the first user device, the first screen customized by the first payor;

receiving, by the payment service system, from the second user device, the second screen customized by the second payor;

determining, by the payment service system, and using a trained artificial intelligence model, at least one of:

a sequence in which the first screen and the second screen are to be displayed to the payee; or respective durations for which the first screen and the second screen are to be displayed to the payee;

combining, by the payment service system, and based on at least one of the sequence or the respective durations, the first screen and the second screen to generate combined output;

receiving, by the payment service system, an indication that the payee has opened the payment application on a third user device; and in response to receiving the indication, causing, by the payment service system, the combined output to be displayed via a user interface of the payment application executing on the third user device.

17. The computer-implemented method of claim 16, wherein:

the determining comprises determining;

the combining further comprises stitching together the first screen and the second screen such that the first screen and the second screen are displayable in the sequence; and the combined output is displayed via the user interface by displaying the first screen and the second screen in the sequence.

18. The computer-implemented method of claim 16, wherein:

the determining comprises determining the respective durations as a first duration for displaying the first screen and a second duration for displaying the second screen;

the combining further comprises stitching together the first screen and the second screen such that the first screen is displayable for the first duration and the second screen is displayable for the second duration; and the combined output is displayed via the user interface by displaying the first screen for the first duration and displaying the second screen for the second duration.

19. The computer-implemented method of claim 16, further comprising, in response to causing the combined output to be displayed via the user interface, creating, by the payment service system, a communication channel for the first payor, the second payor, and the payee to communicate as a group.

20. The computer-implemented method of claim 16, further comprising:

receiving, by the payment service system, from the third user device, a third request to share the first screen via a content platform;

removing, by the payment service system, from the first screen, at least one of an amount of the first payment or identifying information associated with the first payor to generate a modified first screen; and posting, by the payment service system, the modified first screen to the content platform.

* * * * *